United States Patent
Li et al.

(10) Patent No.: US 12,345,974 B2
(45) Date of Patent: Jul. 1, 2025

(54) DISPLAY APPARATUS

(71) Applicant: HISENSE VISUAL TECHNOLOGY CO., LTD., Qingdao (CN)

(72) Inventors: Kuibao Li, Qingdao (CN); Jianchun Li, Qingdao (CN); Xu Cheng, Qingdao (CN)

(73) Assignee: HISENSE VISUAL TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 18/827,851

(22) Filed: Sep. 9, 2024

(65) Prior Publication Data
US 2024/0427192 A1    Dec. 26, 2024

Related U.S. Application Data

(63) Continuation of application No. PCT/CN2023/082449, filed on Mar. 20, 2023.

(30) Foreign Application Priority Data

Mar. 21, 2022  (CN) .......................... 202210279174.0
Mar. 21, 2022  (CN) .......................... 202210281470.4
(Continued)

(51) Int. Cl.
G02F 1/1333       (2006.01)
G02F 1/13357      (2006.01)
(Continued)

(52) U.S. Cl.
CPC .. *G02F 1/133317* (2021.01); *G02F 1/133603* (2013.01); *G02F 1/133606* (2013.01);
(Continued)

(58) Field of Classification Search
CPC ......... G02F 1/133317; G02F 1/133603; G02F 1/133606; G02F 1/133608; G02F 1/1339;
(Continued)

(56) References Cited

U.S. PATENT DOCUMENTS 11,997,414 B2 *   5/2024   Kim ..................... H04R 1/2873
2011/0234942 A1   9/2011   Nakagome et al.
2021/0127189 A1   4/2021   Kim et al.

FOREIGN PATENT DOCUMENTS

CN    102913825 A    2/2013
CN    103869523 A    6/2014
(Continued)

OTHER PUBLICATIONS

The World Intellectual Property Organization (WIPO) International Search Report for PCT/CN2023/082449 Jun. 26, 2023 8 Pages (including translation).
(Continued)

*Primary Examiner* — Anne M Hines
*Assistant Examiner* — Jose M Diaz
(74) *Attorney, Agent, or Firm* — ANOVA LAW GROUP, PLLC

(57) ABSTRACT

The present application provides a display apparatus. The display apparatus includes: a display panel; a backlight module, which includes a backlight board and an optical film component, where the backlight board includes a backlight board body and a light source, an edge of the display panel is connected to an edge of the backlight board body, so as to form a gas layer between the display panel and the backlight board body, and the light source is positioned in the gas layer; a backplane, which is arranged on the side of the backlight module away from the display panel, and is used
(Continued)

for supporting the backlight module and the display panel; an exciter, which includes an exciter body and an actuation member.

20 Claims, 34 Drawing Sheets

(30) Foreign Application Priority Data

Jun. 27, 2022 (CN) .......................... 202221622229.5
Jun. 28, 2022 (CN) .......................... 202221634167.X
Jun. 30, 2022 (CN) .......................... 202210756231.X

(51) Int. Cl.
*G02F 1/1339* (2006.01)
*H04R 1/02* (2006.01)
*H04R 1/28* (2006.01)
*H04R 9/06* (2006.01)

(52) U.S. Cl.
CPC ...... *G02F 1/133608* (2013.01); *G02F 1/1339* (2013.01); *H04R 1/025* (2013.01); *H04R 1/028* (2013.01); *H04R 1/2896* (2013.01); *H04R 9/06* (2013.01); *H04R 9/066* (2013.01); *H04R 2499/15* (2013.01)

(58) Field of Classification Search
CPC ............ G02F 1/1333; G02F 1/133308; G02F 1/133314; G02F 1/133394; G02F 1/1336; H04R 1/025; H04R 1/028; H04R 1/2896; H04R 1/20; H04R 9/06; H04R 9/66; H04R 9/066; H04R 2499/15; H04R 7/045; H04N 5/642; H04N 5/64; G09F 9/35

See application file for complete search history.

(56) References Cited

FOREIGN PATENT DOCUMENTS

| | | | |
|---|---|---|---|
| CN | 207067607 U | 3/2018 |
| CN | 108806556 A | 11/2018 |
| CN | 109581713 A | 4/2019 |
| CN | 111145641 A | 5/2020 |
| CN | 111383563 A | 7/2020 |
| CN | 112837611 A | 5/2021 |
| CN | 214756907 U | 11/2021 |
| CN | 215268711 U | 12/2021 |
| CN | 114143674 A | 3/2022 |
| CN | 114924438 A | 8/2022 |
| CN | 217543601 U | 10/2022 |
| CN | 217543607 U | 10/2022 |
| JP | 2013182164 A | 9/2013 |
| KR | 101704517 B1 | 2/2017 |
| WO | 2020118958 A1 | 6/2020 |
| WO | 2020253141 A1 | 12/2020 |

OTHER PUBLICATIONS

China National Intellectual Property Administration (CNIPA) Office Action 1 for 202210756231.X Jun. 1, 2023 13 Pages (including translation).

* cited by examiner

DISPLAY APPARATUS

CROSS REFERENCE TO RELATED APPLICATIONS

The disclosure a continuation of International Application No. PCT/CN2023/082449, filed on Mar. 20, 2023, which claims the priority to Chinese Patent Application No. 202210281470.4 filed on Mar. 21, 2022, the priority to Chinese Patent Application No. 202210279174.0 filed on Mar. 21, 2022, the priority to Chinese Patent Application No. 202221622229.5 filed on Jun. 27, 2022, the priority to Chinese Patent Application No. 202221634167.X filed on Jun. 28, 2022, and the priority to Chinese Patent Application No. 202210756231.X filed on Jun. 30, 2022, all of which are incorporated herein in their entireties by reference.

TECHNICAL FIELD

The disclosure relates to the technical field of display, in particular to a display apparatus.

BACKGROUND

With the advancement of science and technology and improvement in living standards, a display apparatus becomes increasingly common in work and life of people.

At present, the display apparatus such as a television is developing towards a narrow bezel and thinness and lightness. Limited to a thin and light appearance of the display apparatus and a mounting position, a speaker is usually arranged below or behind a display panel, and outputs sound from below or back as a result. In this way, the speaker is invisible from the front of the display screen, and an aesthetic appearance is achieved.

However, this setting is likely to result in difference in positions of a formed sound image and an image, so the sound and image are out of synchronization, and the watch experience of the user is poor.

SUMMARY

Embodiments of the disclosure provide a display apparatus. The display apparatus includes a display panel configured to display image information; a backlight module, where the backlight module includes a backlight board and an optical film component, and the backlight board includes a backlight board body and a light source; the display panel is located at a light-emitting side of the optical film component, and the backlight board is located at a light incident side of the optical film component; an edge of the display panel is connected to an edge of the backlight board body, to form a gas layer between the display panel and the backlight board body; and the light source is located in the gas layer; a backplane, where the backplane is arranged at a side, facing away from the display panel, of the backlight module; and the backplane is configured to support the backlight module and the display panel; and an exciter, where the exciter includes an exciter body and an actuation member, the actuation member is connected to the backlight board body, and the actuation member is configured to drive the backlight board body to vibrate and transmit vibration of the backlight board body to the display panel through the gas layer, to drive the display panel to vibrate and emit sound.

Figure 1:
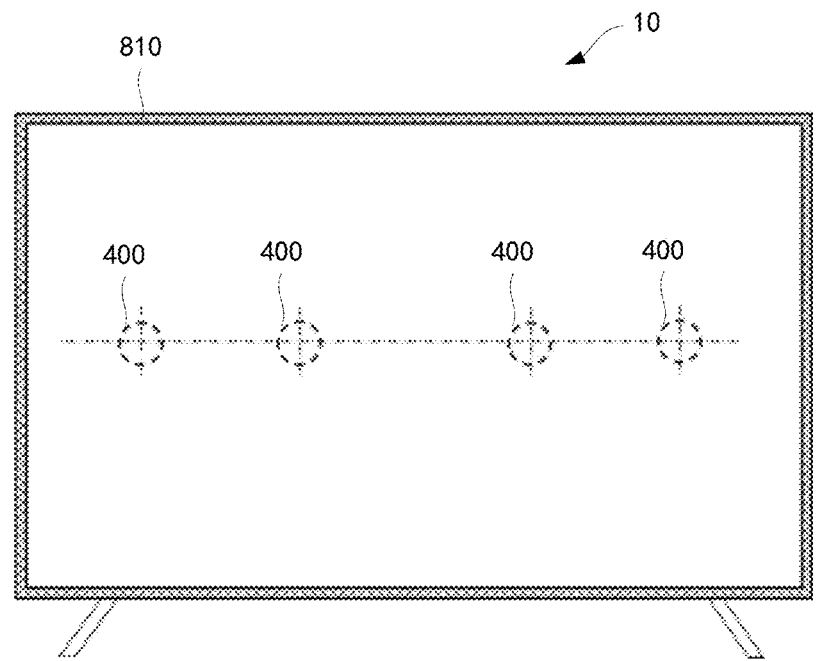
FIG. 1 is a first schematic structural diagram of a display apparatus according to some embodiments of the disclosure.

Reference numerals: 10: display apparatus; 100: display panel; 200: backlight module; 210: backlight board; 211: backlight board body; 2111: snapping-in hole; 2112: fixation sheet; 212: light source; 220: optical film component; 221: fluorescent film; 222: diffusion film; 223: brightening film; 230: drive chip; 300: backplane; 310: backplane body; 320: first lateral plate; 330: positioning column; 400: exciter; 410: exciter body; 420: actuation member; 421: mounted element; 430: vibrating reed; 440: magnetic component; 441: via hole; 442: yoke; 443: washer; 450: connection rod; 460: first elastic support member; 470: elastic support leg; 480: damping block; 490: damper; 401: coil; 402: stretchable member; 403: first movable portion; 404: second movable portion; 405: magnetic member; 406: connection portion; 40a: vibrating stabilization member; 40b: elastic filtration member; 500, 500': rear shell; 501: rear sub-shell; 510: rear shell body; 520: second lateral plate; 530: mounting hole; 540: rear shell exciter; 550': first reinforcement rib; 560: second reinforcement rib; 570: first elastic buffer member; 580: shelter member; 590: elastic damping member; 511: reflective layer; 600: reinforcement plate; 610: positioning member; 700: separation member; 710: soundproof sponge; 810: first adhesive member; 811: gas guide channel; 812: tape; 813: filter; 820: second adhesive member; 900: second elastic support member; 901: filling protrusion; 902: first connection member; 903: isolation bar; 904: anti-wear member; 9041: first layer; 9042: second layer; 9043: third layer; 9044: optically clear adhesive (OCA) layer; 9045: optical member; 9046: filter; 905: filling layer; 906: sound channel isolation structure; 910: support element; 920: elastic element; 1000: high-frequency speaker; 2000: high-pass filter; 3000: phase plug; 4000: guide cambered surface; 5000: second delay unit; 6000: second addition unit; 7010: second connection member; 7020: sound-emitting driver; 8000: band filter; 9000: holder; M: gas layer; Q: sound output cavity; X: resonance cavity; P: sound output opening; L: sound output path length; Y: equivalent length; D: equivalent diameter; C1: first gap; C2: second gap; and C3: third gap.

DETAILED DESCRIPTION

In order to make objectives, features, and advantages described above of embodiments of the disclosure clearer and more comprehensible, technical solutions in the embodiments of the disclosure will be clearly and completely described below with reference to accompanying drawings in the embodiments of the disclosure. Apparently, the embodiments described are merely some embodiments rather than all embodiments of the disclosure. All other embodiments derived by a person of ordinary skill in the art based on the embodiments of the disclosure without creative efforts should fall within the protection scope of the disclosure.

It should be noted that in the description of the disclosure, the directional or positional relations indicated by the terms "center", "up", "down", "front", "rear", "left", "right", "vertical", "horizontal", "top", "bottom", "inside", "outside", etc., are based on the directional or positional relations shown in the accompanying drawings, are merely used for facilitating the description, rather than indicating or implying that a device or element must have a particular orientation or be constructed and operated in a particular orientation, and cannot be constructed as limitation to the disclosure accordingly.

In the related art, a display apparatus may use a speaker to emit sound. The speaker is generally arranged at a lower side or a back side of the display apparatus, and the display apparatus emits sound from below or back. However, in this way, difference in positions of an image and a sound image of the display apparatus is caused, the sound and image are out of synchronization, and watch experience is poor. Alternatively, the display apparatus may use an exciter to drive a display panel to vibrate and emit sound. With an organic light emitting diode (OLED) display apparatus as an example, a display panel of the OLED display apparatus includes an organic self-luminous layer, and the exciter may be directly connected to the display panel and drive the display panel to vibrate and emit sound. However, for a liquid crystal display (LCD) apparatus, a display panel does not emit light, and a backlight source is needed to emit light. According to an imaging principle of the liquid crystal display, an electric field effect of twisted nematic liquid crystal molecules is caused under driving of an electric field between two electrodes by placing liquid crystals between two pieces of conductive glass, so as to control a transmission or shielding function of the backlight source and display images. If a color filter is added, a color image may be displayed. It can be seen that the backlight source cannot be shielded, and there is a gas gap between the display panel and the backlight source. Thus, the liquid crystal display apparatus cannot drive the display panel to vibrate and emit sound through the exciter.

In view of this, the embodiments of the disclosure provide a display apparatus. An exciter may drive a display panel to vibrate and emit sound through a gas layer between a display panel and a backlight board. Thus, a desirable acoustic effect is achieved, and synchronization of the sound and image is facilitated.

With reference to FIGS. 1 to 6, the embodiments of the disclosure provide a display apparatus 10. The display apparatus 10 is a liquid crystal display apparatus. The display apparatus 10 includes a display panel 100, a backlight module 200, a backplane 300 and an exciter 400.

The display panel 100 is configured to display image information, such as texts, images, etc. The display panel 100 includes the touch glass and a liquid crystal screen. The touch glass and the liquid crystal screen are sequentially stacked in a thickness direction of the display apparatus 10.

The display apparatus 10 has a height side, a bottom side, a left side, a right side, a front side and a rear side. The left side and the right side of the display apparatus 10 refer to a left side and a right side of a user when the user faces the touch glass side and performs a touch operation. Accordingly, a side, facing the user, of the display apparatus 10 is the front side; a side, facing away from the user, of the display apparatus 10 is the rear side; an upper side of the display apparatus 10 is the height side; and a lower side of the display apparatus 10 is the bottom side. In this way, the touch glass is arranged at the front side of the liquid crystal screen and configured to protect the liquid crystal screen.

The liquid crystal screen is arranged at a rear side of the touch glass. The liquid crystal screen includes a color filter (CF) substrate, a thin film transistor (TFT) substrate (also referred to as an array substrate) and a liquid crystal (LC) layer. The liquid crystal layer is located between the color filter substrate and the array substrate. Data lines and scanning lines are arranged on the thin film transistor substrate. A direction of liquid crystal molecules is controlled to be changed by energizing or de-energizing the data lines and scanning lines, so as to emit light from a light source 212 through the color filter substrate and generate a picture with a preset color.

The backlight module 200 includes a backlight board 210. The backlight board 210 is configured to emit light. The backlight board 210 includes a backlight board body 211 and a light source 212. The backlight board body 211 may be an aluminum plate, a printed circuit board (PCB), etc. The light source 212 may be a light-emitting diode (LED), a mini-light emitting diode (Mini LED) or a micro-light emitting diode (Micro LED). A plurality of light sources 212 may be provided and arranged on the backlight board body 211 at intervals.

In some embodiments, with consideration of a size of the display apparatus 10, a manufacturing process of the backlight board body 211, etc., the size of the display apparatus 10 is usually larger than a size of the backlight board 210. That is, a plurality of the backlight boards 210 are usually provided, and the plurality of the backlight boards 210 are arranged in an array. Illustratively, with reference to FIG. 3, the display apparatus 10 includes three backlight boards 210. The three backlight boards 210 are arranged in a lateral direction of the display apparatus 10.

The backlight module 200 further includes an optical film component 220. The display panel 100 is located at a light-emitting side of the optical film component 220, and the backlight board 210 is located at a light incident side of the optical film component 220. That is, the display panel 100, the optical film component 220 and the backlight board 210 are stacked in the thickness direction of the display apparatus 10.

According to different types of light emitted from the light source 212, the optical film component 220 may be of different types. For example, when the light source 212 emits white light, the optical film component 220 may include a reflector plate, a light guide plate, a brightening film, etc. The reflector plate is mounted on a side surface, provided with the light source 212, of the backlight board body 211. The reflector plate may reflect light generated by the light source 212 to a light-emitting direction, such that the light emitted by the light source 212 is evenly distributed. The light guide plate may emit, on a light-emitting side, light from a light incident side by using refraction and total internal reflection, and convert a line light source into an area light source.

When the light source 212 emits blue light, the optical film component 220 may include a diffusion film 222, a fluorescent film 221 and a brightening film 223 that are stacked in sequence. The diffusion film 222 is arranged at a front side of the light source 212, that is, at a side facing the backlight board 210. The diffusion film 222 uniformly mixes light of a plurality of light sources 212, that is, a point light source 212 is converted into an area light source 212. The fluorescent film 221 converts the light emitted by the light source 212 into white light. In this way, a color of the light emitted by the light source 212 is not limited, and the light source 212 may emit blue light or purple light. The brightening film 223 is configured to improve the brightness of the light. It can be understood that when the light source 212 emits white light, the optical film component 220 may also include a diffusion film 222, a fluorescent film 221 and a brightening film 223. This embodiment is described by taking the optical film component 220 that includes the diffusion film 222, the fluorescent film 221 and the brightening film 223 as an example.

In some embodiments, an edge of the display panel 100 is hermetically connected to an edge of the backlight board body 211. For example, sealing members, such as buffering double-sided tapes, may be arranged at peripheral edges of the backlight board 210, such that a sealed gas layer M is formed between the display panel 100 and the backlight board body 211. The light source 212 is located in the gas layer M.

In some embodiments, the liquid crystal screen and the optical film component 220 may be pressed together, so as to avoid existence of an air gap through which outside air circulates between the liquid crystal screen, the brightening film 223, the fluorescent film 221 and the diffusion film 222.

In some embodiments, the liquid crystal screen and the optical film component 220 may also be bonded fixedly in pairs, for example, using a photosensitive adhesive (ultra-violet rays (UV) glue), foam, the double-sided adhesive, etc.

That is, the display panel 100 and the optical film component 220 may be fixedly connected into a whole through bonding. In this case, the gas layer M is formed between the optical film component 220 and the backlight board body 211.

When the liquid crystal screen and the optical film component 220 are pressed together, a gas gap may be formed between the liquid crystal screen and the brightening film 223, between the brightening film 223 and the fluorescent film 221, and between the fluorescent film 221 and the diffusion film 222. The gas layer M is formed between the display panel 100 and the backlight board body 211, and the gas gap is in a sealed state.

Specifically, the display apparatus 10 includes a first adhesive member 810 having adhesive ability. The double-sided tape or the foam is used as the first adhesive member 810. The first adhesive member 810 extends along the edge of the backlight board body 211, and the optical film component 220 and the backlight board body 211 are bonded fixedly through the first adhesive member 810, that is, the diffusion film 222 and the backlight board body 211 are bonded fixedly through the first adhesive member 810. In this way, the sealed gas layer M is formed between the optical film component 220 and the backlight board 210, and the gas layer M may be filled with air, nitrogen, etc.

The gas layer M is sealed, that is, the outside air may not circulate through the gas layer M. The gas layer M may be equivalent to a damping spring for transmitting vibration between the backlight board 210 and the display panel 100.

A size a gap of the gas layer M may be determined according to a size of the light source 212. In some embodiments, the gap may have a size of 0.3 mm-10 mm. For example, when the mini-light emitting diode is used as the light source 212, the gap of the gas layer M may be less than 1 mm. It should be noted herein that numerical values and numerical value ranges involved in the embodiments of the disclosure are approximate values, and a certain range of errors may exist due to influence of the manufacturing process, which are ignorable by those skilled in the art.

In some embodiments, when the gap of the gas layer M is large, for example, this gas is 4 mm-10 mm, the sensitivity to a gas pressure change in the gas layer M is low when the backlight board body 211 vibrates. In order to improve vibration transmission efficiency of the exciter 400, the gas layer M may be filled with a filler, so as to reduce a gas volume of the gas layer M, improve the sensitivity to the gas pressure change, and then improve a sound-emitting effect of the display panel 100.

In some embodiments, the filler may be fixedly connected to the backlight board body 211 through, for example, bonding, snapping-in, screwing, etc.

Illustratively, the fillers may be bonded to the backlight board body 211 through a second adhesive member 820 further included in the display apparatus, so as to avoid relative movement between the fillers and the backlight board body 211. The second adhesive member 820 includes, but is not limited to, the UV glue, a double-sided foam tape, etc.

Alternatively, the backlight board body 211 may be provided with a snapping-in hole. One end of the filler is snapped in the snapping-in hole, and the other end of the filler extends toward a side of the display panel 100, so as to reduce the gap of the gas layer M.

In some embodiments, in order to avoid excessively increasing a weight of the backlight board body 211, a lightweight high-density foam material, such as melamine may be used as the filler.

In some embodiments, a reflecting member may be bonded to a surface of the filler or the surface of the filler may be sprayed with a reflective material, so as to reduce an absorption amount of light emitted by the light source 212 by the filler.

The diffusion film 222 and the light source 212 may abut against each other in the thickness direction of the display apparatus 10. In this way, the gap of the gas layer M is small and a thickness of the display apparatus 10 is small. In this case, the light source 212 may be made from a flexible encapsulation material, so as to avoid noise generated by rigid collision between the diffusion film 222 and the light source 212.

In some embodiments, the diffusion film 222 may be separated from the light source 212, so as to avoid noise generated by rigid collision between the diffusion film 222 and the light source 212.

Figure 7:
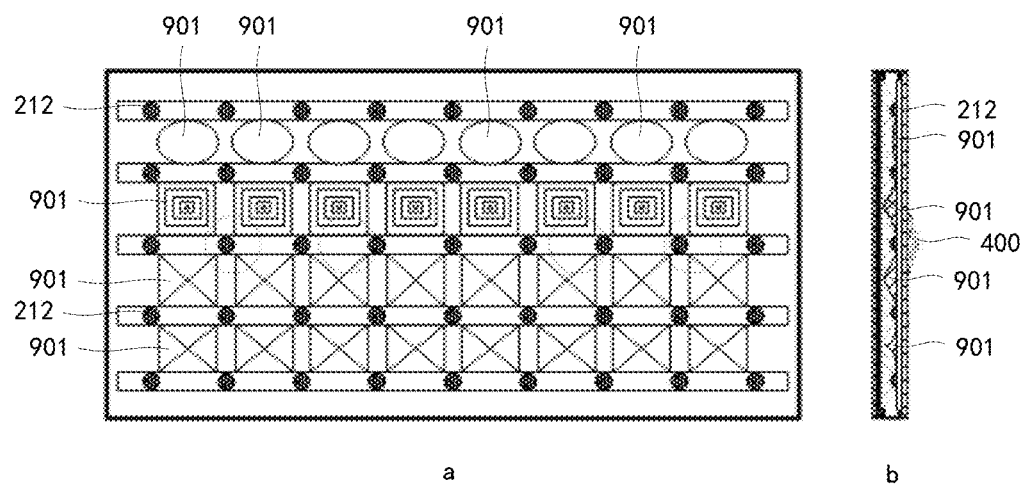
FIG. 7 is a schematic structural diagram of a display apparatus in which a gas layer is internally provided with a filling protrusion according to some embodiments of the disclosure.

In some embodiments, the filler may be a sheet-like member and laid on the backlight board body 211. A light source hole for the light source 212 to pass through is provided in a position, corresponding to the light source 212, of the filler. In some embodiments, with reference to FIG. 7, figure a in FIG. 7 is a front view of the backlight board body 211, and figure b in FIG. 7 is a side view of figure a. The fillers may also be a plurality of filling protrusions 901. The filling protrusion 901 is a columnar protrusion. The plurality of filling protrusions 901 are arranged at intervals. A shape of a cross section of the filling protrusion 901 may be a cone, a triangle, a trapezoid, a circle, an ellipse, a rectangle, etc.

In addition, a contour of a shape of a section, perpendicular to the display panel 100, of the filling protrusion 901 may be a straight line, an cambered line, a spline curve, a curve extending in a stepped manner, etc.

In some embodiments, the filling protrusion 901 protrudes from a board surface of a side, facing the display panel 100, of the backlight board body 211 and extends towards a side of the display panel 100. Illustratively, the plurality of filling protrusions 901 may be arranged in an array on the backlight board body 211. For example, in FIG. 7, the backlight board body 211 is rectangular, and the plurality of filling protrusions 901 are arranged in a matrix on the backlight board body 211. The filling protrusions 901 may be arranged at a space between adjacent light sources 212. Illustratively, the filling protrusion 901 is arranged between any two adjacent light sources 212, or the filling protrusion 901 is arranged between any four adjacent light sources 212.

For example, when the light source 212 is a light bar, the filling protrusion 901 is located between adjacent light bars. When the light source 212 is a lamp bead, the filling protrusion 901 is located between any two lamp beads, or the filling protrusion 901 is located between any four adjacent lamp beads.

In some embodiments, sectional shapes and contours of sectional shapes, perpendicular to the display panel 100, of the plurality of filling protrusions 901 on the backlight board body 211 may be the same or not. For example, in FIG. 7, the plurality of filling protrusions 901 are arranged in a matrix, shapes of sections of the filling protrusions 901 in each row or column may be the same, and shapes of sections of the filling protrusions 901 in adjacent rows may be the same or not.

In some embodiments, in order to reduce the influence of the filling protrusions 901 on the light emitted by the light source 212, a size of a cross section of the filling protrusion 901 may be gradually decreased from an end of the backlight board body 211 to an end of the diffusion film 222. For example, the filling protrusion 901 is arranged between any adjacent four light sources 212, and the filling protrusion 901 is a quadrangular pyramid-shaped protrusion. A light beam emitted by the light source 212 is adjacent to an outer wall surface of the filling protrusion 901, that is, the filling protrusion 901 is not arranged on a path of light emitted by the light source 212.

In some embodiments, a protrusion height of the filling protrusion 901 is less than or equal to the gap of the gas layer M.

It can be understood that the gap of the gas layer M refers to a distance between the backlight board body 211 and the display panel 100, and the protrusion height of the filling protrusion 901 refers to a height of the filling protrusion 901 protruding from the board surface of the backlight board body 211 and extending towards the side of the display panel 100.

In some embodiments, the protrusion height of the filling protrusion 901 protruding from the board surface of the backlight board body 211 is less than or equal to the gap of the gas layer M, such that the filling protrusion 901 can avoid a direct illumination range of the light source 212.

In some embodiments, the protrusion height of the filling protrusion 901 protruding from the board surface of the backlight board body 211 is less than a height of the light source 212 protruding from the board surface of the backlight board body 211, such that the protrusion can avoid a direct illumination range of the light source 212.

In some embodiments, in an extension direction from the backlight board body 211 to the display panel 100, a size of the section (this section is parallel to the display panel 100) of the filling protrusion 901 gradually decreases. As shown in FIG. 7, the filling protrusion 901 is a quadrangular prism, an ellipsoid, etc., so that the filling protrusion 901 is located outside the direct illumination region of the light source 212. Thus, the influence of the filling protrusions 901 on direct light of the light sources 212 is reduced.

It should be noted that the protrusion heights of the filling protrusions 901 protruding from the board surface of the backlight board body 211 may be equal or unequal. In addition, the shapes of the sections, perpendicular to the display panel 100, of the filling protrusions 901 may be the same or different. As shown in FIG. 7, the shapes of the sections, perpendicular to the display panel 100, of the filling protrusions 901 are different; and the protrusion heights of the filling protrusions 901 protruding from the board surface of the backlight board body 211 are unequal, thus guaranteeing that the filling protrusions 901 can avoid direct illumination ranges of adjacent light sources 212.

Illustratively, the closer to the exciter a position is, the greater a vibration amplitude of the backlight board is. The farther from the exciter a position is, the smaller the vibration amplitude of the backlight board is. Thus, sectional shapes or heights of the fillers close to the exciter and the fillers far away from the exciter may be different. In some embodiments, with the exciter as a center, the fillers at a position close to the exciter may use a pyramid, a cone and other structures with a high height. And the fillers at a position far away from the exciter may use an ellipsoid with a small height. In this way, when the backlight board drives the display panel to vibrate, the fillers close to the exciter may be configured to support the display panel, such that different positions of the display panel have uniform vibration amplitudes, and a display effect of the display panel is improved.

Illustratively, in FIG. 7, the filling protrusions 901 are arranged in four rows, and sectional shapes and heights of the filling protrusions 901 in adjacent rows are different, and sectional shapes and heights of the filling protrusions 901 in the same row are the same. For example, the height of the filling protrusion 901 close to the exciter is greater than the height of the filling protrusion 901 far away from the exciter, and the filling protrusions 901 close to the exciter may be configured to support the display panel, such that different positions of the display panel have uniform vibration amplitudes.

In some embodiments, arrangement forms, hardnesses, heights and the like of the filling protrusions 901 may be arbitrarily combined. Illustratively, when the plurality of filling protrusions 901 are arranged in an array, the filling protrusions 901 at different positions may be set to have different hardnesses. When the plurality of filling protrusions 901 are arranged in other forms other than the array, the filling protrusions 901 at different positions may be set to have different hardnesses and different heights.

In some embodiments, heights, in a perpendicular direction of the display panel 100, of the second elastic support members 900 in a natural state gradually decrease from a side close to the exciter body 410 to a side far away from the exciter body 410; and the height, in the perpendicular direction of the display panel 100, of the second elastic support member 900 in the natural state is greater than a maximum interval of the gas layer M at a corresponding position of the second elastic support member.

That is, in order to avoid failure of vibration transmission, height of the second elastic support members 900 required when the second elastic support members 900 are separated from the diffusion film 222 or the backlight board 210 gradually decrease from the side close to the exciter body 410 to the side far away from the exciter body 410.

Then, the heights of the second elastic support members 900 are set unequally. Illustratively, a height of the second elastic support member 900 at a position close to the exciter body 410 may be used as a basic height of the second elastic support member 900. The farther from the exciter body 410 the second elastic support member is, the smaller the height of the second elastic support member 900 is.

That is, by arranging the second elastic support members 900 with unequal heights in the natural state, the second elastic support members 900 between the diffusion film 222 and the backlight board 210 can be in a compressed state of interference fit at a lower manufacturing cost, that is, the second elastic support member 900 at a position close to the exciter body 410 is prevented from being separated from the diffusion film 222 or the backlight board 210. Thus, a supporting effect between the diffusion film 222 and the backlight board 210 is desirable, and vibration transmission efficiency is high.

With consideration of a vibration transmission loss, the closer to the exciter 400 a position is, the higher the vibration intensity is. The farther from the exciter 400 a position is, the lower the vibration intensity is. In some embodiments, a distribution density of the second elastic support members 900 and/or a support rigidity of a single second elastic support member 900 gradually decreases from a side close to the exciter body 410 to a side far away from the exciter body 410. That is, at a position closer to the exciter body 410, a support intensity required by the optical film component 220 is higher. At a position farther from the exciter body 410, a support intensity required by the optical film component 220 is lower. Accordingly, the distribution densities and/or the support rigidities of the second elastic support members 900 are set unequally.

When distribution areas of the second elastic support members 900 at different positions are unequal, at a position closer to the exciter body 410, an arrangement number of the second elastic support members 900 is greater; and at a position farther from the exciter body 410, the arrangement number of the second elastic support members 900 is smaller. That is, at a position closer to the exciter body 410, more second elastic support members 900 participate in supporting of the optical film component 220 and transmitting of vibration, and the supporting effect is desirable. Since a large number of second elastic support members 900 jointly perform supporting and vibration transmission, a single second elastic support member 900 bears a small pressure and the second elastic support member 900 has a long service life. In this case, even if some second elastic support members 900 at the position close to the exciter body 410 fail to support, the support failure and the vibration transmission failure at a position of the exciter body 410 cannot be caused due to the large number of the second elastic support members 900 at the position close to the exciter body 410.

When support rigidities of different second elastic support members 900 are set unequally, a support rigidity of the second elastic support member 900 closer to the exciter 400 is greater, and a support rigidity of the second elastic support member 900 farther from the exciter 400 is smaller. That is, at the position closer to the exciter body 410, a deformation-resistant capacity of the second elastic support member 900 is stronger, so as to avoid the elastic failure of the second elastic support member 900 caused due to excessive stretching, and the support failure and the vibration transmission failure of the second elastic support member 900 further caused.

It can be understood that the distribution areas and support rigidities of the second elastic support members 900 may be set unequally, and are not limited in the embodiments.

With consideration of a vibration transmission loss, the closer to the exciter 400 a position is, the higher the vibration intensity is; and the farther from the exciter 400 a position is, the lower the vibration intensity is. In some embodiments, the hardness of a single second elastic support member 900 and/or a cross-sectional area of the single second elastic support member 900 gradually decreases from a side close to the exciter body 410 to a side far away from the exciter body 410. That is, at a position closer to the exciter body 410, a support intensity required by the optical film component 220 is higher. At a position farther from the exciter body 410, a support intensity required by the optical film component 220 is lower. Accordingly, the hardnesses and/or the cross-sectional areas of the second elastic support members 900 may also be set unequally.

When hardnesses of different second elastic support members 900 are set unequally, the hardness of the second elastic support member 900 closer to the exciter body 410 is greater, and the hardness of the second elastic support member 900 farther from the exciter 400 is smaller. That is, at the position closer to the exciter body 410, a deformation-resistant capacity of the second elastic support member 900 is stronger. Thus, the second elastic support members 900 can effectively support between the backlight board 210 and the diffusion film 222, and the second elastic support members 900 have a desirable supporting effect and a vibration transmission effect.

When cross-sectional areas of different second elastic support members 900 are set unequally, a cross-sectional area of the second elastic support member 900 closer to the exciter 400 is larger, and the cross-sectional area of the second elastic support member 900 farther from the exciter 400 is smaller. That is, at the position closer to the exciter body 410, the larger a size of a cross section of the second elastic support member 900, the less likely it is to undergo stretchable deformation. Thus, the second elastic support members 900 can effectively support between the backlight board 210 and the diffusion film 222, and the second elastic support members 900 have a desirable supporting effect and a vibration transmission effect.

It can be understood that the hardnesses and the cross-sectional areas of the second elastic support members 900 may be set unequally, and are not limited in the embodiments.

In some embodiments, at least one of the height of the second elastic support member 900 in the perpendicular direction of the display panel 100 in the natural state, the distribution density of the second elastic support members 900, the rigidity of the single second elastic support member 900, the hardness of the single second elastic support member 900 and the cross-sectional area of the single second elastic support member 900 gradually decreases from the side close to the exciter body 410 to the side far away from the exciter body 410, thus satisfying different assembly process demand, manufacturing costs, etc.

In some embodiments, with reference to FIG. 5 and FIGS. 8-25, the display apparatus 10 may further include a second elastic support member 900. The material of the second elastic support member 900 may be silica gel or rubber. A plurality of second elastic support members 900 are provided, and the plurality of second elastic support members 900 are arranged at intervals.

One end of the second elastic support member 900 is connected to the backlight board 210, and the other end is connected to the diffusion film 222. The second elastic support member 900 may be bonded fixedly to the backlight board 210 through an adhesive member, such as UV glue. Thus, the second elastic support member 900 is prevented from moving relative to the backlight board 210.

In some embodiments, when the protrusion height of the filling protrusion 901 is the same as the gap of the gas layer M, two ends of the filling protrusion 901 may be fixedly connected to the backlight board body 211 and the diffusion film 222. In this case, the filling protrusion 901 may be used as the second elastic support member 900.

In some embodiments, the display apparatus may be simultaneously provided with the filling protrusions 901 and the second elastic support members 900.

The second elastic support member 900 is arranged between the backlight board 210 and the diffusion film 222, for example, the second elastic support member 900 is elastically pressed between the backlight board 210 and the optical film component 220, such that the optical film component 220 and the backlight board 210 may be connected into a whole that can be equivalent to a single-layer screen. Thus, vibration can be effectively transmitted, vibration transmission efficiency is high, and the case that the optical film component 220 and the backlight board 210 move relative to each other due to an excessive gap of the gas layer M is avoided.

Figure 5:
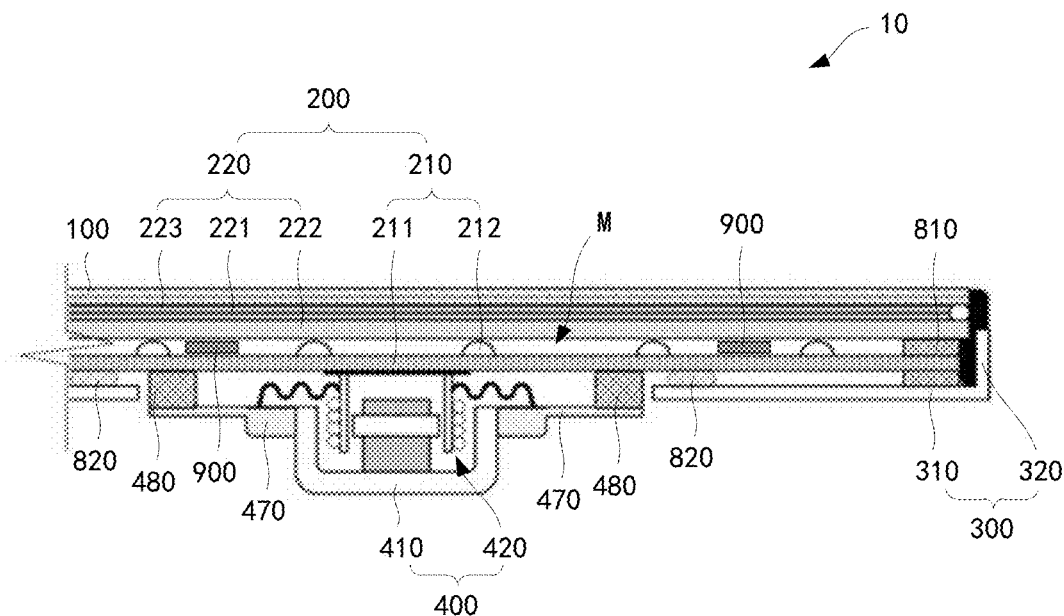
FIG. 5 is another sectional view of a display apparatus at a position of an exciter according to some embodiments of the disclosure.
Figure 6:
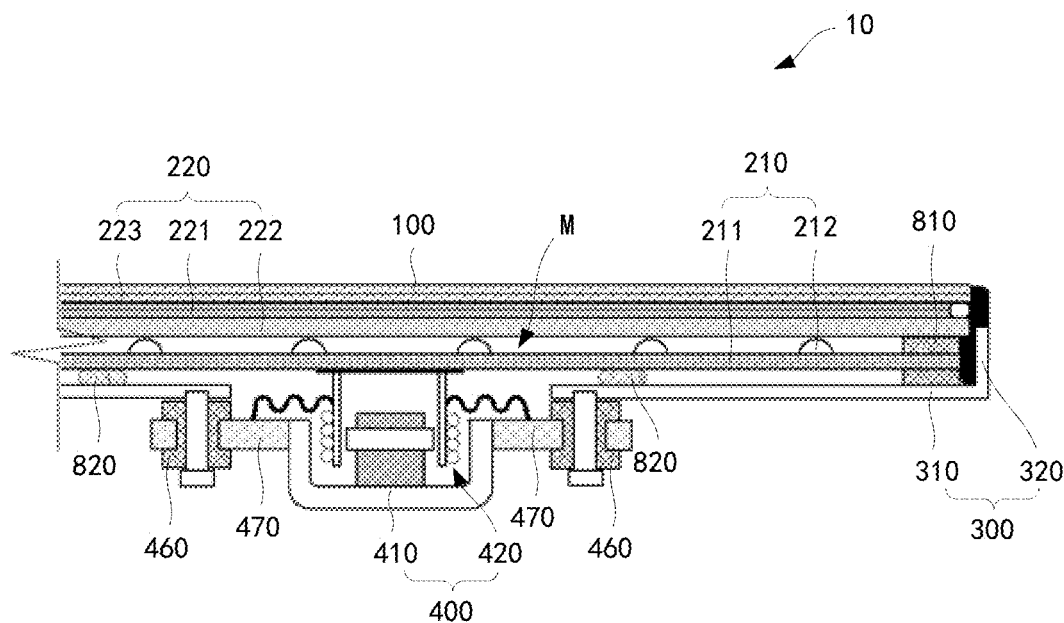
FIG. 6 is yet another sectional view of a display apparatus at a position of an exciter according to some embodiments of the disclosure.
Figure 9:
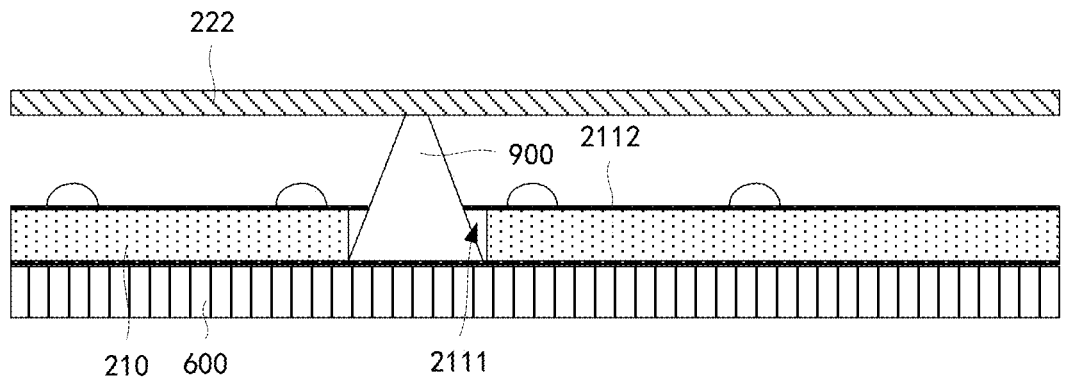
FIG. 9 is a schematic structural diagram of a display apparatus in which a second elastic support member is snapped in a backlight board according to some embodiments of the disclosure.
Figure 10:
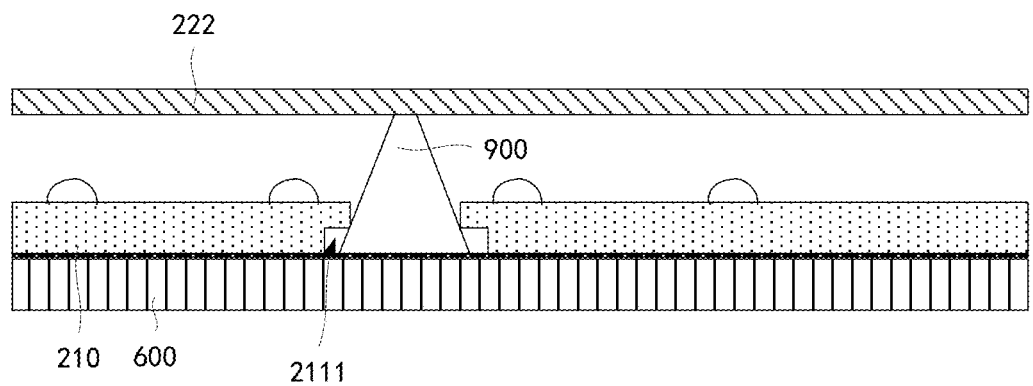
FIG. 10 is another schematic structural diagram of a display apparatus in which a second elastic support member is snapped in a backlight board according to some embodiments of the disclosure.
Figure 11:
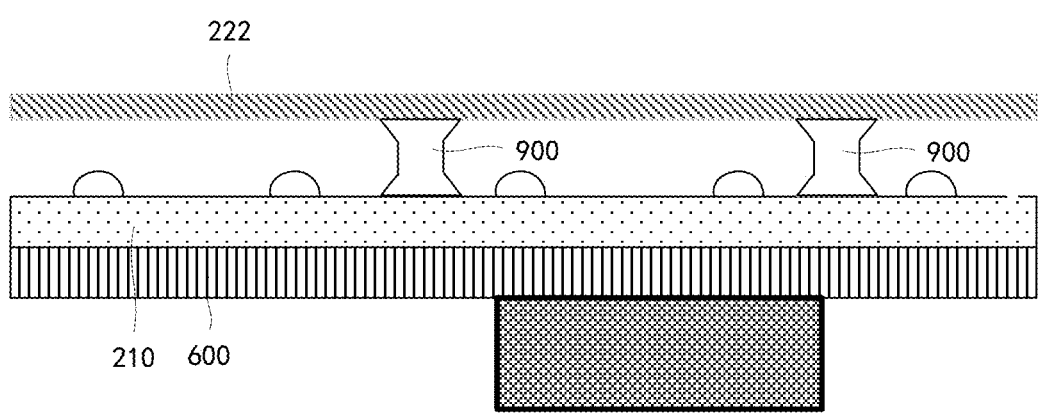
FIG. 11 is a schematic structural diagram of a display apparatus in which a second elastic support member is fixed in an adsorption manner according to some embodiments of the disclosure.
Figure 12:
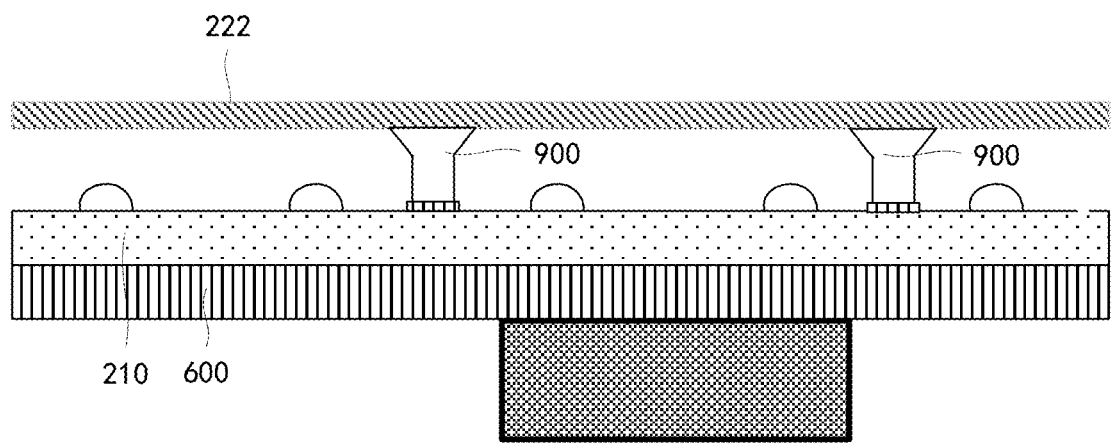
FIG. 12 is a schematic structural diagram of a display apparatus in which two ends of a second elastic support member are fixed in different methods according to some embodiments of the disclosure.

In addition, since the optical film component 220 can convert and evenly distribute light generated by the light source 212, no shadow is generated on the display panel 100 and the display panel 100 can have the even brightness even if the second elastic support member 900 is arranged at a side, provided with the light source 212, of the backlight board body 211. In this way, a shape and a size of the filling protrusion 901, a shape of the second elastic support member 900, a contact area between the second elastic support member 900 and the diffusion film 222 and the like may not be limited. In some embodiments, a shape of a section (this section is perpendicular to the display apparatus) of the second elastic support member 900 may be a rectangle (as shown in FIG. 5), a cone (as shown in FIGS. 9 and 10), a trapezoid, a dumbbell shape (as shown in FIG. 11), a column or other shapes.

Illustratively, the second elastic support member 900 may have a conical structure or a quadrangular pyramid-shaped structure. A size of a cross section of the second elastic support member 900 may be gradually decreased from an end of the backlight board body 211 to an end of the diffusion film 222. A light beam emitted by the light source 212 is adjacent to an outer wall surface of the second elastic support member 900. That is, the second elastic support member 900 is not arranged on a path of the light emitted by the light source 212. In this way, brightness distribution of the display screen can be even.

In some embodiments, with consideration of a large size of the display apparatus, the backlight board body 211 or the diffusion film 222 may be deformed during an assembly process of the display apparatus. That is, the gap between the backlight board body 211 and the diffusion film 222 is different in size at different positions of the display apparatus. By arranging the plurality of second elastic support members 900 between the backlight board body 211 and the diffusion film 222, the gap between the backlight board body 211 and the diffusion film 222 can be maintained within a preset range, and the case that the light source 212 is in contact with the diffusion film 222 at some position is avoided.

The backplane 300 is arranged at a side, facing away from the display panel 100, of the backlight module 200, that is, the backplane 300 is arranged at a rear side of the backlight board 210, for supporting the backlight module 200 and the display panel 100. The material of the backplane 300 may be aluminum alloy, steel, etc., to provide effective support.

The display apparatus 10 further includes a rear shell 500 located at a side, facing away from the display panel 100, of the backplane 300, that is, the rear shell 500 is arranged at a rear side of the backplane 300. A controller, electric connection lines and the like of the display apparatus 10 may be arranged between the backplane 300 and the rear shell 500, thus simplifying an appearance of the display apparatus 10. The material of the rear shell 500 may be plastic, metal, etc.

The exciter 400 is arranged at a side, facing away from the display panel 100, of the backlight board 210. The exciter 400 is configured to drive the backlight board 210 to vibrate. Any one or more of an electromagnetic exciter, a magnetostrictive exciter and a piezoelectric exciter may be used as the exciter 400, and high applicability is achieved. In some embodiments, the exciter 400 may further include a magnetic field generation unit (such as a magnet) and a vibrating coil. The magnetic field generation unit is configured to generate a magnetic field, and acting force of the vibrating coil in the magnetic field generated by the magnetic field generation unit is constantly changed by inputting a constantly changing current into the vibrating coil, thereby generating vibration.

In some embodiments, the exciter 400 includes an exciter body 410 and an actuation member 420, and the actuation member 420 is connected to the backlight board body 211. When the exciter 400 is started, the actuation member 420 vibrates and is configured to drive the backlight board body 211 to vibrate. The exciter body 410 may vibrate along with the backlight board 210, and transmit vibration of the backlight board body 211 to the display panel 100 through the gas layer M, so as to drive the display panel 100 to vibrate and emit sound. A structure of the actuation member 420 varies as a type of the exciter body 410 varies, and the type of the exciter body 410 is not limited in the embodiments.

The sealed gas layer M may be equivalent to a damping spring. After the actuation member 420 drives the backlight board body 211 to vibrate, vibration of the backlight board 210 may be transmitted to the display panel 100 through the gas layer M, and the display panel 100 is driven to vibrate and emit sound, that is, the display panel 100 of the liquid crystal display apparatus is driven to vibrate and emit sound. That is, the display apparatus 10 according to the embodiments may emit sound at a front side, and a position of a sound image is approximately coincident with a center position of a picture, such that synchronization of the sound and picture is realized, and an audio-visual effect of a user is desirable. In addition, since the exciter 400 is located on a surface, facing away from the display panel 100, of the backlight board 210, an arrangement of the exciter 400 does not affect a display effect of the display apparatus.

According to a method for fixing the optical film component 220 to the liquid crystal screen, the optical film component 220 may have different vibration forms. For example, when the optical film component 220 is bonded fixedly to the liquid crystal screen by an adhesive member, a fixated fluorescent film 221 may vibrate synchronously with the liquid crystal screen.

When the optical film component 220 and the liquid crystal screen are pressed together, there may be a gap between the optical film component 220 and the liquid crystal screen, and the optical film component 220 may vibrate asynchronously with the liquid crystal screen, for example, the optical film component 220 may be in a static state.

It can be understood that since the gas layer M is sealed, when a vibration amplitude of the backlight board 210 is large, gas in the gas layer M is compressed and a large gas pressure is caused. In this way, liquid crystals in a liquid crystal layer are likely to be compressed and deformed, and a display problem of the display apparatus 10 is further caused.

In order to prevent the liquid crystals in the liquid crystal layer from being compressed and deformed, vibration energy of the exciter 400 may be reduced or the gap of the gas layer M may be expanded.

In order to prevent the liquid crystals in the liquid crystal layer from being compressed and deformed, in some embodiments, this embodiment provides a display apparatus, in which the gas layer M is in communication with atmosphere, that is, the gas layer M is in an unsealed state, and a gas guide channel 811 is provided at a connection position between an edge of the display panel and an edge of the backlight board body. That is, a viscous structure between the diffusion film 222 and the display panel 100 forms the gas guide channel 811 for communication of an inner side with an outer side of the gas layer M.

Figure 30:
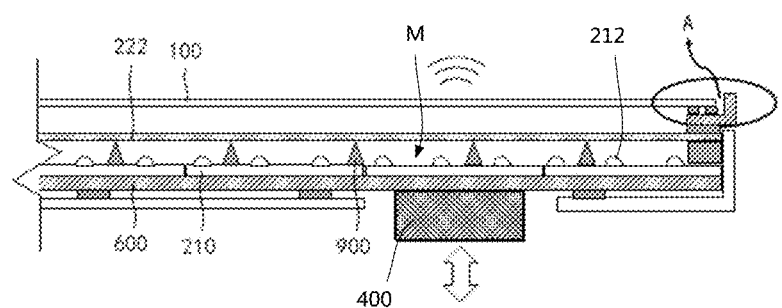
FIG. 30 is a schematic structural diagram of a display apparatus in which a gas guide channel is provided in a connection position between a display panel and a backlight board body according to some embodiments of the disclosure.
Figure 31:
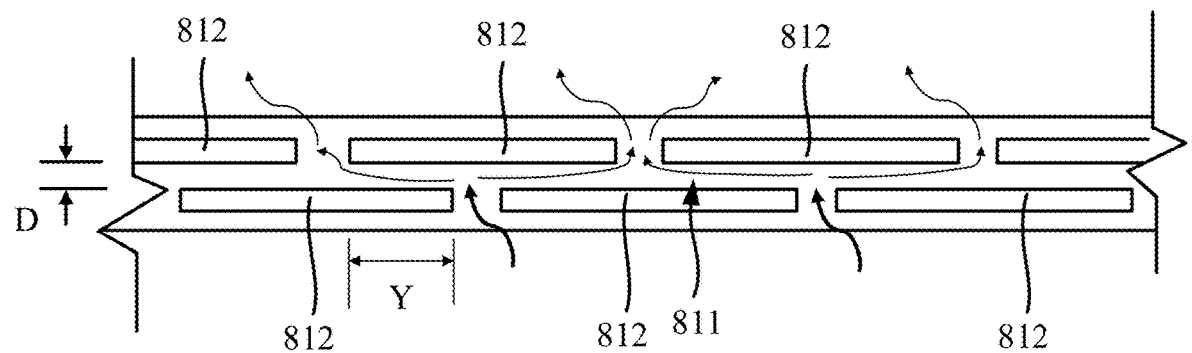
FIG. 31 is a front view of a tape in a partial enlarged view of a part A in FIG. 30.
Figure 32:
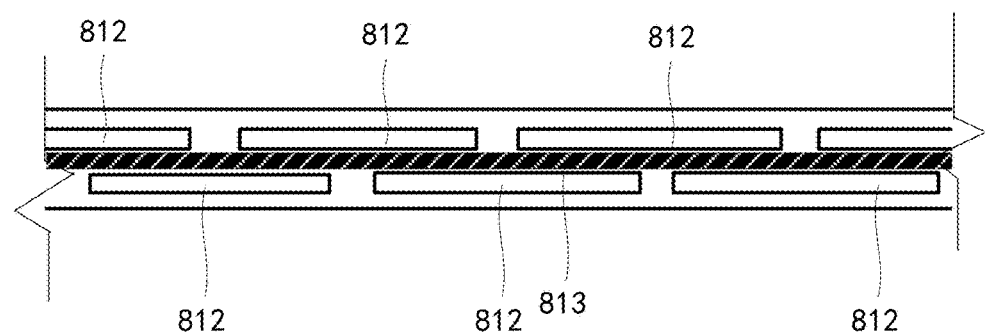
FIG. 32 is a schematic structural diagram of arranging a filter in FIG. 31.
Figure 33:
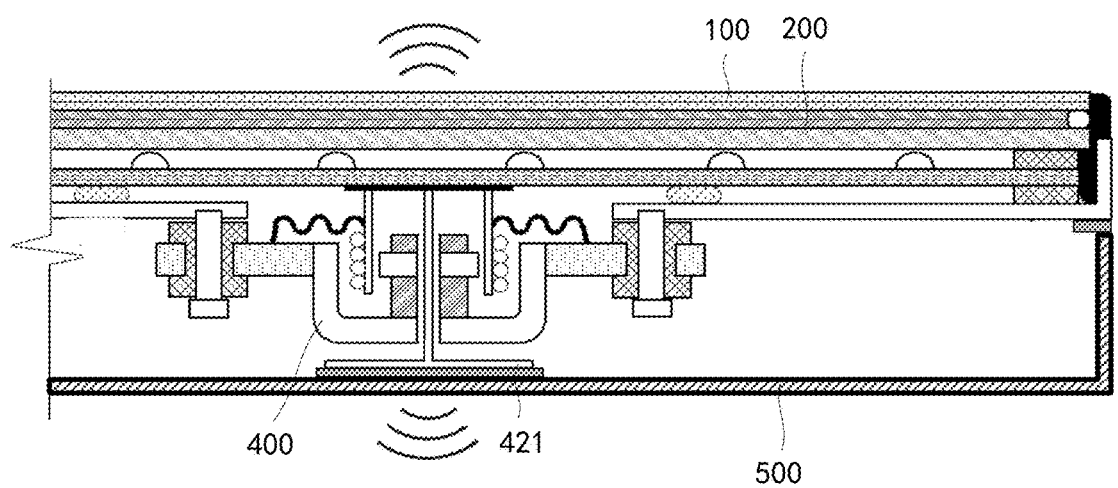
FIG. 33 is a schematic structural diagram of a display apparatus in which an actuation member is connected to a rear shell according to some embodiments of the disclosure.
Figure 34:
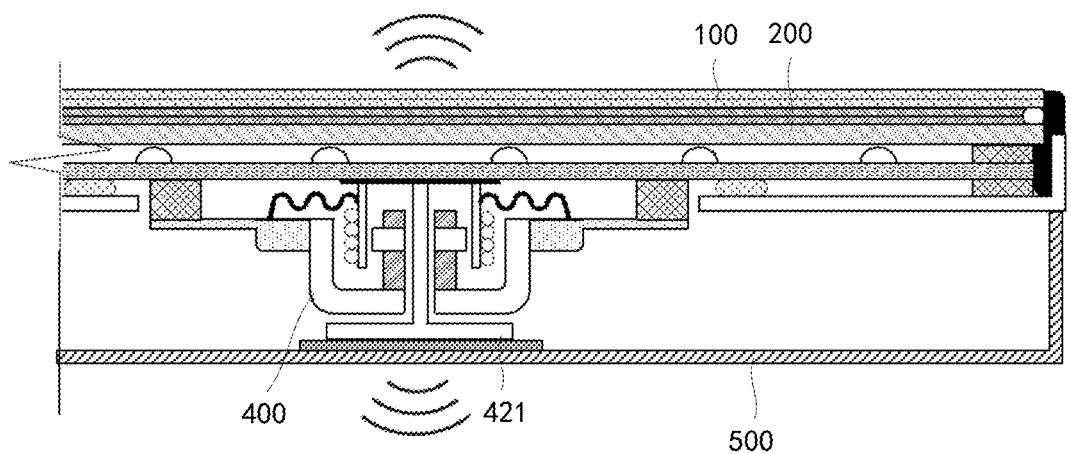
FIG. 34 is another schematic structural diagram of a display apparatus in which an actuation member is connected to a rear shell according to some embodiments of the disclosure.

With reference to FIGS. 30-32, the gas guide channel 811 has an equivalent length Y and an equivalent inner diameter D, and the equivalent length Y is greater than or equal to 3 times the equivalent inner diameter D. In this way, the gas guide channel 811 may be equivalent to an elastic structural member with compliance.

The elastic structural member has a function of high-frequency filtering and low-frequency transmission. When the exciter 400 drives the backlight board 210 to vibrate at a low frequency, low-frequency sound waves may propagate to the outer side of the gas layer M through the gas guide channel 811. In this case, there is gas exchange between the gas layer M and the atmosphere, thus avoiding the case that the liquid crystal layer is subjected to the greater gas pressure due to a large amplitude during low-frequency vibration. When the exciter 400 drives the backlight board 210 to vibrate at a high frequency, the gas guide channel 811 is equivalent to a sealed channel, and there is no gas exchange between the gas layer M and the atmosphere, such that the sound waves cannot propagate to the outer side of the gas layer M through the gas guide channel 811. However, a vibration amplitude of the backlight board 210 at the high frequency is small, which cannot cause the liquid crystals of the liquid crystal layer to be compressed and deformed.

That is, by arranging a filter structure for communication of the gas layer M with the atmosphere, the display panel 100 can be driven to vibrate and emit sound, and the liquid crystals in the liquid crystal layer can be prevented from being compressed and deformed.

In some embodiments, description is provided by taking an example that the diffusion film 222 is bonded fixedly to the display panel 100 by a double-sided tape. With reference to FIG. 31, the double-sided tape includes a plurality of tapes 812. The tape 812 extends in a length direction of a side edge of the display apparatus 10. The plurality of tapes 812 are arranged at intervals in the length direction of the side edge of the display apparatus. In order to form the gas guide channel 811, the plurality of tapes 812 are arranged in multiple columns in a perpendicular direction of the tapes 812 (for example, two columns in FIG. 31), and ends of two adjacent tapes 812 are staggered in the perpendicular direction of the tapes 812. The equivalent length Y and the equivalent inner diameter D of the gas guide channel 811 are shown in FIG. 31, and a structure of the gas guide channel 811 is simple.

In order to prevent foreign matters such as external dust from entering the gas layer M through the gas guide channel 811, a gas permeable filter 813 is arranged between two adjacent rows of tapes 812. The filter 813 may be a filter screen of sponge or woven from fibers, and the filter 813 may be fixed by the tapes 812.

It can be understood that the gas in the gas layer M may be sealed with a desirable sealed effect, or may be in an incomplete sealed state. For example, in some implementations, the edge of the display panel 100 is hermetically connected to the edge of the backlight board 210, thus forming the sealed gas layer M. In some other implementations, there is no seal between the display panel 100 and the backlight board 210, the gas layer M may be in communication with the outside air through structures such as an assembly gap between components. In yet some other implementations, a specific communication channel may be provided in a lateral gap between the display panel 100 and the backlight board 210, such that a certain filtration effect on vibration transmitted by the gas layer M is achieved while the gas layer M is in communication with the outside air. As long as the gas layer M may normally transmit vibration force of the exciter 400 to make the display panel 100 normally vibrate and emit sound, the sealed state of the gas layer M is not limited herein.

Figure 15:
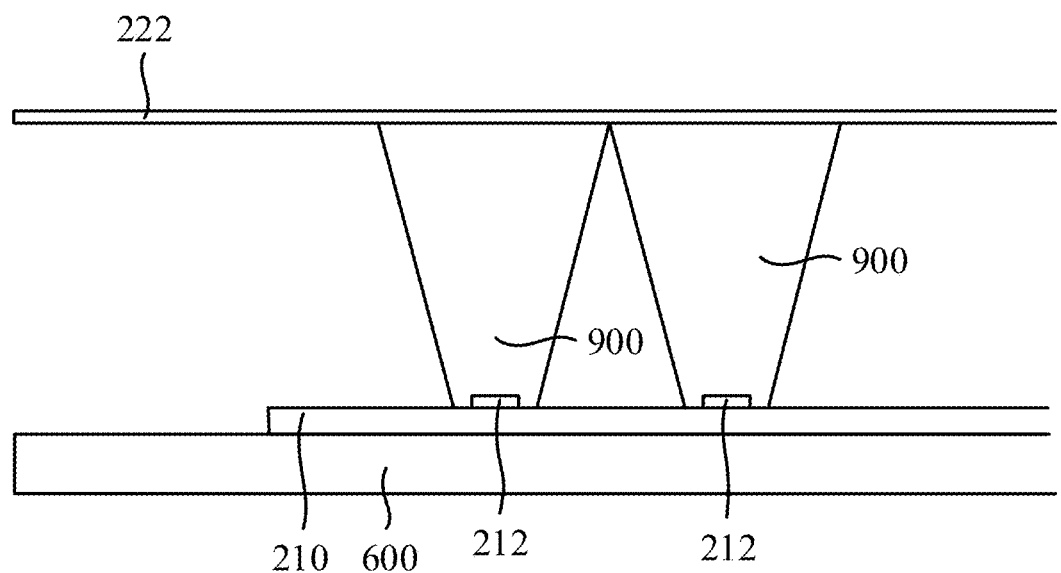
FIG. 15 is yet another schematic structural diagram of a second elastic support member in a display apparatus according to some embodiments of the disclosure.

In some embodiments, with reference to FIG. 15, one end of the second elastic support member 900 may be provided with an accommodation cavity for accommodating the light source 212, so as to cover an outer side of the light source 212; and the other end of the second elastic support member 900 is connected to the diffusion film 222. In this case, the second elastic support member 900 may be made from a silica gel material that transmits light easily, and the hardness of the silica gel material is small. The second elastic support member 900 may be connected to the backlight board body 211 through bonding, snapping-in, etc., or connected to an encapsulation material of the light source 212 through bonding. In order to facilitate scattering of light from the light source 212, an interior of the second elastic support member 900 may be filled with bubbles, silicone, etc., so as to evenly distribute the light.

In some embodiments, a size of a cross section of the second elastic support member 900 may gradually increase from an end of the light source 212 to an end of the diffusion film 222, that is, the second elastic support member 900 has approximately a shape of an inverted cone. In some embodiments, an outer wall surface of the second elastic support member 900 may also be arranged to externally protrude, such that the light emitted by the light source 212 forms total internal reflection in the second elastic support member 900. In some embodiments, the outer wall surface of the second elastic support member 900 may be coated with an optical material. For example, the outer wall surface of the second elastic support member 900 is clad in an elastic silica gel layer, such that the light emitted by the light source 212 forms total internal reflection in the second elastic support member 900 or merely a part (for example, less than 20% of the light) of the light is emitted through a side wall surface of the second elastic support member 900. In this way, through shape design of the second elastic support member 900 or coating design of the second elastic support member 900, an intersection area of illumination regions formed by adjacent light sources 212 on the diffusion film 222 can be made small, and the backlight influence between different light sources 212 can be reduced, that is, the mutual influence between different light control regions can be reduced. For example, in the case of local dimming display, a bright-dark contrast of the display apparatus 10 is desirable.

In some embodiments, the second elastic support member 900 may be connected to the backlight board 210 through negative pressure adsorption, bonding, snapping-in, welding, etc.

In some embodiments, two ends of the second elastic support member 900 may be fixed through any two manners of abutting, bonding, snapping-in and negative pressure adsorption. For example, the two ends of the second elastic support member 900 are bonded to the backlight board 210 and the diffusion film 222 (not shown) respectively, or one end of the second elastic support member 900 is snapped in the backlight board 210 and the other end is bonded to the diffusion film 222 (not shown). Thus, high stability is achieved. In some embodiments, one end of the second elastic support member 900 is bonded to or snapped in the backlight board 210, and the other end abuts against or adsorbed onto the diffusion film 222. Thus, convenient assembly and easy disassembly and assembly as well as maintenance are achieved.

In some embodiments, at least a part of the structure of the second elastic support member 900 is a transparent light guide portion. Illustratively, the light guide portion is composed of a light guide adhesive. The light guide portion has a low light absorption amount and a high light transmittance, and the light guide adhesive has a small hardness, so as to form desirable buffer for the optical film component 220. The light guide portion is configured to conduct the light emitted by the light source 212 towards the display panel 100. In this way, the light guide portion can emit, towards a side of the display panel 100, first light L1 (as shown by a broken line with a hollowed arrow in FIG. 16) that is incident into an interior of the light guide portion. Even if the second elastic support member 900 is arranged at a light-emitting side of the backlight board 210, more first light L1 can be transmitted to the side of the display panel 100, and a light loss is low. That is, when the second elastic support member 900 is correspondingly arranged at a light source 212, at least a part of the light generated by the light source 212 constitutes the first light L1 and is emitted through a corresponding second elastic support member 900.

In this case, the second elastic support member 900 may be arranged at any position of the backlight board 210, for example, the second elastic support member 900 may also be arranged between two adjacent light sources 212.

Figure 16:
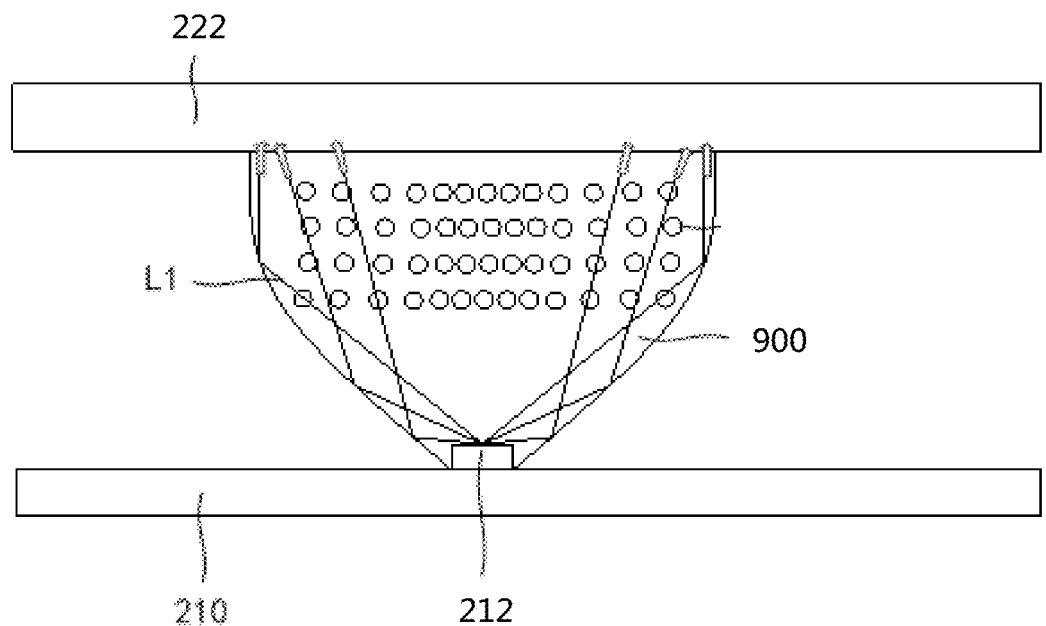
FIG. 16 is still another schematic structural diagram of a second elastic support member in a display apparatus according to some embodiments of the disclosure.

In some embodiments, with reference to FIGS. 15 and 16, the second elastic support member 900 is wrapped around the outer side of the light source 212, and the light guide portion is located between the light source 212 and the display panel 100. That is, one end of the second elastic support member 900 covers the outer side of the light source 212, and the other end of the second elastic support member is connected to the optical film component 220, thereby supporting the optical film component 220, and protecting the light source 212.

In some embodiments, a size of a cross section of the second elastic support member 900 may gradually increase from an end of the light source 212 to an end of the diffusion film 222, that is, the second elastic support member 900 has approximately a shape of an inverted cone. In some embodiments, an outer wall surface of the second elastic support member 900 may also be arranged to externally protrude, such that first light L1 incident into the second elastic support member 900 by the light source 212 forms total internal reflection in the second elastic support member 900 (as shown in FIG. 16). In some embodiments, the outer wall surface of the second elastic support member 900 may be coated with an optical material. For example, the outer wall surface of the second elastic support member 900 is clad in an elastic silica gel layer, such that the light emitted by the light source 212 forms total internal reflection in the second elastic support member 900 or merely a part (for example, less than 20% of the light) of the light is emitted through a side wall surface of the second elastic support member 900.

In this way, through shape design of the second elastic support member 900 or coating design of the second elastic support member 900, an intersection area of illumination regions formed by adjacent light sources 212 on the diffusion film 222 can be made small, and the backlight influence between different light sources 212 can be reduced, that is, the mutual influence between different light control regions can be reduced. For example, in the case of local dimming display, a bright-dark contrast of the display apparatus 10 is desirable.

In some embodiments, the second elastic support member 900 is an elastic plastic member with a low cost. In this case, the second elastic support member 900 is arranged between adjacent light sources 212.

The plurality of second elastic support members 900 include at least two vibration transmission member groups, and second elastic support members 900 in each vibration transmission member group are arranged around the outer side of the corresponding exciter 400. That is, one vibration transmission member group is arranged at the outer side of each exciter 400, and the vibration transmission member group includes a plurality of second elastic support members 900. In this way, the optical film component 220 at a corresponding position of each exciter 400 can be well supported, and the transmission efficiency at the position of each exciter 400 is high.

In some embodiments, each light source is correspondingly provided with one second elastic support member 900, and large ends of two adjacent second elastic support members 900 are in contact with each other.

The second elastic support member 900 may also be connected to the backlight board body 211 of the backlight board 210 and independent of the light source 212. Alternatively, a part of the second elastic support member 900 may cover outside of the light source 212, and a part of the second elastic support member 900 is connected to the backlight board body 211. The embodiment is described below with the second elastic support member 900 connected to the backlight board body 211 as an example.

Figure 8:
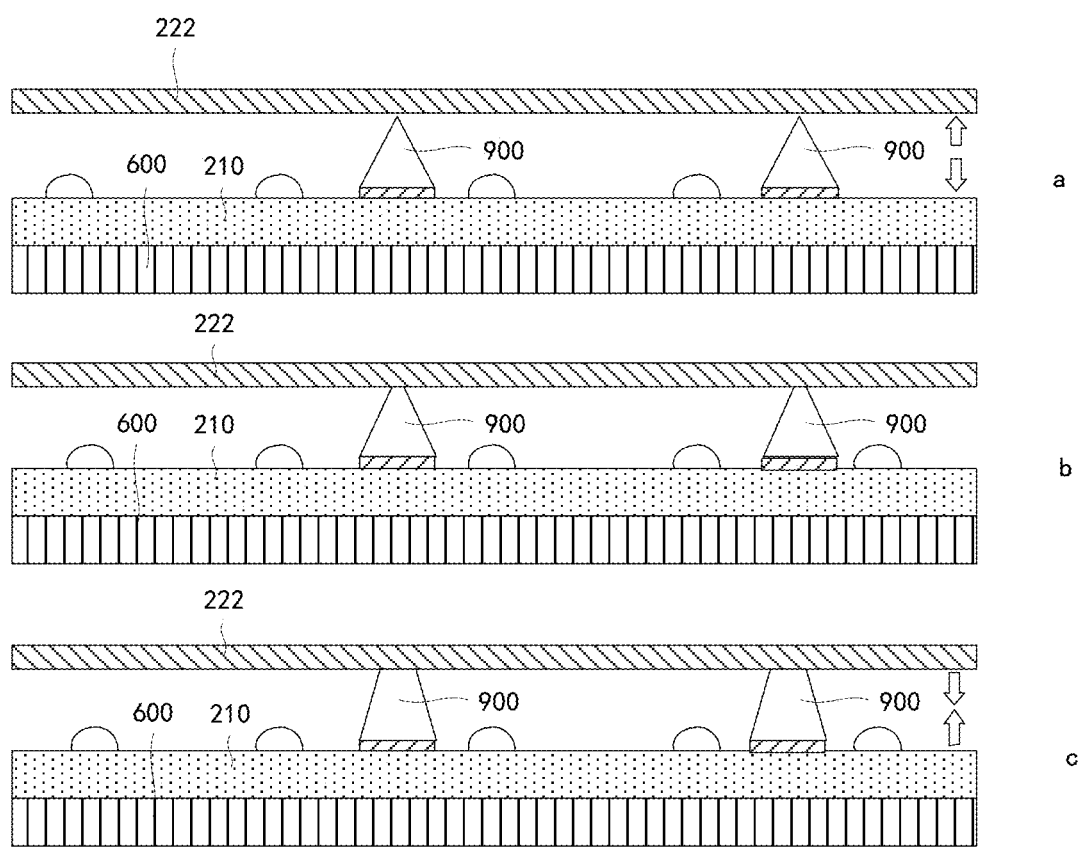
FIG. 8 is a schematic diagram of stretching out and drawing back of a second elastic support member in a gas layer in a display apparatus according to some embodiments of the disclosure.

In some embodiments, when the display apparatus is provided with the second elastic support members 900, the second elastic support members 900 may be sandwiched between the diffusion film 222 and the backlight board body 211 as shown in figure a to figure c in FIG. 8 in order to improve vibration transmission efficiency and avoid collision between the second elastic support members 900 and the diffusion film 222 or between the diffusion film 222 and the backlight board body 211. That is, in a normal state, when the second elastic support member 900 is in a compressed state (with reference to figure b in FIG. 8) and the exciter 400 drives the backlight board 210 to vibrate back and forth, the second elastic support member 900 stretches out and draws back accordingly without separation from the diffusion film 222 or the backlight board body 211, thus avoiding the failure of vibration transmission. That is, when the exciter 400 drives the backlight board 210 to move to a side far away from the diffusion film 222, the second elastic support member 900 stretches out, and in this case, the second elastic support member 900 may be in the natural state (see figure a in FIG. 8) or in the compressed state.

In some embodiments, the height of the second elastic support member 900 in the natural state is greater than the gap of the gas layer M and less than a sum of the vibration amplitude of the actuation member 420 and the gap of the gas layer M. For example, the height of the second elastic support member 900 in the natural state may be a sum of a half of the vibration amplitude of the actuation member 420 and the gap of the gas layer M.

In some embodiments, the shape of the cross section of the second elastic support member 900 may be a circle, an ellipsoid, a square or any other shape. The shape of the second elastic support member 900 may be determined according to a fixation method and the like of the second elastic support member, which is not limited in the embodiments, and has strong applicability.

The second elastic support member 900 may be pressed between the backlight board 210 and the optical film component 220 in an elastic deformation manner. That is, the second elastic support member 900 and the backlight board 210 are not relatively fixed, and the second elastic support member 900 and the diffusion film 222 are not relatively fixed. Thus, the fixation method is simple.

In some embodiments, the second elastic support member 900 may also be fixed. At least one end of the second elastic support member 900 may be fixed. When one end of the second elastic support member 900 is fixed, the second elastic support member 900 may be fixed to the diffusion film 222, and in this case, the other end of the second elastic support member 900 abuts against the backlight board body 211. Alternatively, when the second elastic support member 900 is fixed to the backlight board body 211, the other end of the second elastic support member 900 abuts against the diffusion film 222.

In some embodiments, the second elastic support member 900 may be fixed through bonding (as shown in FIG. 8), snapping-in (as shown in FIGS. 9 and 10), negative pressure adsorption (as shown in FIG. 11), etc.

In some embodiments, when the second elastic support member 900 is fixed through bonding, the second elastic support member 900 may be bonded fixedly by a double-sided tape, a bonding liquid, etc. Illustratively, one end of the second elastic support member 900 is bonded fixedly to the backlight board body 211, and the other end of the second elastic support member abuts against the diffusion film 222 (as shown in FIG. 8).

With consideration of a falling-off risk of the second elastic support member 900 when fixed through bonding, and low assembly efficiency, in some embodiments, the second elastic support member 900 may also be fixed through snapping-in. With consideration of integrity of the diffusion film 222, a snapping-in hole 2111 (as shown in FIGS. 9 and 10) may be provided in the backlight board body 211, and the end of the second elastic support member 900 extends into the snapping-in hole 2111 and is snapped in the snapping-in hole 2111. A shape of the snapping-in hole 2111 may match a shape of the end of the second elastic support member 900.

In some embodiments, when a shape of a section of the second elastic support member 900 is a rectangle, the second elastic support member may be fixed to the snapping-in hole 2111 in an interference fit manner. When a shape of a section of the second elastic support member 900 is a cone or a trapezoid, the snapping-in hole 2111 may be a conical or stepped hole (as shown in FIG. 10). A bore diameter of the snapping-in hole 2111 gradually decreases from an end facing away from the diffusion film 222 to an end close to the diffusion film 222.

An axis of the snapping-in hole 2111 may be perpendicular to the backlight board body 211. In some embodiments, the axis of the snapping-in hole 2111 may also be obliquely arranged (not shown), that is, there is an included angle between the axis of the snapping-in hole 2111 and a perpendicular line of the backlight board body 211. In this case, the shape of the snapping-in hole 2111 may not be limited. In some embodiments, the second elastic support member 900 may be a two-section bent structure. One section of the second elastic support member 900 extends into the inclined snapping-in hole 2111 and is snapped in the snapping-in hole 2111, and the other end of the second elastic support member 900 extends towards the diffusion film 222 in a perpendicular direction of the display apparatus.

In some embodiments, in order to snap the second elastic support member 900 in the backlight board body 211, a fixation sheet 2112 may be laid on the backlight board body 211 (as shown in FIG. 9), and the fixation sheet 2112 may be a metal member or a plastic member. For example, the fixation sheet 2112 is an aluminum sheet; and a via hole is provided at a position, corresponding to the snapping-in hole 2111, of the aluminum sheet. One end of the second elastic support member 900 extends into the snapping-in hole 2111, and the other end of the second elastic support member extends out of the via hole in the fixation sheet 2112 towards the diffusion film 222. A size of the via hole in the fixation sheet 2112 is smaller than a size of the snapping-in hole 2111.

When the snapping-in hole 2111 is provided in the backlight board body 211, a recess depth of the snapping-in hole 2111 may be smaller than a thickness of the backlight board body 211. In some embodiments, the snapping-in hole 2111 may also penetrate the backlight board body 211.

With consideration of a falling-off risk of the second elastic support member 900 when fixed through bonding, and the low assembly efficiency, the second elastic support member 900 may also be fixed through negative pressure adsorption. For example, the two ends of the second elastic support member 900 are adsorbed fixedly onto the backlight board body 211 and the diffusion film 222 (as shown in FIG. 11) respectively. In some embodiments, the end of the second elastic support member 900 is provided with a recessed portion (not shown). A recess depth of the recessed portion, a shape of an inner wall surface of the recessed portion and the like are not limited in the embodiments. For example, the inner wall surface of the recessed portion may be spherical. When in use, the inner wall surface of the recessed portion is mounted on the backlight board body 211 or the diffusion film 222, thus realizing adsorption fixation.

It can be understood that the end of the second elastic support member 900 is deformed correspondingly when the inner wall surface of the recessed portion is adsorbed fixedly onto the backlight board body 211 or the diffusion film 222. In some embodiments, in order to facilitate deformation of the end of the second elastic support member 900, a size of the end of the second elastic support member 900 is large (as shown in FIG. 11). That is, when two ends of the second elastic support member 900 are fixed through negative pressure adsorption, the shape of the section of the second elastic support member 900 may be a dumbbell shape.

In some embodiments, when the recess depth of the snapping-in hole 2111 is smaller than the thickness of the backlight board body 211, the end of the second elastic support member 900 is adsorbed fixedly onto a bottom wall of the snapping-in hole 2111.

In some embodiments, two ends of the second elastic support member 900 may be fixed through any two manners of abutting, bonding, snapping-in and negative pressure adsorption. For example, the two ends of the second elastic support member 900 are bonded to the backlight board body 211 and the diffusion film 222 (not shown) respectively, or one end of the second elastic support member 900 is snapped in the backlight board body 211 and the other end is bonded to the diffusion film 222 (not shown). Thus, high fixation stability is achieved. In some embodiments, one end of the second elastic support member 900 is bonded to or snapped in the backlight board body 211, and the other end abuts against or adsorbed onto the diffusion film 222. Thus, convenient assembly and easy disassembly and assembly as well as maintenance are achieved.

Figure 20:
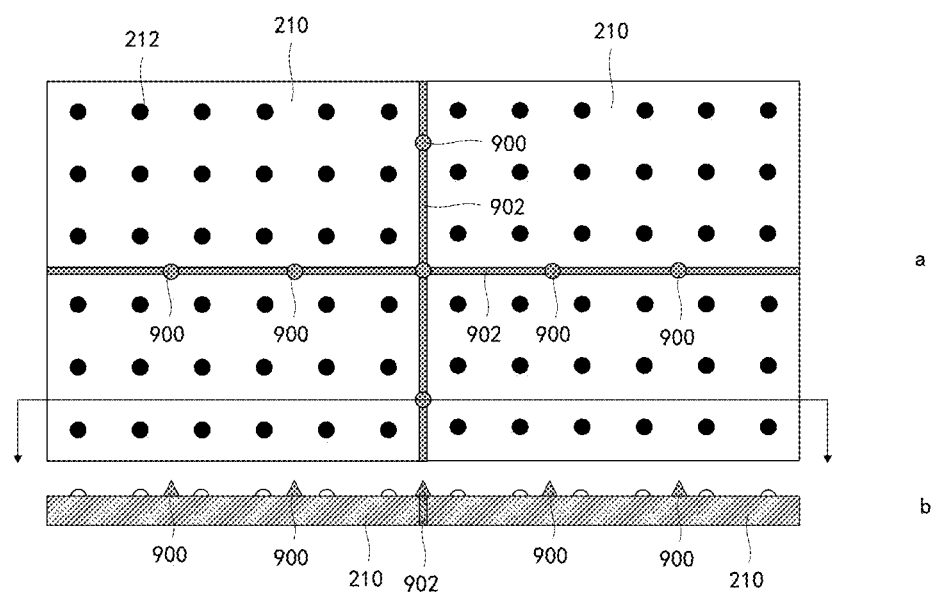
FIG. 20 is a schematic structural diagram of a display apparatus in which a second elastic support member is connected to a first connection member according to some embodiments of the disclosure.

The plurality of second elastic support members 900 are provided. In some embodiments, in order to improve the assembly efficiency of the display apparatus, the plurality of second elastic support members 900 may also be connected into a whole through a first connection member 902 (as shown in FIG. 20). The first connection member 902 may also be made from elastic materials such as silica gel and rubber. In this way, the second elastic support members 900 and the first connection member 902 may be integrally formed. The plurality of second elastic support members 900 may be arranged according to a preset arrangement form. For example, the plurality of second elastic support members 900 are arranged at intervals in multiple rows and multiple columns.

Figure 21:
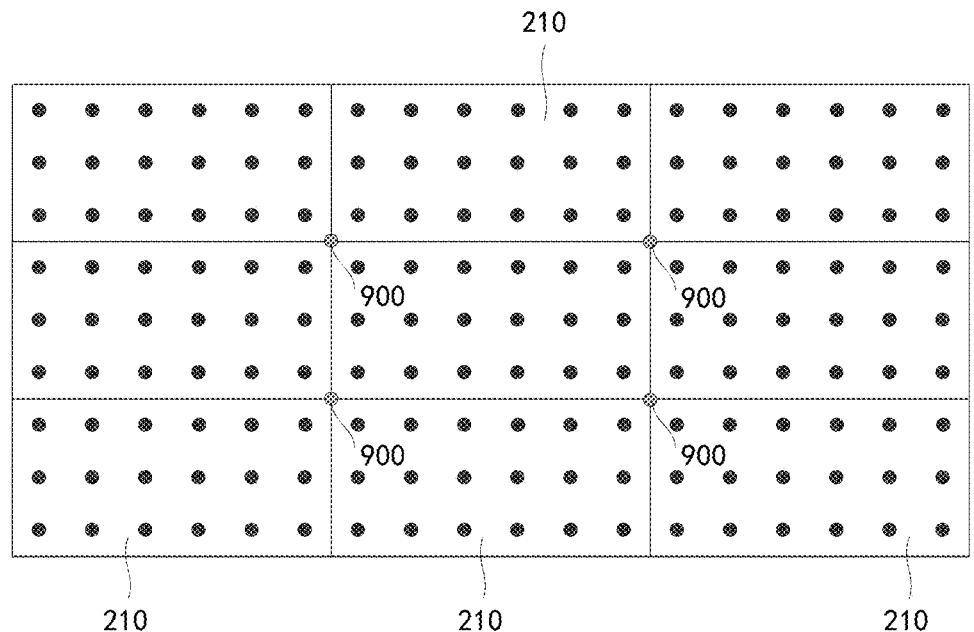
FIG. 21 is a schematic structural diagram of a display apparatus in which a second elastic support member is arranged between two adjacent backlight boards according to some embodiments of the disclosure.
Figure 22:
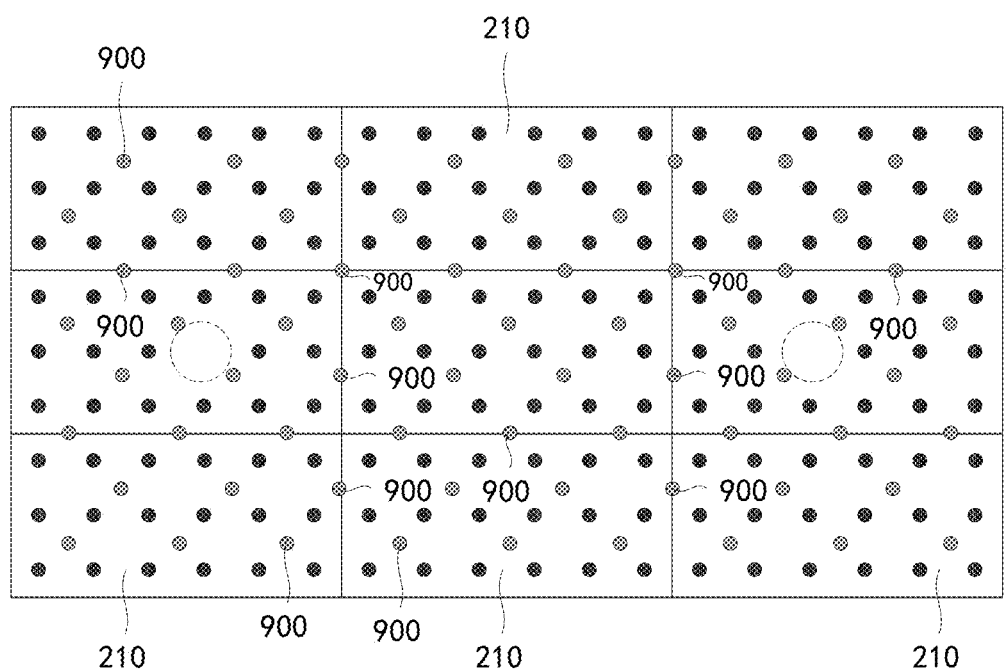
FIG. 22 is another schematic structural diagram of a display apparatus in which a second elastic support member is arranged between two adjacent backlight boards according to some embodiments of the disclosure.

Since the plurality of backlight boards 210 are provided, two adjacent backlight boards 210 may collide and generate noise when the exciters 400 drive the backlight boards 210 to vibrate. In some embodiments, the second elastic support members 900 may be arranged in a gap between any two adjacent backlight boards 210 (as shown in FIGS. 20-22), so as to form buffer between the two adjacent backlight boards 210. For example, the second elastic support members 900 may be arranged at corner positions of any four adjacent backlight boards 210. In this way, a small number of second elastic support members 900 can be used for forming buffer for the backlight boards 210.

Figure 3:
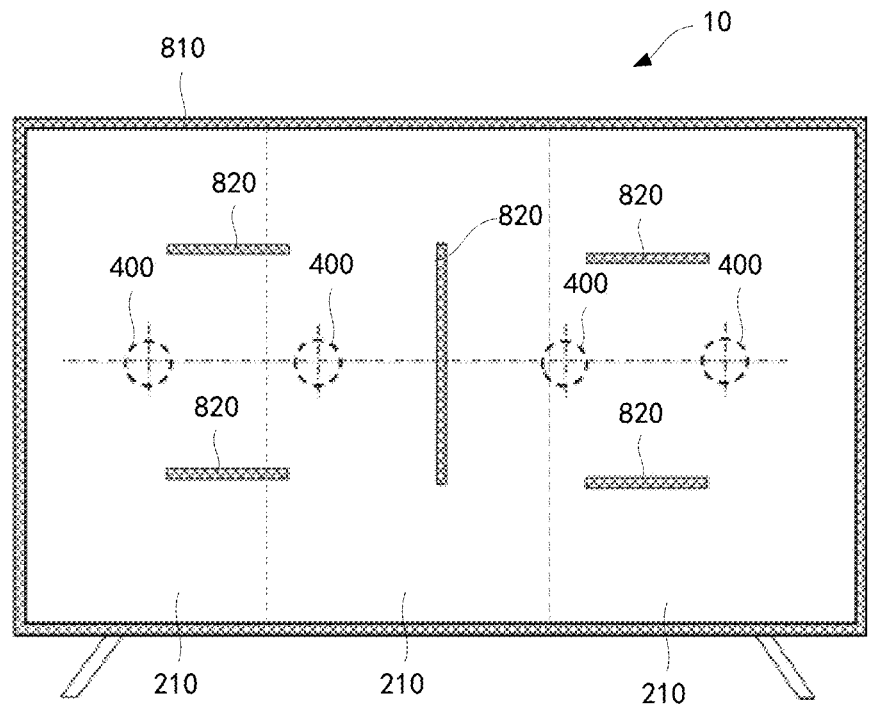
FIG. 3 is a third schematic structural diagram of a display apparatus according to some embodiments of the disclosure.

It can be understood that arrangement positions of the second elastic support member 900 and the first connection member 902 are not limited in the embodiments. The second elastic support member 900 may be separately arranged on the backlight board 210. Alternatively, the second elastic support member 900 may be separately arranged between two adjacent backlight boards 210. Alternatively, the second elastic support members 900 may be arranged at positions of any four adjacent backlight boards 210 (as shown in FIG. 21). In some embodiments, the second elastic support members 900 may also be simultaneously arranged on the backlight board 210 and in the gap between two adjacent backlight boards 210 (as shown in FIG. 3). In this way, a small number of second elastic support members 900 can be used for forming buffer for the backlight boards 210.

In some embodiments, when two adjacent second elastic support members 900 are connected through the first connection member 902, the first connection member 902 is also arranged at a position of the gap between two adjacent backlight boards 210 (as shown in FIG. 20).

It can be understood that arrangement positions of the second elastic support member 900 and the first connection member 902 are not limited in the embodiments. That is, the second elastic support member 900 may be separately arranged on the backlight board 210. The second elastic support members 900 may also be arranged on the backlight board 210 after being integrated with the first connection member 902. The second elastic support member 900 may also be separately arranged between two adjacent backlight boards 210 (as shown in FIG. 21). The second elastic support members 900 may also be arranged between two adjacent backlight boards 210 after being integrated with the first connection member 902. In some embodiments, the second elastic support members 900 may also be simultaneously arranged on the backlight board 210 and between two adjacent backlight boards 210 (as shown in FIG. 22).

Figure 23A:
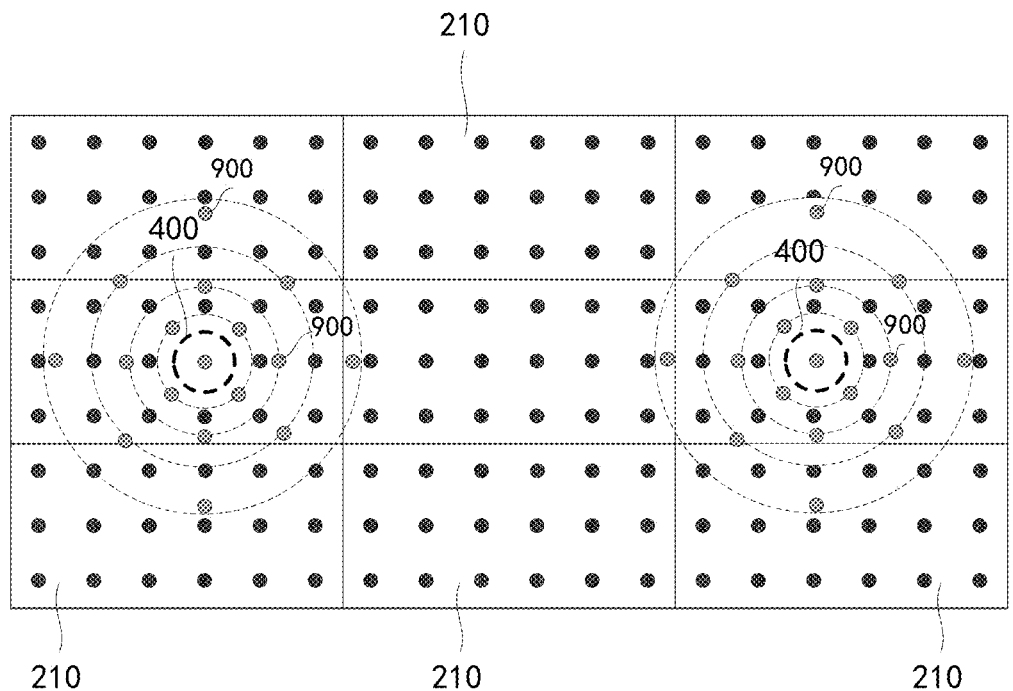
FIG. 23A is a schematic distribution diagram of second elastic support members in a display apparatus according to some embodiments of the disclosure.

The plurality of second elastic support members 900 may be arranged in any direction. For example, the plurality of second elastic support members 900 are arranged radially with the exciter 400 as a center (as shown in FIG. 23A), thus guaranteeing even and reliable support for various positions of the backlight board 210. The closer to the exciter 400 a position is, the greater a vibration amplitude of the backlight board 210 is. The farther from the exciter 400 a position is, the smaller the vibration amplitude of the backlight board 210 is. In some embodiments, the plurality of second elastic support members 900 may also be arranged unevenly, and the arrangement density of the plurality of second elastic support members 900 is greater in the position closer to the exciter 400 (as shown in FIG. 23A). That is, in the position closer to the exciter 400, an arrangement number of the second elastic support members 900 is greater. In the position farther from the exciter 400, the arrangement number of the second elastic support members 900 is smaller. In this way, the number of the second elastic support members 900 can be reduced, different positions of the backlight board 210 can have the uniform vibration amplitudes, and the vibration transmission efficiency is improved.

The hardnesses of different second elastic support members 900 may be the same. Taking into account different vibration amplitudes of the backlight board 210 at different positions, in some embodiments, the hardnesses of the second elastic support members 900 at different positions may also be different. That is, the hardness of the second elastic support member 900 is greater at the position closer to the exciter 400, and the hardness of the second elastic support member 900 is smaller at the position farther from the exciter 400. In this way, the backlight board 210 can have uniform vibration amplitudes at different positions, and the vibration transmission efficiency is improved.

When the second elastic support members 900 are sandwiched between the diffusion film 222 and the backlight board body 211, heights of different second elastic support members 900 may be the same. Taking into account different vibration amplitudes of the backlight board 210 at different positions, in some embodiments, the heights of the second elastic support members 900 at different positions may also be different. That is, the height of the second elastic support member 900 is larger at the position closer to the exciter 400, and a compression amount of the second elastic support member in a natural state is large. The farther from the position of the exciter 400 the second elastic support member is, the smaller the height of the second elastic support member 900 is, and a compression amount of the second elastic support member in a natural state is small. In this way, the backlight board 210 can have uniform vibration amplitudes at different positions, and the vibration transmission efficiency is improved.

In some embodiments, description is provided by taking an example that the optical film component 220 is bonded fixedly to the display panel 100 by a double-sided tape. The double-sided tape includes a plurality of tapes. The tape extends in a length direction of a side edge of the display apparatus 10. The plurality of tapes are arranged at intervals in the length direction of the side edge of the display apparatus.

Figure 23B:
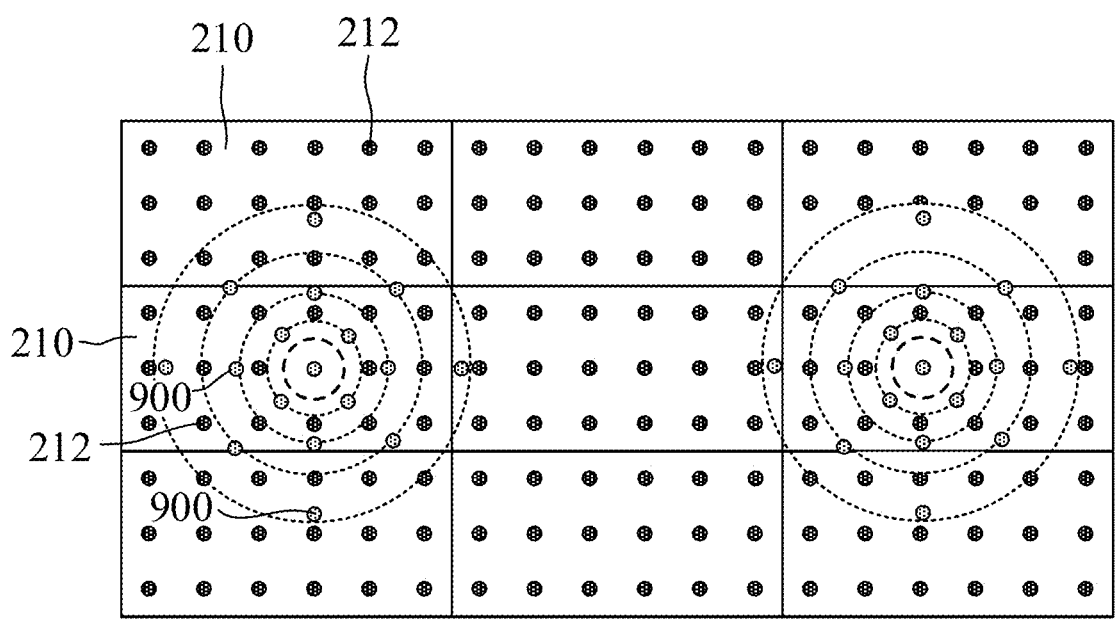
FIG. 23B is a schematic diagram of a first arrangement of second elastic support members arranged on a plurality of backlight boards in a display apparatus according to some embodiments of the disclosure.

FIG. 23B is a schematic diagram of a first arrangement of second elastic support members arranged on a plurality of backlight boards in a display apparatus according to some embodiments of the disclosure.

Illustratively, as shown in FIG. 23B, a plurality of second elastic support members 900 are arranged around the exciter 400, that is, a plurality of vibration transmission components are arranged around the exciter 400. A shape of an arrangement of the plurality of second elastic support members 900 may be a circular ring (as shown in FIG. 3), a square ring (not shown), etc. With the plurality of second elastic support members 900 arranged in a circular ring shape as an example, a plurality of ring structures may be arranged at the outer side of the exciter body 410. The number of the second elastic support members 900 arranged in each ring structure and the number of circular rings may be set according to demand.

A distribution center of the plurality of second elastic support members 900 arranged in the ring structure may be staggered from a center of the exciter body 410 (not shown). In some embodiments, the plurality of second elastic support members 900 are radially arranged with the exciter body 410 as a center, that is, a plurality of columns of second elastic support members 900 are peripherally arranged symmetrically with the exciter body 410 as the center, which is simple in the shape of the arrangement, and is low in the assembly difficulty and an assembly cost.

In this arrangement, the supporting force generated by the second elastic support members 900 is in different directions and positions. Thus, various positions of the backlight board 210 can be supported, and a reliable and uniform supporting effect may be achieved.

Optionally, as shown in FIG. 23B, the plurality of second elastic support members 900 are radially arranged at an outer side of the periphery of the exciter 400.

In an optional implementation, an arrangement interval between the plurality of the second elastic support members 900 increases as the distance between the second elastic support member 900 and the exciter 400 increases; and/or, the support intensities of the second elastic support members 900 on the display panel 100 decrease as the distance between the second elastic support member 900 and the exciter 400 increases.

It can be understood that this implementation includes three ways to adjust the vibration intensity of the second elastic support member.

As shown in FIG. 23B, a first way is to adjust the support intensities at different positions of the backlight board 210 by adjusting the arrangement interval between the second elastic support members 900, that is, adjusting the arrangement density of the second elastic support members 900 around the exciter 400. The arrangement number in a unit area of the second elastic support members 900 is larger at the position closer to the exciter 400, that is, the interval between different second elastic support members 900 is smaller. However, the arrangement number in a unit area of second elastic support members 900 is smaller at the position farther from the exciter 400, that is, the interval between different second elastic support members 900 is larger. In this arrangement, on one hand, the support intensity of the vibration transmission component is adjusted according to the vibration amplitude of the backlight board 210, and the second elastic support members 900 are appropriately arranged at different positions. Thus, an arrangement process of the second elastic support members 900 can be simplified and the production efficiency can be improved. On the other hand, the backlight board 210 has uniform vibration amplitudes at different positions, and the vibration transmission efficiency is improved.

Figure 23C:
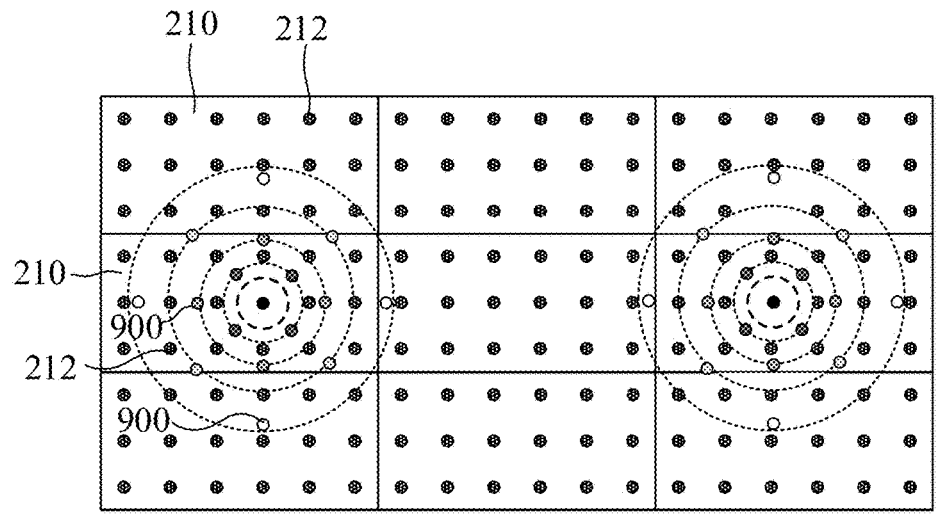
FIG. 23C is a schematic diagram of a second arrangement of second elastic support members arranged on a plurality of backlight boards in a display apparatus according to some embodiments of the disclosure.

FIG. 23C is a schematic diagram of a second arrangement of second elastic support members arranged on a plurality of backlight boards in a display apparatus according to some embodiments of the disclosure.

As shown in FIG. 23C, a second way is to adjust the support intensities on different positions of the backlight board 210 by changing a support intensity of each second elastic support member 900 itself. That is, in a region closer to the exciter 400, the support intensity of each second elastic support member 900 is higher; and in a region farther from the exciter 400, the support intensity of each second elastic support member 900 is lower. Thus, the support intensity is adjusted according to the vibration amplitudes of the backlight board 210 at different regions. It should be noted that the change in the support intensity of the second elastic support member 900 depends on parameters such as the hardness and the height of the second elastic support member. Thus, different positions of the backlight board 210 have uniform vibration amplitudes, and the vibration transmission efficiency is improved. In FIG. 23C, different filling patterns denote the second elastic support members 900 with different hardnesses. A decrease in a filling density of the second elastic support members 900 from an inner ring to an outer ring denotes a decrease in the hardness of the second elastic support member 900.

In some embodiments, the support intensity of the second elastic support member 900 on the display panel increases as a distance between the second elastic support member and the exciter increases.

A third way is to adjust the support intensities at different positions of the backlight board 210 by combining the above two ways. With consideration of both the number of second elastic support members 900 and the support intensities of second elastic support members themselves, the number of second elastic support members 900 can be further reduced, a structure of the entire vibration transmission component can further simplified, and process difficulty can be reduced.

Illustratively, for the adjustment way of the support intensities of the second elastic support members 900 themselves, the second elastic support members 900 can satisfy at least one of the following conditions.

Firstly, a cross-sectional area of the second elastic support member 900 decreases in a direction parallel to the display panel 100 as the distance between the second elastic support member 900 and the exciter 400 increases. That is, the support intensity of the second elastic support member 900 is changed by adjusting a radial size of the second elastic support member 900. At a position closer to the exciter 400, the cross-sectional area of the second elastic support member 900 is greater, and at a position farther from the exciter 400, the cross-sectional area of the second elastic support member 900 is smaller.

Secondly, a rigidity of the second elastic support member 900 decreases as the distance between the second elastic support member 900 and the exciter 400 increases. The rigidity of the second elastic support member 900 is determined by a material of the second elastic support member 900. The rigidity of the second elastic support member 900 closer to the exciter 400 is greater. The rigidity of the second elastic support member 900 farther from the exciter 400 is smaller. Based on this, the support intensity of the second elastic support member 900 is adjusted.

Thirdly, the second elastic support member 900 is connected between the backlight board 210 and the display panel 100 in an interference manner, and a magnitude of interference between the second elastic support member 900 and the backlight board 210 in a direction perpendicular to the backlight board 210 decreases as the distance between the second elastic support member 900 and the exciter 400 increases. It can be understood that the greater the magnitude of interference of the second elastic support member 900 is, the higher the support intensity of the second elastic support member 900 on the backlight board 210 is. The smaller the magnitude of interference of the second elastic support member 900 is, the lower the support intensity of the second elastic support member 900 on the backlight board 210 is. Thus, the support intensities at different positions of the backlight board 210 are adjusted. The magnitude of interference decreases as the distance between the second elastic support member 900 and the exciter 400 increases. That is, at a position closer to the exciter 400, the support intensity of the second elastic support member 900 is higher. At a position farther from the exciter 400, the support intensity of the second elastic support member 900 is lower.

In an optional implementation, the magnitude of interference may also be adjusted based on the height of the second elastic support member 900. The height, in the direction perpendicular to the backlight board 210, of the second elastic support member 900 in a natural state gradually decreases from a side close to the exciter 400 to a side far away from the exciter 400. That is, at a position closer to the exciter 400, the height of the second elastic support member 900 is larger, and a compression amount in the natural state is greater. At a position farther from the exciter 400, the height of the second elastic support member 900 is smaller, and the compression amount in the natural state is smaller. In this way, different positions of the backlight board 210 have uniform vibration amplitudes, the vibration transmission efficiency is improved, and audio quality is improved. In addition, this arrangement also avoids the non-interference fit of the second elastic support member 900 at a position close to the exciter 400 due to an assembly tolerance of the second elastic support member 900 far away from the exciter 400, such that a reliable support intensity of the second elastic support member 900 close to the exciter 400 is guaranteed.

It is clear that the various ways may be arbitrarily combined. Illustratively, when the plurality of second elastic support members 900 are uniformly arranged, the second elastic support members 900 at different positions may be set to have different hardnesses. When the plurality of second elastic support members 900 are non-uniformly arranged, the second elastic support members 900 at different positions may be set to have different hardnesses and different heights.

Figure 13:
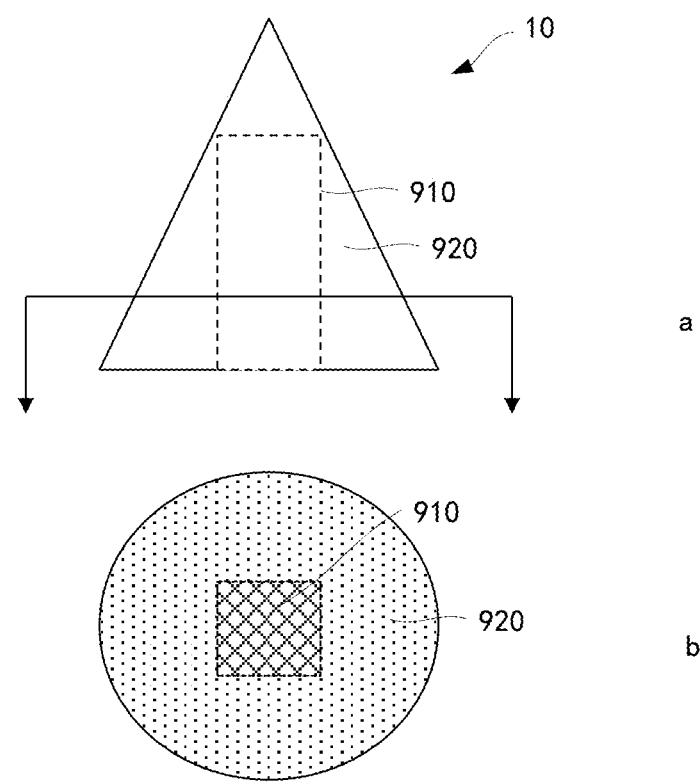
FIG. 13 is a schematic structural diagram of a second elastic support member in a display apparatus according to some embodiments of the disclosure.
Figure 14:
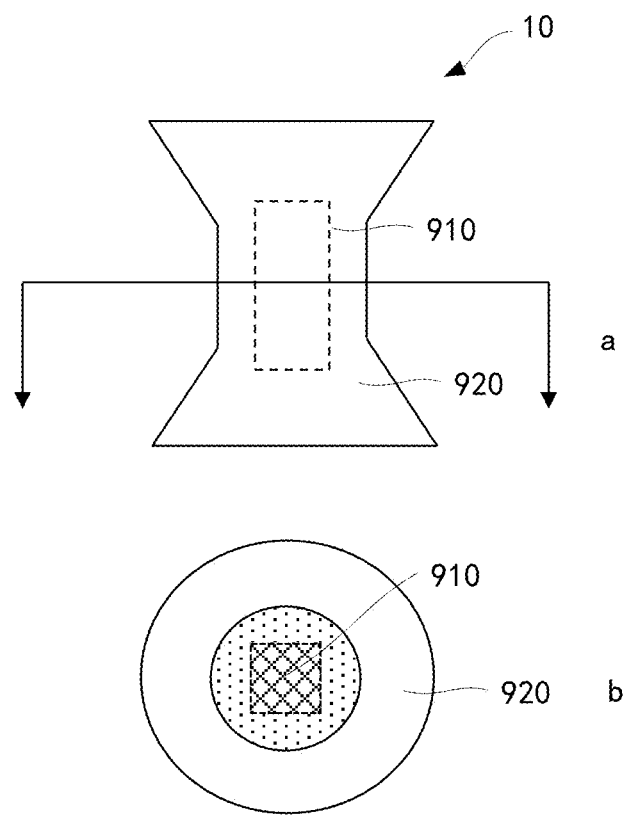
FIG. 14 is another schematic structural diagram of a second elastic support member in a display apparatus according to some embodiments of the disclosure.

When the display apparatus works, an internal temperature of the display apparatus may change, and materials such as silica gel and rubber may age along with the temperature change, which leads to reduction of a buffer effect, a decrease in the support intensity and a decrease in the vibration transmission efficiency of the second elastic support member 900. In some embodiments, the second elastic support member 900 may also have a composite structure. With reference to FIGS. 13 and 14, figure a in FIG. 13 and figure a in FIG. 14 are side views of the second elastic support member 900. Figure b in FIG. 13 is a sectional view of figure a in FIG. 13, and figure b in FIG. 14 is a sectional view of figure a in FIG. 14. The second elastic support member 900 includes a support element 910 and an elastic element 920. The support element 910 is a non-elastic element, and its deformation is insensitive to a temperature. For example, the support element 910 is made of metal or plastic, and the elastic element 920 may be made from silica gel or rubber. In this way, the second elastic support member 900 is less affected by the temperature, and has a stable support intensity. Thus, the vibration transmission efficiency is high.

The elastic elements 920 may be arranged at two ends of the support element 910, and the two elastic elements are connected to the backlight board body 211 and the diffusion film 222 respectively.

In some embodiments, a part of an outer wall surface of the support element 910 may be clad in the elastic element 920. The elastic element 920 is connected to the diffusion film 222; and a portion, exposed outside the elastic element 920, of the support element 910 is connected to the backlight board body 211.

When the support element 910 is a metal element, the backlight board body 211 is provided with a metal solder joint, and is in welded connection to the support element 910. Thus, the fixation stability is desirable, a solder process is mature, and the efficiency of assembly of the second elastic support member 900 and the backlight board body 211 is high.

In some embodiments, different exciters 400 may be arranged in different sound channels, and the exciters 400 of different sound channels may vibrate separately. Then, in order to reduce vibration influence between different exciters 400, two adjacent exciters may be isolated by a whole formed by a second elastic support member 900 and a first connection member 902. For the convenience of description, the whole formed by the second elastic support member 900 and the first connection member 902 may be referred to as an isolation bar 903, and the isolation bar 903 is arranged between two adjacent exciters 400. One or more isolation bars 903 may be between two adjacent exciters 400 (as shown in FIGS. 28 and 29).

In some embodiments, when a plurality of isolation bars 903 are arranged between two adjacent exciters 400, second elastic support members 900 in two adjacent isolation bars 903 may be arranged oppositely or staggered, so as to gradually weaken vibration transmission.

Figure 28:
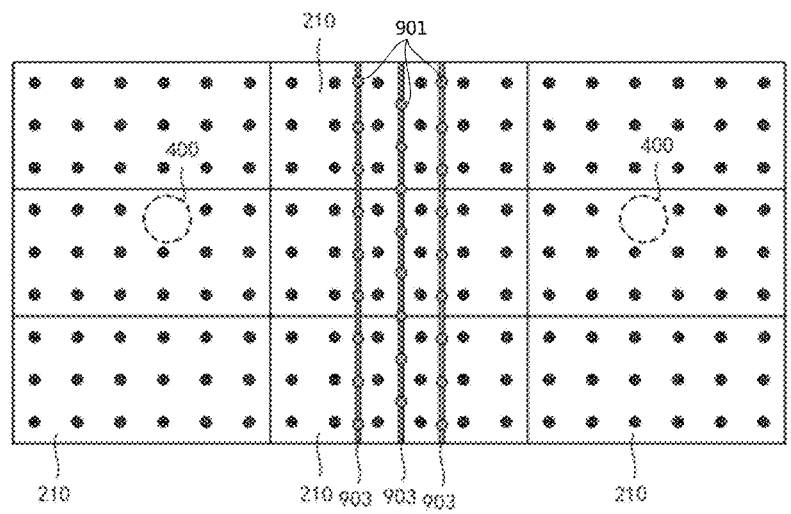
FIG. 28 is a schematic structural diagram of a backlight board and an isolation bar in a display apparatus according to some embodiments of the disclosure.
Figure 29:
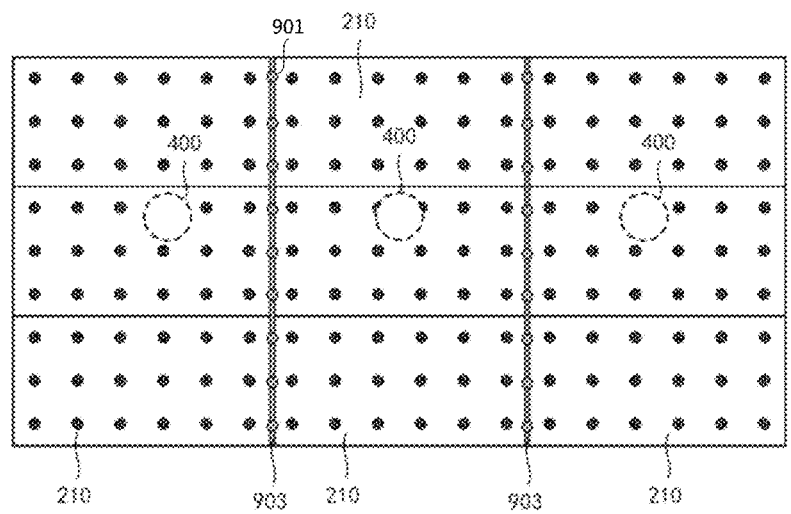
FIG. 29 is another schematic structural diagram of a backlight board and an isolation bar in a display apparatus according to some embodiments of the disclosure.

In the embodiments, the number of sound channels is not limited, for example, a left sound channel and a right sound channel in FIG. 28; or a left channel, a middle channel and a right channel in FIG. 29. Any two adjacent exciters 400 may be isolated by isolation bars 903.

In some embodiments, when two adjacent exciters 400 are isolated by the isolation bar 903, the second elastic support members 900 may also be arranged at a peripheral position of any exciter 400.

Figure 17:
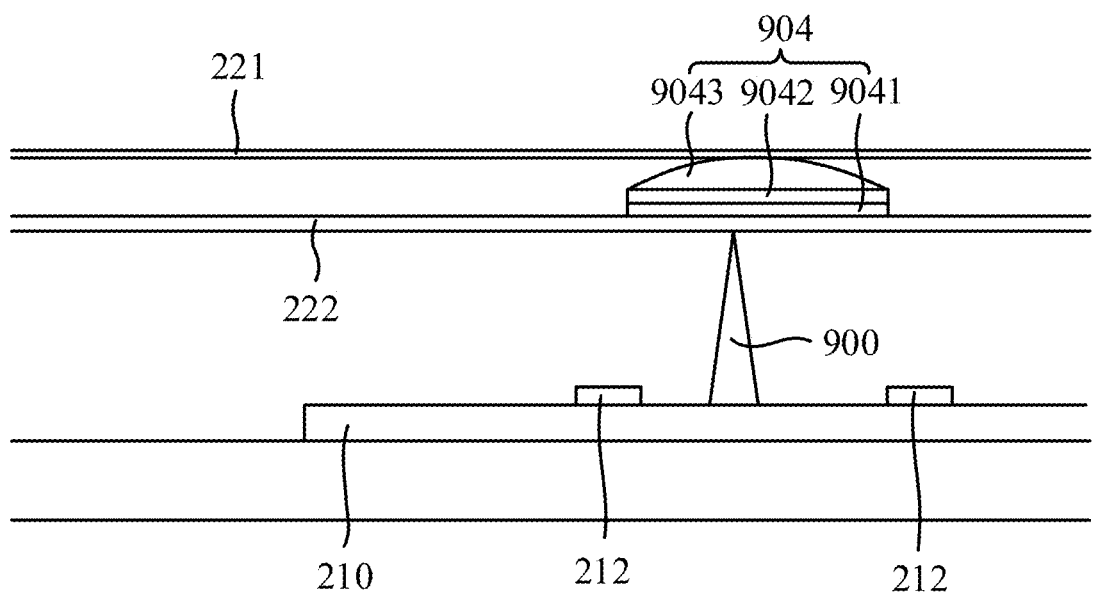
FIG. 17 is a schematic structural diagram of a display apparatus in which an anti-wear member is arranged between a diffusion film and a fluorescent film according to some embodiments of the disclosure.

In some embodiments, with reference to FIG. 17, since the second elastic support member 900 is arranged between the diffusion film and the backlight board body 211, in order to avoid wearing of the optical film component 220 during the vibration of the exciter 400, an anti-wear member 904 may be arranged in the optical film component 220. The anti-wear member 904 may be arranged between the diffusion film 222 and the fluorescent film 221, so as to separate the diffusion film 222 from the fluorescent film 221.

In some embodiments, the anti-wear member 904 may be made from polyethylene glycol terephthalate (PET), and the PET is provided with a coating that may refract and reflect light, to refract and reflect light. That is, a light intensity at the position where the anti-wear member 904 is located can be controlled by designing a shape and a structure of the anti-wear member 904.

In this way, light uniformity and light control effects on the display apparatus 10 can be achieved. For example, the anti-wear member 904 is arranged between two adjacent light sources 212, and a low brightness of a region between two adjacent light sources 212 is avoided. In some embodiments, a preset view angle range of the display apparatus 10 may have a preset brightness. For example, a brightness within a range of 35 degrees is high when the display apparatus 10 is viewed from a front, and a brightness within a range greater than 45 degrees is lower. In some embodiments, an optical barrier effect may also be formed. That is, an intersection area of illumination regions formed by adjacent anti-wear members 904 at a front side of the diffusion film 222 is small, and backlight influence between different anti-wear members 904 is reduced, that is, the mutual influence between different light control regions is reduced. For example, in the case of local dimming display, a bright-dark contrast of the display apparatus 10 is desirable.

It can be understood that, in order to avoid wearing of the optical film component 220, contact positions of the anti-wear member 904 with the diffusion film 222 and the fluorescent film 221 are free of a sharp angular structure. For example, contact surfaces of the anti-wear member 904 with the diffusion film 222 and the fluorescent film 221 are flat surfaces or cambered surfaces. The cambered surface protrudes towards a side of the fluorescent film 221. In this way, the anti-wear member 904 may approximately form a convex lens structure, is configured to converge the light emitted by the light source 212, and has an effect of reducing the view angle. Thus, the problem that the view angle is enlarged and the brightness is reduced after bonding the fluorescent film 221 to the diffusion film 222 is solved.

In some embodiments, the anti-wear member 904 may be a multi-layer structure. The anti-wear member 904 includes a plurality of first light processing layers stacked in sequence, and refractive indexes of the first light processing layers are set unequally. For example, three first light processing layers may be arranged: a first layer 9041, a second layer 9042 and a third layer 9043. The first layer 9041, the second layer 9042 and the third layer 9043 may be fixedly bonded by an optically clear adhesive (OCA). A thickness of any one of the first layer 9041, the second layer 9042 and the third layer 9043 may be 1 micron to 3 microns. The first layer 9041 and the second layer 9042 may be sheet-like, and the third layer 9043 has a cambered light-emitting surface. The refractive indices of the first layer 9041, the second layer 9042 and the third layer 9043 are different. For example, the refractive index of the first layer 9041 may be 1.5 and the refractive index of the second layer 9042 may be 2.2, such that partial light is emitted through the cambered light-emitting surface of the anti-wear member 904, and partial light is emitted at a preset angle after being repeatedly refracted and reflected by the anti-wear member 904.

Figure 18:
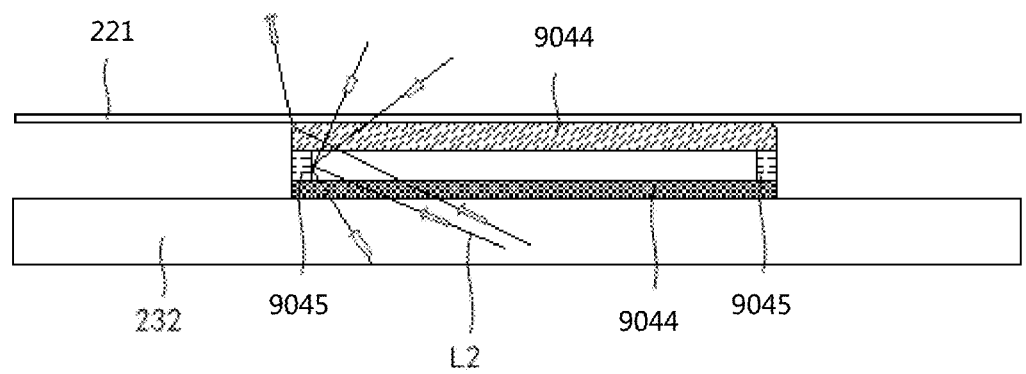
FIG. 18 is another schematic structural diagram of a display apparatus in which an anti-wear member is arranged between a diffusion film and a fluorescent film according to some embodiments of the disclosure.
Figure 19:
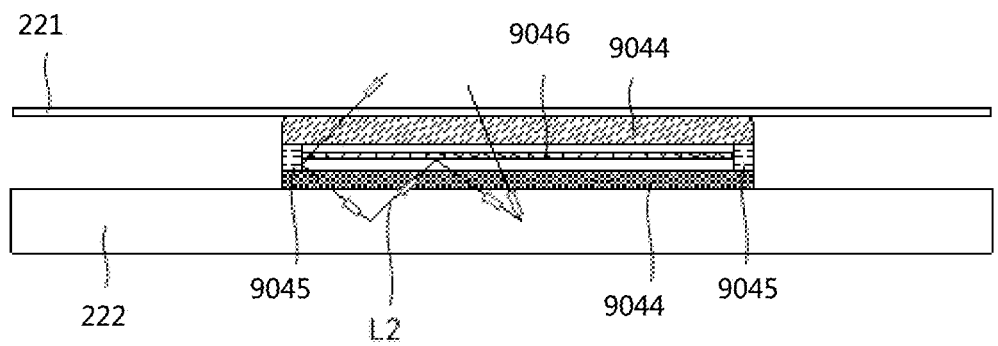
FIG. 19 is yet another schematic structural diagram of a display apparatus in which an anti-wear member is arranged between a diffusion film and a fluorescent film according to some embodiments of the disclosure.

In some embodiments, with reference to FIGS. 18 and 19, the anti-wear member 904 may further include a second light processing layer and an optical member 9045. The second light processing layer may include two OCA layers 9044. The two OCA layers 9044 are mounted fixedly on the fluorescent film 221 and the diffusion film 222 respectively. The two OCA layers are separated by the optical member 9045, for reflecting second light L2 (as shown by broken lines with hollowed arrows in FIGS. 18 and 19) incident into the anti-wear member 904 towards the fluorescent film 221. The material of the optical member 9045 is polymethyl methacrylate (PMMA), polycarbonate (PC), etc.

In this way, the light emitted by the light source 212 is incident in a gap between the two OCA layers 9044 through one of the OCA layers 9044 and emitted out through the other OCA layer 9044. The optical member 9045 may reflect the second light L2 in the two OCA layers 9044, such that the second light L2 may be reflected in the gap between the two OCA layers 9044 and emitted out through the other OCA layer 9044. That is, the second light L2 formed by at least part of light generated by a certain light source 212 is emitted out through a corresponding anti-wear member 904, thus reducing influence on other illumination regions, and achieving the "optical barrier" effect.

In some embodiments, a filter 9046 may also be arranged in the gap between two OCA layers 9044, and the material of the filter 9046 may be PET. The filter 9046 is configured for reflecting large-angle light emitted by the light source 212 towards a side of the diffusion film 222, and the light is emitted again towards the display panel 100 after being processed by the optical film component 220, such that angles of the light emitted at a position where the OCA layers 9044 are located are concentrated.

In some embodiments, each exciter 400 may be correspondingly provided with one anti-wear member 904. In some embodiments, each light source 212 may also be correspondingly provided with one anti-wear member 904. Thus, intervals between the diffusion film 222 and the fluorescent film 221 at different positions are uniform and contact wearing is avoided.

It can be understood that an effect of the low-frequency sound of the display apparatus 10 is positively related to a volume of air that can be pushed by the exciter 400. Since the exciter 400 may drive an entire display region of the display panel 100 to vibrate and emit sound, an area of a vibration portion of the display panel 100 is large, a large volume of air can be pushed, and the display apparatus 10 can emit desirable low-frequency sound.

For any flat panel, under the condition that a geometric size is determined, the panel has infinite multi-order mode frequencies, and a mode frequency formula of flat panel vibration is as follows:

$$f_{mn} = \frac{\left(\frac{m\pi}{a}\right)^2 + \left(\frac{n\pi}{b}\right)^2}{2\pi \cdot \sqrt{\frac{\rho h}{D}}}, m, n = 1, 2, 3... \quad (1)$$

here, a and b denote a length and a width of the flat panel, ρ denotes a density of the flat panel, h denotes a thickness of the flat panel, and d denotes a bending strength of the flat panel.

The smaller the first-order mode frequency f11 of the flat panel is, the lower a sound wave frequency emitted by the flat panel is, and the better the low-frequency sound effect of the display apparatus 10 is.

It can be understood that the display panel 100 and the backlight module 200, as a whole flat panel structure, have a large weight, which is equivalent to a large equivalent density ρ of the flat panel structure. It can be seen from the formula (1) that the first-order mode frequency f11 decreases when ρ increases, and hence, the exciter 400 can excite the low-frequency sound with better sound effects.

In some embodiments, with reference to FIGS. 33-43, the actuation member 420 may also be connected to the rear shell 500, for example, the actuation member 420 is bonded to, screwed to or snapped in the rear shell 500. In this way, during vibration of the actuation member 420, the rear shell 500 may be synchronously driven to vibrate and emit sound, so as to increase a sound intensity of the display apparatus 10.

In some embodiments, in order to improve connection stability between the actuation member 420 and the rear shell 500, a mounted element 421 may be arranged on the actuation member 420. The mounted element 421 is mounted to the rear shell 500, such as bonding. The mounted element 421 is light in weight and high in strength, and may be made of metal, plastic, etc.

With consideration of different strengths of different positions of the rear shell 500 and different mounting positions of the exciters 400, the vibration amplitudes of the rear shell 500 at different positions at the periphery of the actuation member 420 are different when the actuation member 420 drives the rear shell to vibrate. Illustratively, in FIGS. 33 and 34, a right side of the exciter 400 is close to a position of an edge of the rear shell 500, and a vibration amplitude of the rear shell 500 at the right side of the exciter 400 is smaller than a vibration amplitude of the rear shell 500 at a left side of the exciter 400. In this way, a direction of reaction force of the rear shell 500 on the actuation member 420 is caused to be in an inclined state, causing the actuation member 420 to incline. The actuation member 420 cannot reciprocate in a perpendicular direction of the display apparatus 10, and the exciter 400 is further caused to emit abnormal noise.

Figure 35:
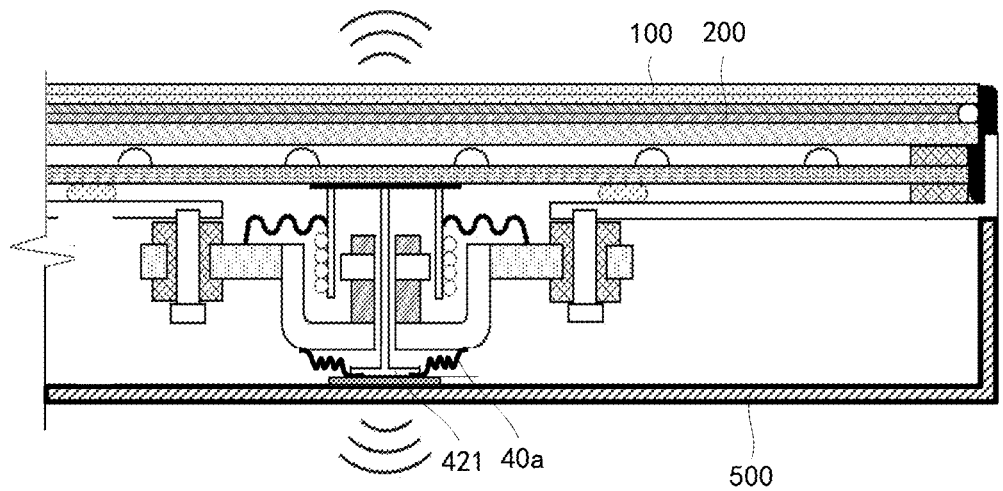
FIG. 35 is a schematic structural diagram of arranging a vibrating stabilization member in FIG. 33.
Figure 36:
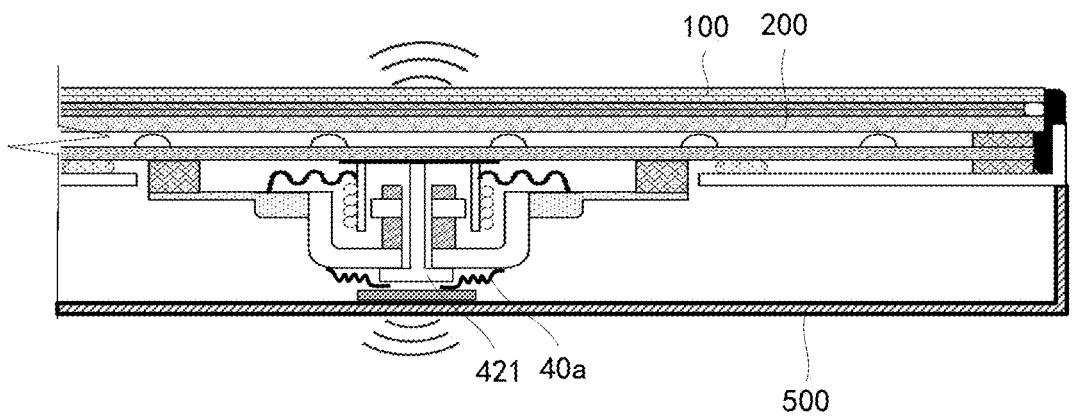
FIG. 36 is a schematic structural diagram of arranging a vibrating stabilization member in FIG. 34.
Figure 37:
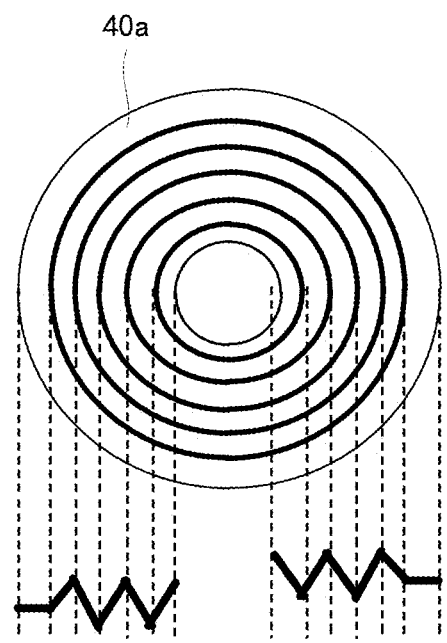
FIG. 37 is a schematic structural diagram of a vibrating stabilization member in a display apparatus according to some embodiments of the disclosure.
Figure 38:
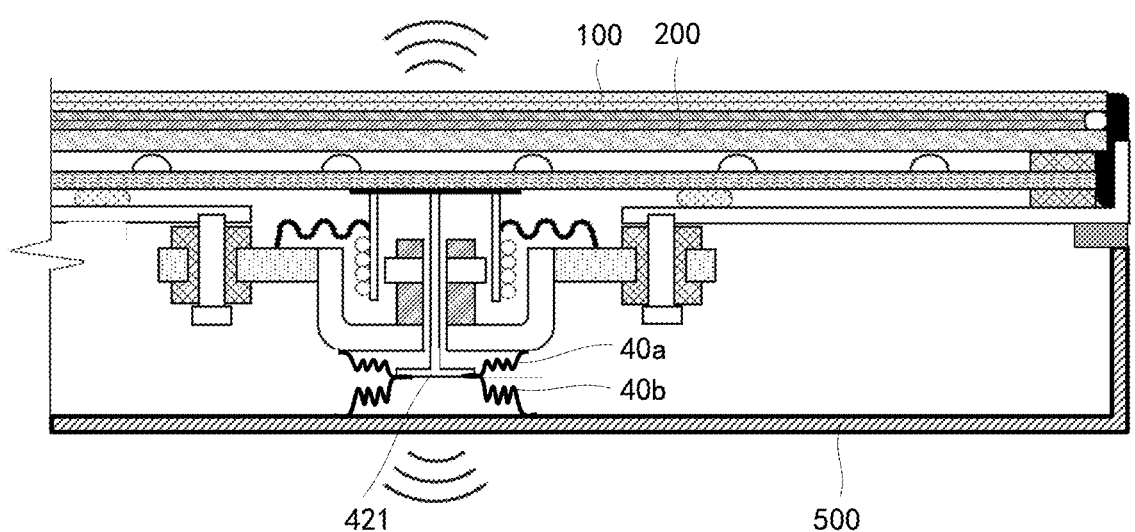
FIG. 38 is a schematic structural diagram of arranging an elastic filtration member in FIG. 31.
Figure 39:
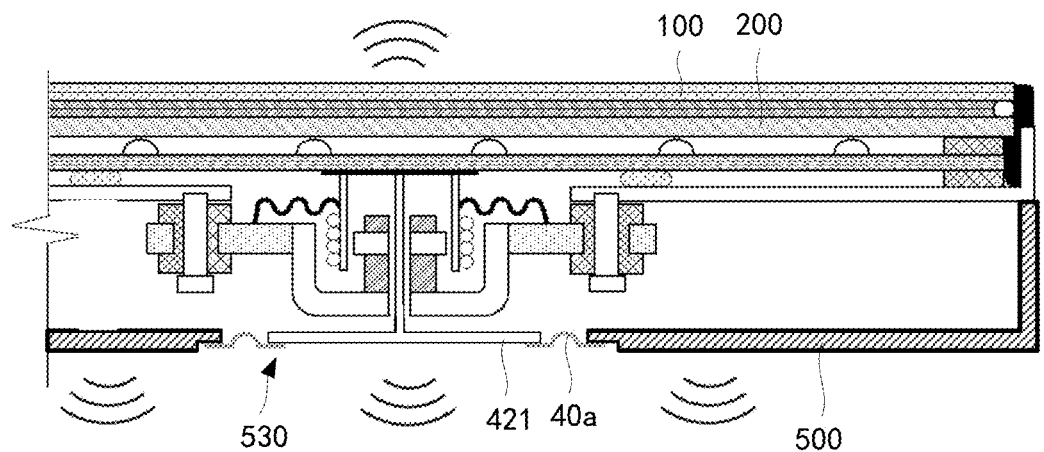
FIG. 39 is another schematic structural diagram of arranging the elastic filtration member in FIG. 31.
Figure 40:
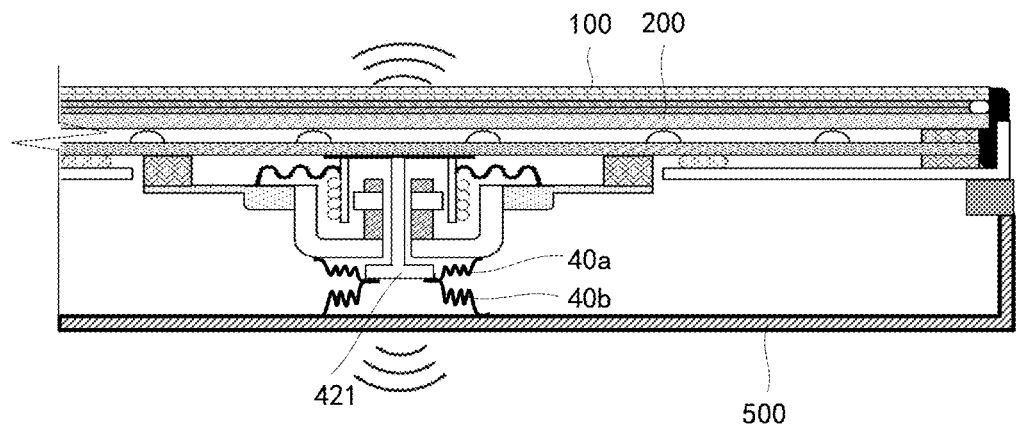
FIG. 40 is a schematic structural diagram of arranging an elastic filtration member in FIG. 34.
Figure 41:
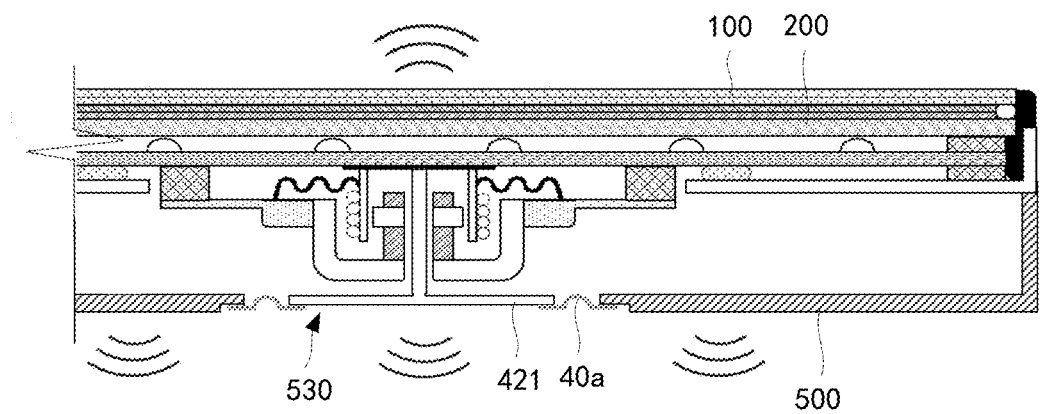
FIG. 41 is another schematic structural diagram of arranging the elastic filtration member in FIG. 34.

In some embodiments, with reference to FIGS. 35-37, the exciter 400 may be provided with a vibrating stabilization member 40a. The vibrating stabilization member 40a connects the exciter body 410 to the actuation member 420. The vibrating stabilization member 40a has elasticity, and may be a spring, a rubber member, etc. In some embodiments, an elastic deformation capacity of the vibrating stabilization member 40a may also be implemented through bending, thinning, etc. For example, the vibrating stabilization member 40a has an annular sheet structure. The annular sheet structure is arranged around the outer side of the actuation member 420. A shape of a cross section of the annular sheet structure may be a wave or a zigzag by at least bending the annular sheet structure once.

In order to prevent the actuation member 420 from inclining, elastic force of the vibrating stabilization member 40a at different positions at the periphery of the actuation member 420 is different. For example, at a left side of FIG. 35 and FIG. 36, the elastic force of the vibrating stabilization member 40a is large, to limit the vibration amplitude at the left side of the actuation member 420. In this way, force at different positions at the periphery of the actuation member 420 is balanced and can reciprocate in the perpendicular direction of the display apparatus 10.

It can be understood that the air layer is equivalent to a damping spring, and has a certain filtering effect on the high-frequency sound. That is, the sound emitted by the display panel 100 has a high-frequency loss.

In addition, when the exciter 400 drives the rear shell 500 to vibrate, the rear shell 500 may be likely to have abnormal vibration in middle and high bands, resulting in noise in the display apparatus 10. In addition, due to strong directivity of the high-frequency sound, deviation and confusion in a center of a sound image is likely to occur. In some embodiments, with reference to FIGS. 38-41, an elastic filtration member 40b may also be arranged between the actuation member 420 and the rear shell 500. The elastic filtration member 40b has elasticity. High-frequency vibration may be consumed by the elastic filtration member 40b since an amplitude of the high-frequency sound is small. That is, by arranging the elastic filtration member 40b, low-frequency vibration of the actuation member 420 can be transmitted to the rear shell 500, and the rear shell 500 can be driven to vibrate to emit the low-frequency sound. In addition, the high-frequency vibration of the actuation member 420 can be prevented from being transmitted to the rear shell 500, and the condition that the high-frequency vibration of the rear shell 500 is transmitted back to the backplane, leading to resonance of the backplane and abnormal vibration of electrical devices on the backplane can also be avoided.

In some embodiments, the elastic filtration member 40b may be a spring, a rubber member, etc. In some embodiments, an elastic deformation capacity of the elastic filtration member 40b may also be implemented through bending, thinning, etc. For example, the elastic filtration member 40b has an annular sheet structure. The annular sheet structure is arranged around the outer side of the actuation member 420. A shape of a cross section of the annular sheet structure may be a wave or a zigzag by at least bending the annular sheet structure once.

In some embodiments, the actuation member 420 and the rear shell 500 are arranged at an interval in the perpendicular direction of the display apparatus 10, and the actuation member 420 is connected to the rear shell 500 through the elastic filtration member 40b.

In some embodiments, in order to reduce the thickness of the display apparatus 10, a mounting hole 530 may be provided in the rear shell 500. The mounted element 421 is arranged in the mounting hole 530, and the mounted element 421 is connected to the rear shell 500 through the elastic filtration member 40b. When the actuation member 420 vibrates, the elastic filtration member 40b drives the rear shell 500 to vibrate and emit sound. In this way, the high-frequency vibration of the actuation member 420 can be prevented from being transmitted to the rear shell 500. It can be understood that in this case, the elastic filtration member 40b may also play a role in stabilizing the actuation member 420 and preventing the actuation member 420 from inclining during reciprocation.

Figure 42:
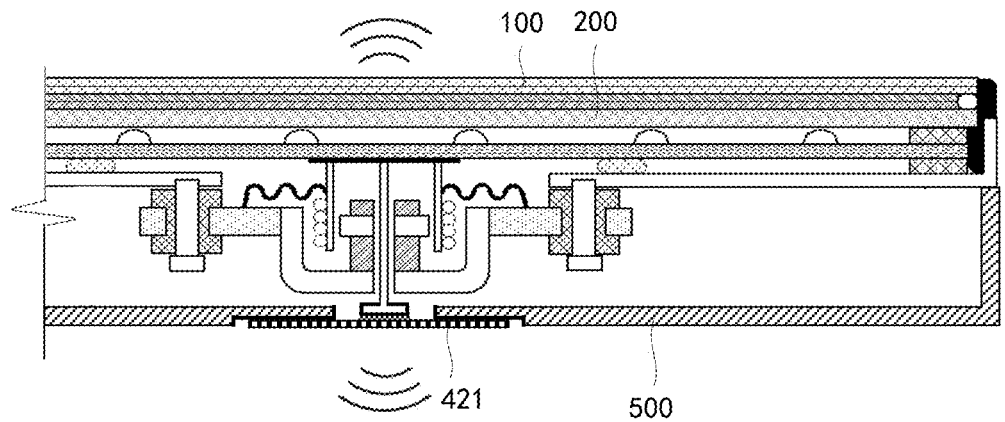
FIG. 42 is a schematic structural diagram of connecting a mounted element to a rear shell in FIG. 31.
Figure 43:
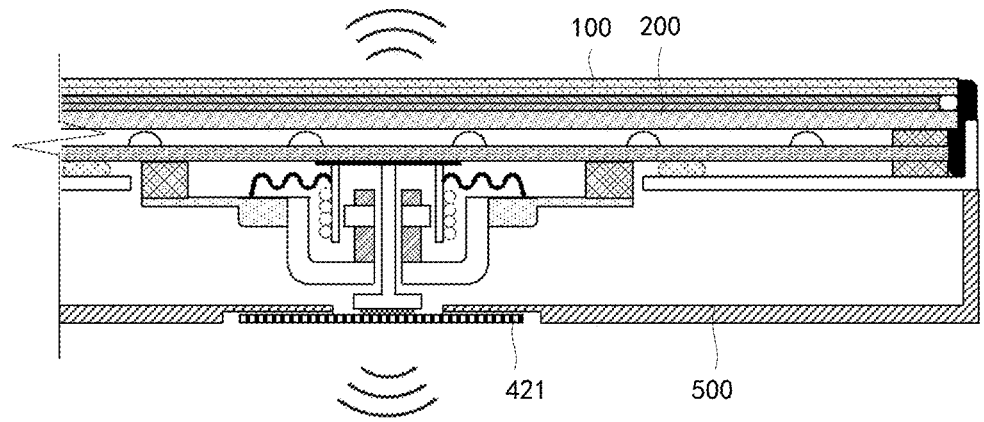
FIG. 43 is another schematic structural diagram of connecting a mounted element to a rear shell in FIG. 34.

In some embodiments, with reference to FIG. 42 and FIG. 43, when the mounted element 421 is arranged in the mounting hole 530, the mounted element may also be fixed to the rear shell 500 by a double-sided tape. For example, the mounting hole 530 is a stepped hole, and the mounted element is fixed to a stepped surface of the stepped hole. It can be understood that in this case, vibration of the actuation member 420 in full bands may be transmitted to the rear shell 500.

It can be understood that under the condition that the actuation member 420 and the rear shell 500 are not connected to each other, the rear shell 500 may also vibrate and emit sound at the same time when the exciter 400 drives the display panel 100 to vibrate and emit sound. Since the display panel 100 and the rear shell 500 have areas equivalent in size, the display panel 100 and the rear shell 500 have the same resonance frequency. In this way, the rear shell 500 may also produce noise audible by a user.

In some embodiments, with reference to FIGS. 44-48, a rear shell exciter 540 may be arranged at a maximum vibration position (for example, a resonance position) of the rear shell 500. A vibration direction in which the maximum vibration position is driven to vibrate by the rear shell exciter 540 is opposite to a vibration direction in which the maximum vibration position is driven to vibrate by the exciter 400, so as to reduce a vibration amount of the rear shell 500 and prevent the rear shell 500 from generating noise.

Figure 44:
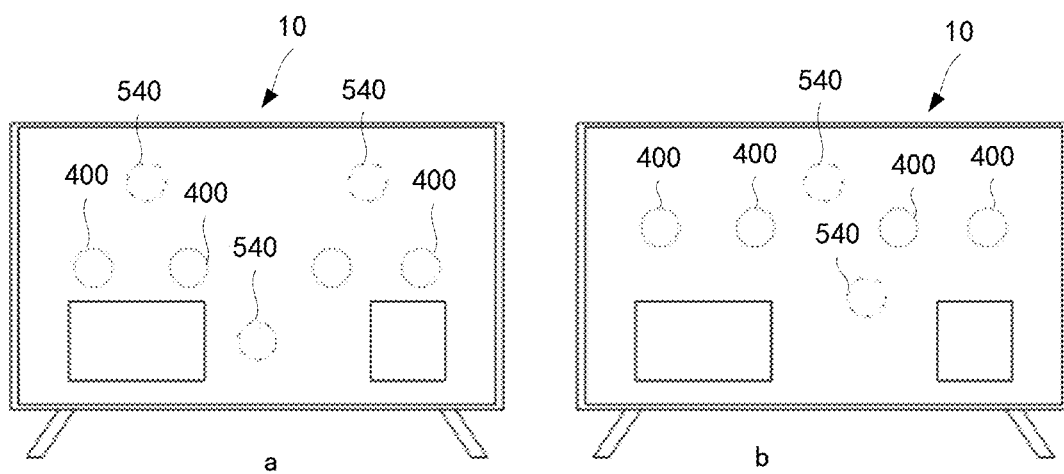
FIG. 44 is a schematic structural diagram of a display apparatus in which a rear shell exciter is arranged according to some embodiments of the disclosure.
Figure 45:
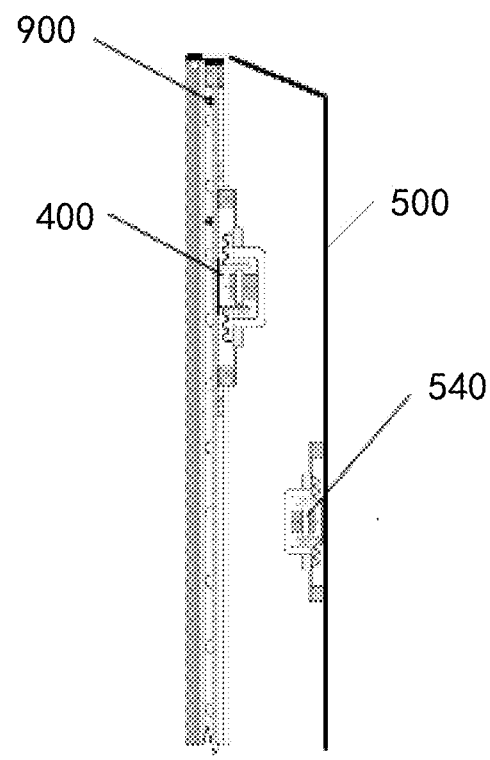
FIG. 45 is another schematic structural diagram of a display apparatus in which a rear shell exciter is arranged according to some embodiments of the disclosure.

In some embodiments, the maximum vibration position may be obtained through test simulation, and a plurality of maximum vibration positions may be provided (as shown in figures a and b in FIG. 44).

In some embodiments, the vibration of the rear shell exciter 540 may be controlled based on a control signal. A principle is as follows:
  a control signal is applied to the rear shell exciter 540 at a frequency, and the rear shell 500 has a first vibration frequency feature;
  the control signal is applied to the exciter 400 at this frequency, the rear shell 500 has a second vibration frequency feature, and a vibration frequency domain transfer function between the second vibration frequency feature and the first vibration frequency feature is obtained through processing by a processor;

a delay of vibration from the exciter 400 to the rear shell 500 is measured, and delay processing is performed through a first delay unit;

the vibration frequency domain transfer functions at frequencies are added through a first addition unit, that is, a vibration transfer function from the exciter 400 to the rear shell 500 in the whole frequency response range is obtained; and the vibration transfer function is inversely processed through an inverter and then applied to the rear shell exciter 540, thus driving the rear shell exciter 540 to vibrate.

Figure 46:
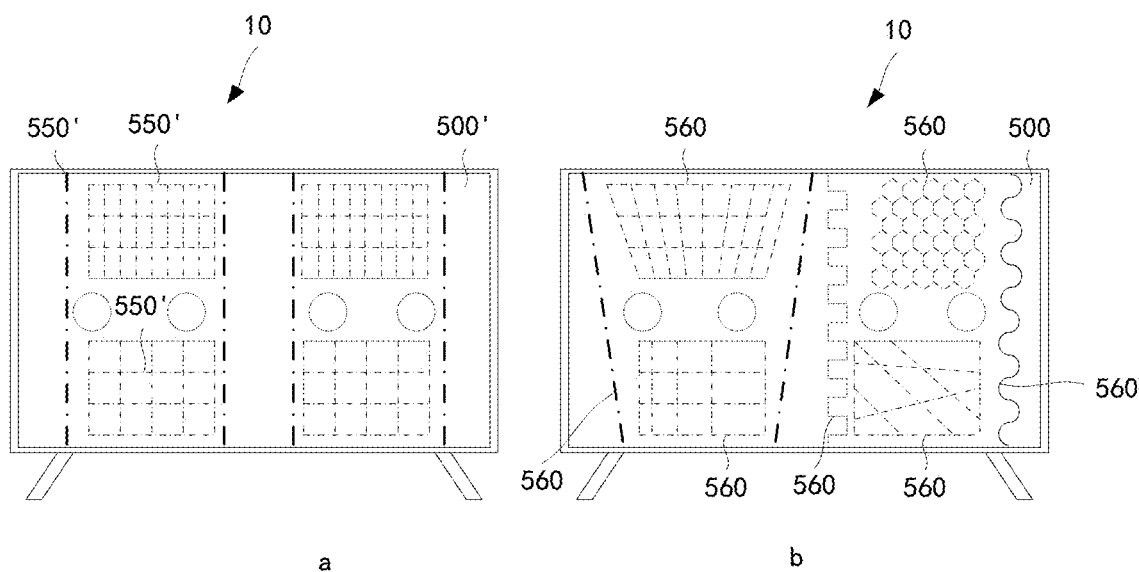
FIG. 46 is a schematic structural diagram of a display apparatus in which a reinforcement rib is arranged on a rear shell according to some embodiments of the disclosure.

It can be understood that in order to make the rear shell 500 have a desirable flatness and rigidity, the rear shell 500' in the related art is provided with a first reinforcement rib 550' (as shown in figure a in FIG. 46). The first reinforcement rib 550' usually has a regular geometric shape and a simple structure. For example, shapes of the first reinforcement ribs 550' are a grid, a circle and a bar with the same size. However, the first reinforcement rib 550' that has a regular geometric shape is likely to cause the rear shell 500 to generate a resonance frequency with a constant loudness.

In order to avoid noise generation due to resonance of the rear shell 500, in some embodiments, the rear shell 500 is provided with a second reinforcement rib 560 that has an irregular geometric shape (as shown in figure b in FIG. 46). The second reinforcement rib 560 has the irregular geometric shape may be irregular in shape, irregular in grid size, irregular in extension direction, irregular in protrusion height, irregular in width, etc. For example, the shape of the second reinforcement rib 560 may be a honeycombed grid, a trapezoidal grid or a rectangular grid. Grids in the second reinforcement rib 560 that has a shape of the trapezoidal grid or grids in the second reinforcement rib 560 that has a shape of the rectangular grid may be different in size or shape. The irregularity in the extension direction may indicate that the extension direction of the bar-like second reinforcement rib 560 (as shown by a dot dash line in figure b in FIG. 46) has an included angle with a lateral direction or a longitudinal direction of the display apparatus, or the second reinforcement rib 560 is bent, for example, being wavy. The irregularity in the protrusion height indicates that the protrusion heights at different positions of the second reinforcement rib 560 are different in the extension direction of the second reinforcement rib 560.

By arranging the second reinforcement ribs 560 that have the irregular geometric shapes, an original vibration mode of the rear shell can be destroyed, and the vibration modes of the rear shell 500 can be enriched. That is, resonance frequencies of the rear shell 500 are scattered, thus reducing the vibration amplitude when the rear shell 500 resonates, and avoiding the noise generation by the rear shell 500.

It can be understood that an area of the rear shell 500 is equivalent to an area of the display panel 100, such that low-frequency resonance is likely to occur between the rear shell 500 and the display panel 100, and the rear shell 500 generates noise.

Figure 47:
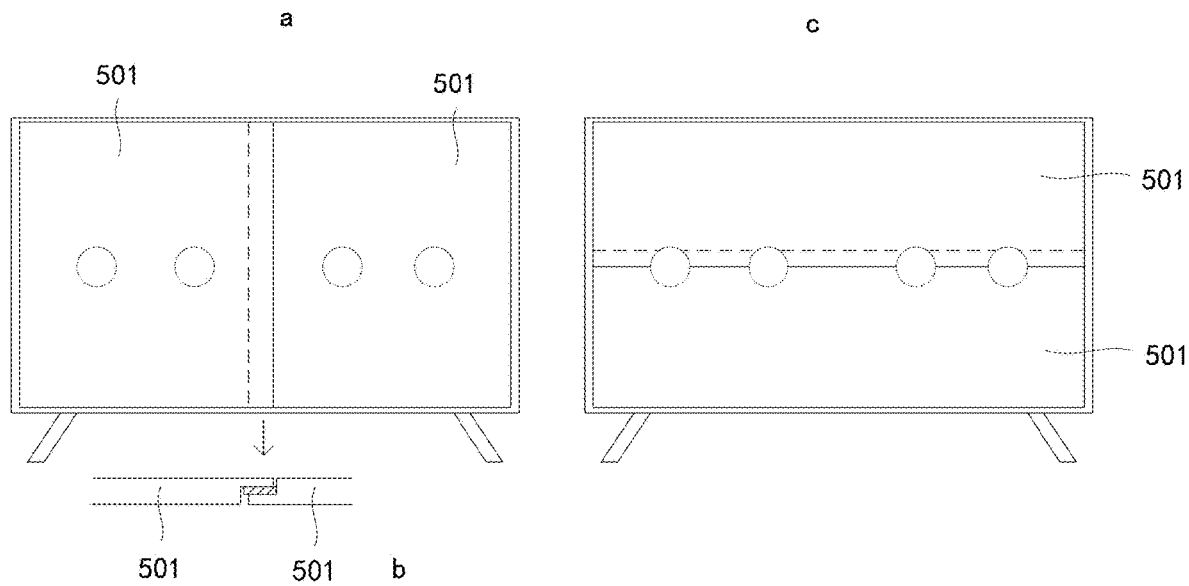
FIG. 47 is a schematic structural diagram of a display apparatus in which a rear shell is provided with a plurality of rear sub-shells according to some embodiments of the disclosure.

In some embodiments, the rear shell 500 may be arranged in sections as shown in figure a to figure c in FIG. 47. That is, the rear shell includes a plurality of rear sub-shells 501 that are connected to one another, and the plurality of rear sub-shells 501 are arranged abreast. For example, the rear shell 500 is divided into two sections, three sections or more, and adjacent rear sub-shells 501 may be bonded fixedly by foam (as shown in figure b in FIG. 47), a double-sided tape, etc. In this way, the rear sub-shell 501 has an area smaller than an area of the display panel 100, and is unlikely to produce resonance with the display panel 100, thus avoiding low-frequency resonance of the rear shell 500.

In some embodiments, the plurality of rear sub-shells 501 may be arranged in a horizontal direction or in a vertical direction.

The areas of the rear sub-shells 501 may be the same (as shown in FIG. 47). In some embodiments, the areas of the rear sub-shells 501 may be set unequally.

In some embodiments, noise may be generated at a contact position of an edge of the rear shell 500 and the backplane 300. Accordingly, in order to avoid noise generation by the rear shell 500, friction between the edge of the rear shell 500 and the backplane 300 may be reduced. For example, a first elastic buffer member 570 such as foam is arranged between the edge of the rear shell 500 and the backplane 300 (as shown in figure a in FIG. 48), so as to avoid a rigid contact between the rear shell 500 and the backplane. Or, the edge of the rear shell 500 and the backplane 300 are arranged at an interval to avoid a contact between the rear shell 500 and the backplane, and in this case, a gap is formed between the edge of the rear shell 500 and the backplane 300.

Figure 48:
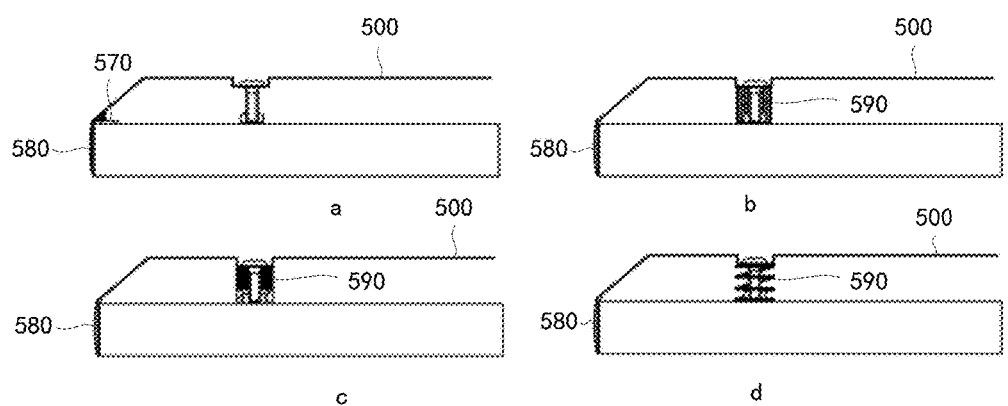
FIG. 48 is a schematic structural diagram of a display apparatus in which a rear shell is connected to a backplane according to some embodiments of the disclosure.

In some embodiments, with reference to FIG. 48, the display apparatus 10 is further provided with a shelter member 580. The shelter member 580 is configured to shelter the foam or the gap, beautify an appearance of the display apparatus 10, and further prevent foreign objects from entering between the backplane 300 and the rear shell 500 through the gap. The shelter member 580 is arranged around the outer side of the periphery of the display apparatus 10 and may be fixed by bonding.

In some embodiments, when the edge of the rear shell 500 is separated from the backplane 300, in order to reduce vibration transmission, an outer side of a screw that locks the backplane 300 to the rear shell 500 is sleeved with an elastic damping member 590, such as a damping the sleeve (as shown in figure b in FIG. 48), the foam (as shown in figure c in FIG. 48), a spring (as shown in figure d in FIG. 48), etc.

That is, the rear shell 500 may be prevented from generating noise by any one of methods of arranging the rear shell exciter 540 on the rear shell 500, arranging the second reinforcement rib 560 that has an irregular geometric shape on the rear shell 500, arranging the rear shell 500 in sections, and reducing the friction between the edge of the rear shell 500 and the backplane 300. In some embodiments, at least two of the methods described above may also be used. For example, when the rear shell 500 is arranged in sections, the irregular reinforcement rib is arranged on the rear shell 500 at the same time.

In order to improve a high-frequency effect of the display apparatus 10, with reference to FIGS. 56-59. It should be noted that the vibrating reed 430 is not shown in FIGS. 58 and 59, so as to simplify the schematic diagram.

The exciter 400 includes a vibrating reed 430, and the vibrating reed 430 is connected to the actuation member 420. In this way, the vibrating reed 430 is configured to drive air to vibrate and emit sound under the drive of the actuation member 420. That is, the vibrating reed 430 may be driven to vibrate and emit sound synchronously during the vibration of the actuation member 420.

The vibrating reed 430 may be the backplane 300 or the rear shell 500, that is, the actuation member 420 drives the backplane 300 or the rear shell 500 to vibrate and emit sound. In some embodiments, in order to improve the high-frequency effect, the vibrating reed 430 may also be a separate element. For example, when the exciter 400 is an electromagnetic exciter, a size of the vibrating reed 430 may be equivalent to a size of the yoke 442 of the electromagnetic exciter.

In some embodiments, the vibrating reed 430 may be a metal sheet or a plastic sheet, and a thickness of the vibrating reed 430 may be 0.3 mm-3 mm. In this way, the vibrating reed 430 has a small weight and a high hardness, and can excite desirable the high-frequency sound.

That is, the display apparatus 10 according to the embodiments of the disclosure may simultaneously drive, through the actuation member 420, the display panel 100 and the vibrating reed 430 to emit sound, and have a desirable sound effect.

By simultaneously driving the vibrating reed 430 and the display panel 100 to vibrate and emit sound, the display apparatus 10 according to the embodiments of the disclosure may emit the low-frequency sound of 50 Hz-70 Hz and the high-frequency sound of about 2000 Hz. The display apparatus 10 has a wide frequency response.

It can be understood that a gap is provided between the backplane 300 and the rear shell 500, and a sound output cavity Q is formed between the rear shell 500 and the backplane 300. The vibrating reed 430 is located in the sound output cavity Q, to protect the vibrating reed 430. There is also a sound output opening P between the rear shell 500 and the backplane 300, and the vibrating reed 430 pushes the air in the sound output cavity Q to vibrate and emit sound. Sound waves emitted by the vibration may propagate to an outer side of the sound output cavity Q through the sound output opening P, and is superimposed with sound waves generated by the display panel 100, so as to compensate for the high-frequency part.

Figure 63:
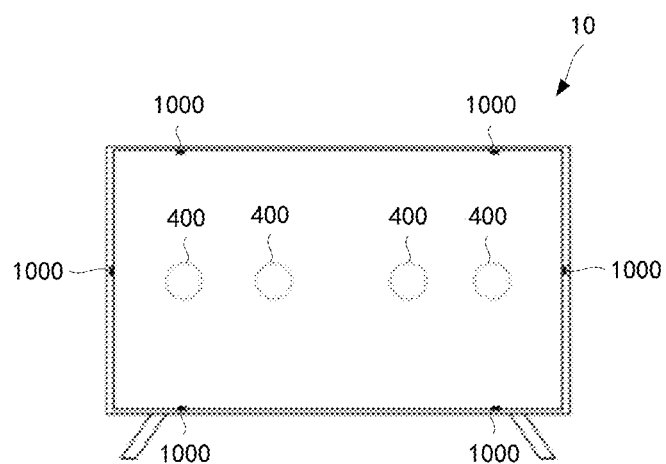
FIG. 63 is a schematic structural diagram of a display apparatus in which a high-frequency speaker is arranged according to some embodiments of the disclosure.

In order to improve the high-frequency effect of the display apparatus 10, with reference to FIGS. 63-70, a high-frequency speaker 1000 may also be arranged at the periphery of the display apparatus 10 for emitting the high-frequency sound. For example, at least one high-frequency speaker 1000 may be respectively arranged at the height side, the bottom side, the left side and the right side of the display apparatus (as shown in FIG. 63). The high-frequency speaker 1000 emits sound towards the outer side of the periphery of the display apparatus 10. For example, the high-frequency speaker 1000 at the height side emits sound towards an upper side of the display apparatus 10, and the high-frequency speaker 1000 at the bottom side emits sound towards a lower side. In some embodiments, a plurality of high-frequency speakers 1000 are symmetrically arranged.

Figure 64:
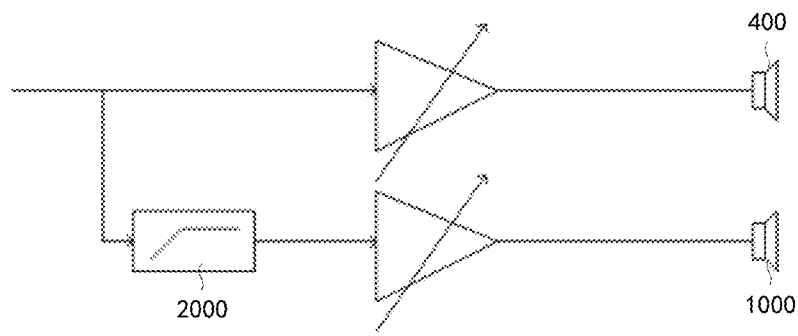
FIG. 64 is a control principle diagram of an exciter and a speaker in FIG. 63.

The high-frequency speaker 1000 refers to a speaker that may emit high-frequency sound, and may be a speaker that merely emits high-frequency sound, or may be a full-band speaker that emits high-frequency sound by a controller of inputting a high-frequency control signal. As shown in FIG. 64, a full-band control signal may be input to the exciter 400, and a high-frequency control signal may be input to the high-frequency speaker 1000 through a high-pass filter 2000.

With consideration of strong directivity of the high-frequency sound, the high-frequency speaker 1000 emits high-frequency sound towards the outer side of the periphery of the display apparatus 10. Thus, a fainter sound image of the display apparatus 10 can be caused, making it difficult to concentrate on positioning.

Figure 65:
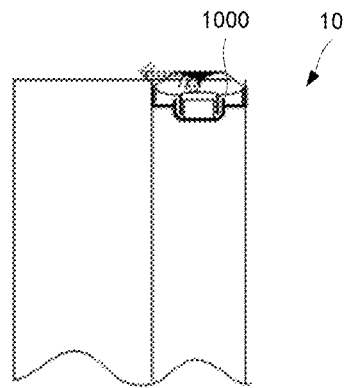
FIG. 65 is a schematic structural diagram of a high-frequency speaker in which a phase plug is arranged in FIG. 63.
Figure 66:
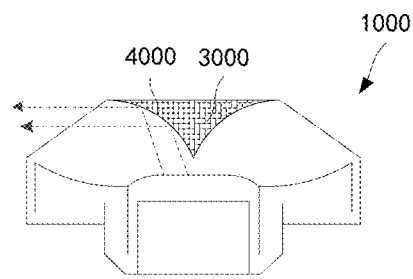
FIG. 66 is a schematic structural diagram of the high-frequency speaker in FIG. 64.

In some embodiments, with reference to FIGS. 65 and 66, a phase plug 3000 may be arranged on the high-frequency speaker 1000, and a guide cambered surface 4000 is arranged on the phase plug 3000. By setting an angle of the phase plug 3000, a position of the phase plug 3000, a shape of the guiding cambered surface 4000 and the like, at least a part of high-frequency sound waves emitted by the high-frequency speaker 1000 may be reflected towards a front side of the display apparatus 10 through the guide cambered surface 4000, thus achieving emitting sound towards the front side of the display apparatus 10 by the high-frequency speaker 1000.

In some embodiments, a propagation direction of the reflected high-frequency sound waves may have an included angle with the perpendicular direction of the display apparatus, or a propagation direction of the reflected high-frequency sound waves may be parallel to the perpendicular direction of the display apparatus, which is not limited in the embodiments.

Figure 67:
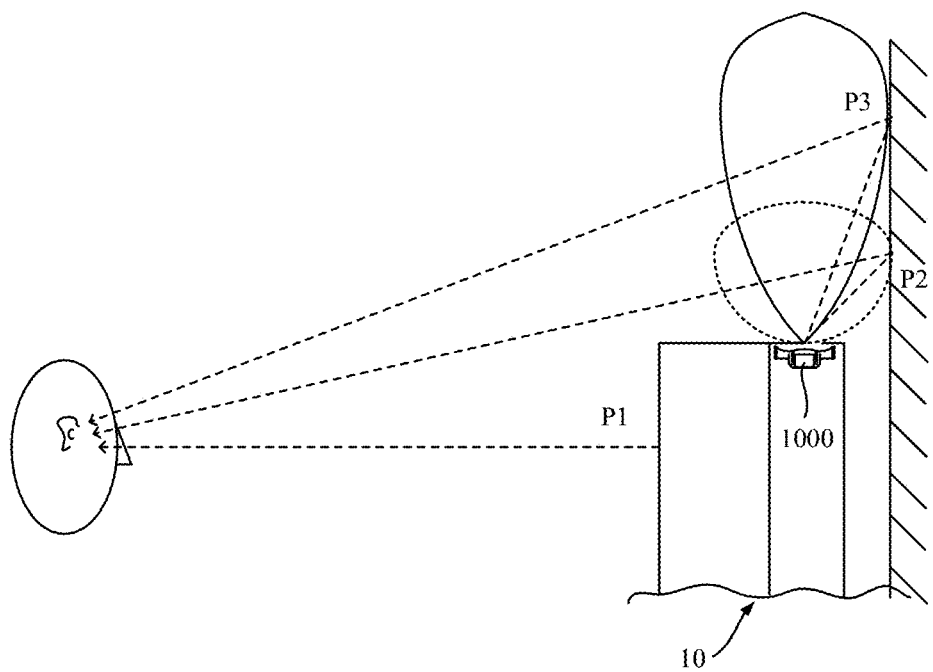
FIG. 67 is a schematic diagram of sound wave propagation in FIG. 63.

It can be understood that the higher the frequency of the sound waves is, the stronger the directivity is. With reference to FIG. 67, P1 denotes a propagation direction of low-frequency sound waves emitted by the exciter 400, P2 and P3 denote propagation regions of high-frequency sound waves emitted by the high-frequency speaker 1000, a frequency of P3 is higher than a frequency of P2, and the high-frequency sound waves of P2 and P3 propagate towards the front side of the display apparatus 10 after being reflected by a wall surface. In this way, sound waves of P1, P2 and P3 with different frequencies have different delays, and sound waves with different frequencies have different center positions of sound images.

Figure 68:
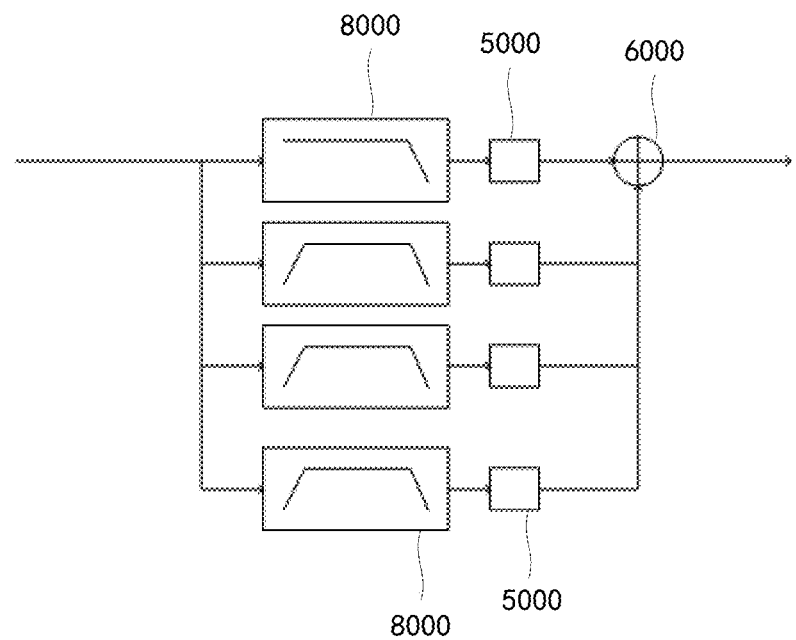
FIG. 68 is another control principle diagram of an exciter and a speaker in FIG. 63.

In some embodiments, the sound image of the display apparatus 10 may also be located based on control signals of the exciter 400 and the high-frequency speaker 1000. Specifically, as shown in FIG. 68.

The full-band sound waves of the display apparatus 10 are divided into N frequency bands by the filter. For convenience of description, the filter may be referred to as a band filter 8000, and a plurality of band filters 8000 are arranged corresponding to the frequency bands.

Different delays are given to frequency bands by the second delay devices 5000, such that time for sound waves in different frequency bands to reach human ears can be adjusted. In this way, a position on a screen is taken as the center position of the virtual sound image. By taking this position as a start point, paths of sound waves with different frequencies reaching the human ears can be computed, and the delays of the frequency bands are computed. The sound waves in the frequency bands are added through a second addition unit 6000 and then input into the high-frequency speaker 1000 as a control signal, and the sound heard by the human ears is emitted from the position of the virtual sound image.

Figure 69:
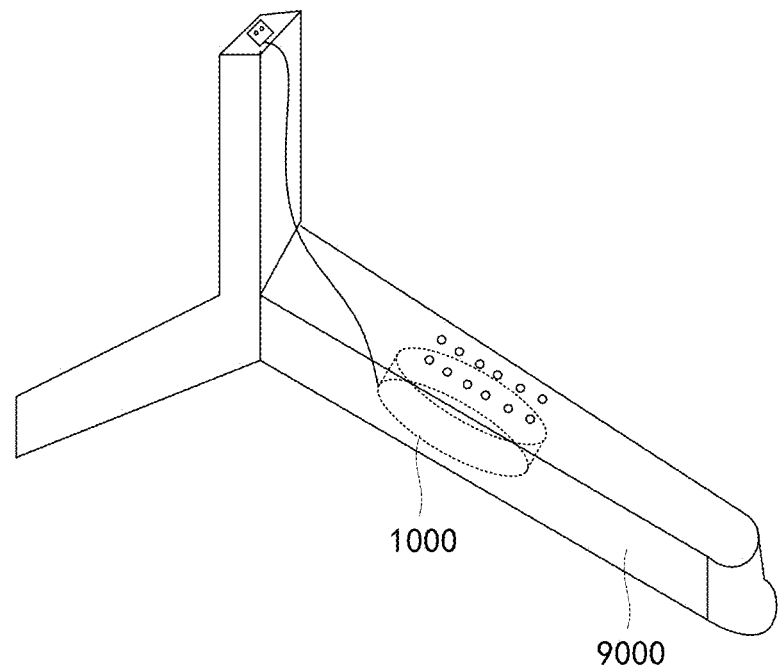
FIG. 69 is a schematic structural diagram of a display apparatus in which a high-frequency speaker is arranged on a holder according to some embodiments of the disclosure.

In some embodiments, with reference to FIG. 69, when the display apparatus 10 is supported at a desktop or other position through a holder 9000, an interior of the holder 9000 may be hollowed for arranging the high-frequency speaker 1000, so as to emit the high-frequency sound. In this case, the holder 9000 may be provided with a sound output opening for sound wave propagation.

In some embodiments, when a side wall of the holder 9000 is thin, an exciter may also be arranged on the inner wall of the holder 9000, so as to drive the holder 9000 to vibrate and emit sound, that is, the display apparatus 10 may emit sound forwards.

In some embodiments, the front side of the display apparatus 10 is provided with a name identification member. The name identification member may be made of a metal material. The display apparatus 10 may be provided with a sound-emitting driver 7020 for driving the name identification member to vibrate and emit sound; and the sound-emitting driver 7020 may be an electromagnetic exciter, a magnetostrictive exciter, etc., that is well known to those skilled in the art.

Figure 70:
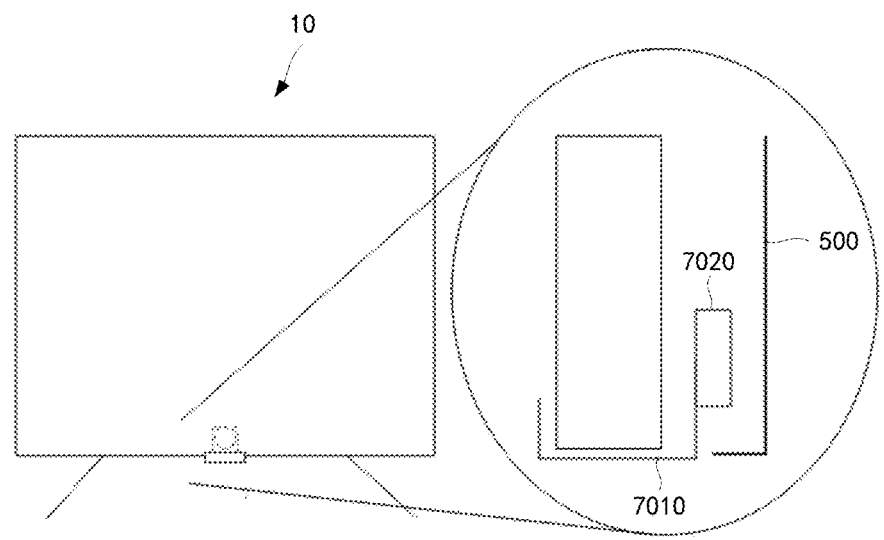
FIG. 70 is a schematic structural diagram of a name identification member and a sound-emitting driver of a display apparatus according to some embodiments of the disclosure.

With a wall-mounted display apparatus as an example, with reference to FIG. 70, a second connection member 7010 may be arranged between the name identification member (not shown) and the sound-emitting driver 7020. The connection member is approximately U-shaped, and includes vibration sections located at a front side and a rear side of the display panel and a connection section located at a lower side of the display panel. Resonance frequencies of the two vibration sections are the same, and are different from a resonance frequency of the connection section. In this way, the sound-emitting driver 7020 may drive one of the vibration sections to vibrate to drive the other vibration section to resonate, and the connection section is configured to transmit the vibration between the two vibration sections without resonating with the vibration sections, thus reducing sound waves emitted by the display apparatus 10 towards the lower side.

In some embodiments, when the second connection member 7010 is integrally formed, a width of the connection section may be smaller than a width of the vibration section, for example, the vibration section has a shape of a dumbbell. In some embodiments, a reinforcement rib, a mounted metal attachment and the like may also be arranged on the connection section. In some embodiments, the connection section and the vibration sections are made from different materials.

Figure 71:
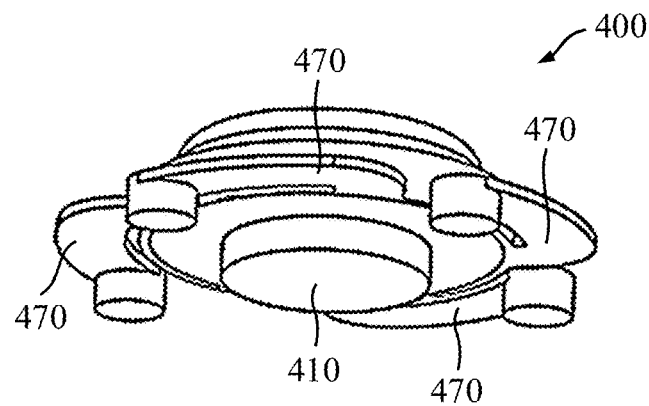
FIG. 71 is a schematic structural diagram of an exciter in a display apparatus according to some embodiments of the disclosure.
Figure 72:
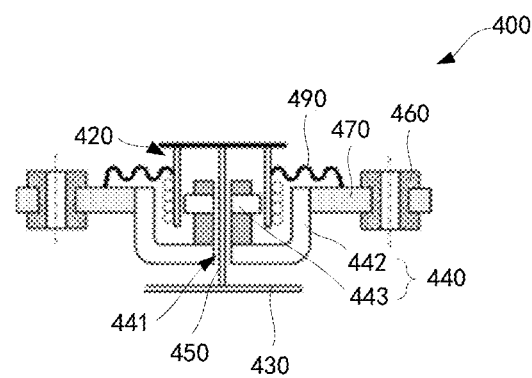
FIG. 72 is another schematic structural diagram of an exciter in a display apparatus according to some embodiments of the disclosure.

In some embodiments, with reference to FIGS. 71 and 72, the exciter 400 being the electromagnetic exciter is taken as an example, and the electromagnetic exciter includes a voice coil and a magnetic component 440. The magnetic component 440 is configured to generate a magnetic field. The voice coil vibrates in an axial direction of the voice coil in the magnetic field.

Specifically, the magnetic component 440 includes a yoke 442 and a washer 443 that are well known to those skilled in the art. The yoke 442 has a cylindrical shape with an opening, a magnet is arranged to a bottom surface of the yoke 442, and the washer 443 is arranged on the magnet. A gap is provided between the magnet and the washer 443, and an inner wall surface of the yoke 442, and is referred to as a magnetic air gap. The magnetic component 440 is configured to provide a stable magnetic field in the magnetic air gap.

One end of the voice coil is connected to the backlight board 210, and a connection sheet may also be arranged between the voice coil and the backlight board 210, thus increasing a connection area between the voice coil and the backlight board 210 and preventing the voice coil and the backlight board 210 from being separated from each other. The other end of the voice coil is inserted into the magnetic air gap, and the voice coil is fixed to the exciter body 410 through a damper. With a change in the magnetic field, the voice coil reciprocates in an axial direction under stress.

That is, when the exciter 400 is the electromagnetic exciter, the voice coil forms the actuation member 420, and the voice coil is connected to the backlight board body 211.

In order to connect the voice coil to the vibrating reed 430, the exciter 400 further includes a connection rod 450. The connection rod 450 extends in a thickness direction of the display apparatus 10. The connection rod 450 may be an aluminum rod, a plastic rod, etc., and is light in weight. The magnetic component 440 is provided with a via hole 441 for the connection rod 450 to pass through. Specifically, the via hole 441 is provided in the magnet, the yoke 442 and the washer 443. In this way, the voice coil and the vibrating reed 430 are connected to two ends of the connection rod 450 respectively. That is, the actuation member 420 and the vibrating reed 430 are connected to the two ends of the connection rod 450 respectively, thus preventing the vibrating reed 430 from interfering with the backlight board 210 during vibration.

It can be understood that the connection rod 450 extending in the thickness direction of the display apparatus 10, indicates that the two ends, connected to the actuation member and the vibrating reed 430 respectively, of the connection rod 450 are located at two sides of the exciter body in the thickness direction of the display apparatus 10, without limiting the extension direction of a rod body of the connection rod 450. For example, when the connection rod 450 passes through the yoke 442 and the washer 443, the connection rod 450 may be a straight rod, and when the connection rod 450 bypasses the outer wall surface of the exciter body, the connection rod 450 may be a bent rod. A shape of the connection rod 450 is not limited in the embodiments.

In some embodiments, the exciter 400 being the magnetostrictive exciter is taken as an example, and the magnetostrictive exciter drives the backlight board 210 to vibrate by a magnetostrictive effect. The magnetostrictive effect refers to that after a magnetostrictive material is magnetized in the magnetic field, the magnetostrictive material stretches out or draws back in a magnetization direction. Structures, materials, etc., of elements in the magnetostrictive exciter are not limited in the embodiments.

Figure 73:
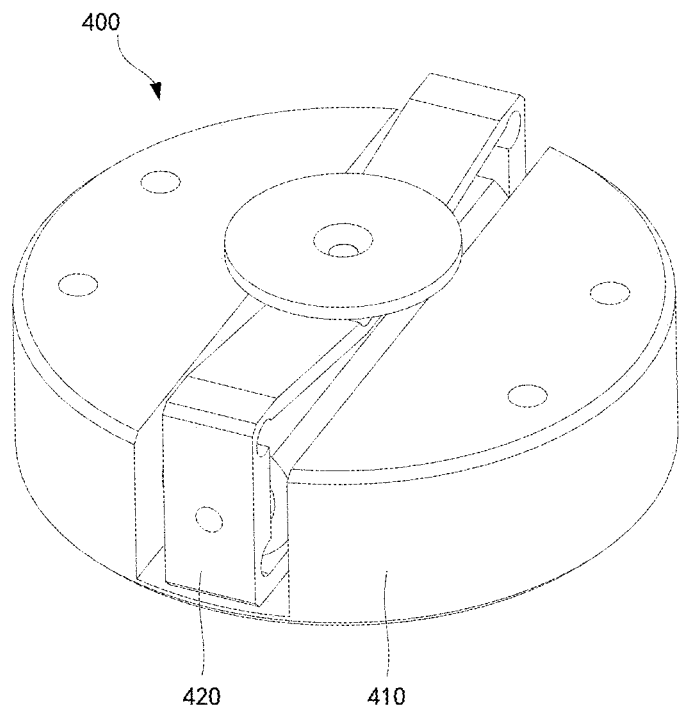
FIG. 73 is yet another schematic structural diagram of an exciter in a display apparatus according to some embodiments of the disclosure.
Figure 74:
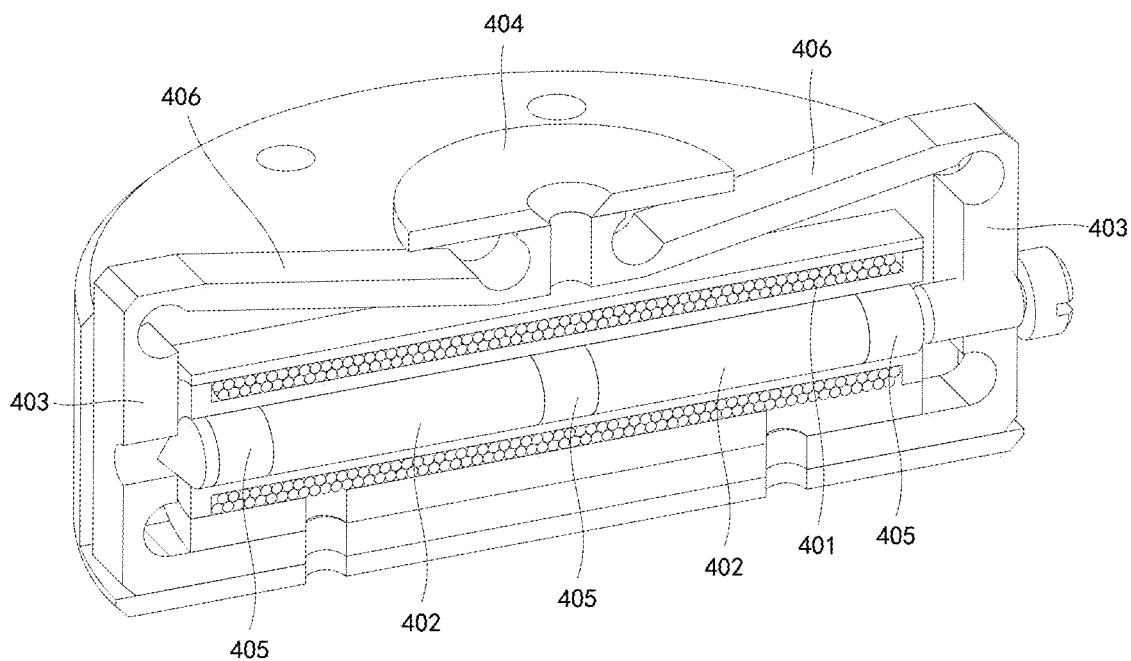
FIG. 74 is a sectional view of the exciter in FIG. 73.
Figure 75:
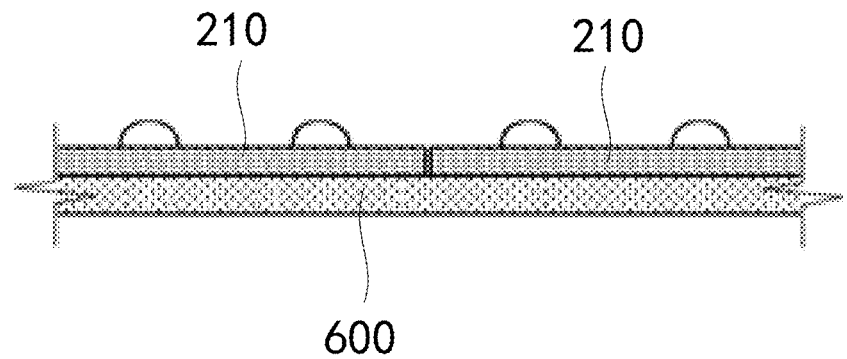
FIG. 75 is a schematic structural diagram of a backlight board and a reinforcement plate in a display apparatus according to some embodiments of the disclosure.

In some embodiments, with reference to FIGS. 73 and 74, the exciter body includes a coil 401 and a stretchable member 402, and the stretchable member 402 may stretch out and draw back, and deform in an axial direction of the coil 401. The actuation member 420 includes a first movable portion 403 and a second movable portion 404 that are connected to each other. The first movable portion 403 is connected to the exciter body, and the first movable portion 403 is located at an end in an axial direction of the coil 401. The second movable portion 404 is connected to the exciter body and the backlight board 210. The second movable portion 404 is located at a side of the coil 401 in a radial direction. That is, the first movable portion 403 and the second movable portion 404 are connected to form an L-shaped bent structure. The first movable portion 403 may form one of bent edges of the bent structure and is arranged at an end of the coil 401; and the second movable portion 404 is located on the other bent edge and is arranged at the side of the coil 401 in the radial direction.

The magnetostrictive exciter further includes a magnetic member 405. The coil 401 is configured to generate an alternating magnetic field according to a control signal, and the stretchable member 402 may stretch out and draw back and deform in the axial direction of the coil 401 in a superimposed magnetic field of the alternating magnetic field and a magnetic field generated by the magnetic member 405.

When the stretchable member 402 stretches out and draws back, the first movable portion 403 may be driven by the stretchable member 402 to reciprocate relative to the end of the coil 401, and the second movable portion 404 may reciprocate under elastic force of the first movable portion 403 and drive the body to vibrate. A reciprocation direction of the second movable portion 404 is set at an included angle with the axial direction of the coil 401.

When the stretchable member 402 stretches out, the first movable portion 403 may move towards the side far away from the coil 401 under the action of pushing by the stretchable member 402. When the stretchable member 402 draws back, the first movable portion 403 may move towards the side close to the coil 401 under elastic force of the first movable portion. Thus, when the stretchable member 402 stretches out and draws back in the superimposed magnetic field, the first movable portion 403 may reciprocate relative to the coil 401. Similarly, the second movable portion 404 may reciprocate under the action of the first movable portion 403 or the elastic force of the second movable portion, so as to drive the backlight board 210 to vibrate.

Since the second movable portion 404 is located at the side of the coil 401 in the radial direction, the reciprocation direction of the second movable portion 404 is set at an included angle with the axial direction of the coil 401. That is, the reciprocation direction of the backlight board 210 is set at an included angle with the axial direction of the coil 401. A size, in the reciprocation direction of the backlight board 210, of the exciter 400 is approximate to a size, in the radial direction of the coil 401, of the exciter; and the size, in the radial direction of the coil 401, of the exciter 400 is far smaller than the size, in the axial direction of the coil 401, of the exciter 400. In this way, sizes, in the reciprocation direction of the backlight board 210, of the display apparatus 10 are all small, which conforms to an ultra-thin development trend of the display apparatus 10.

It can be understood that when the exciter 400 is the magnetostrictive exciter, the connection rod 450 may pass through the exciter body, or bypass the outer wall surface of the exciter body and extend to the other side of the exciter body. The structure of the connection rod 450 is not limited in the embodiments.

That is, the first movable portion 403 may swing back and forth supported by an end, connected to the exciter body, of the first movable portion; and the first movable portion 403 has a fixed end and a movable end connected to the second movable portion 404.

In some embodiments, a first interval in the extension direction of the first movable portion 403 is provided between the fixed end of the first movable portion 403 and the stretchable member 402, and a second interval in the extension direction of the first movable portion 403 is provided between the movable end of the first movable portion 403 and the stretchable member 402. The first interval is shorter than the second interval, such that a reciprocating offset amount of the movable end of the first movable portion 403 is effectively increased, and the vibration amplitude of the backlight board 210 is increased. The sound emitted by the backlight board 210 can have a high sound pressure level and a low frequency.

In some embodiments, the reciprocation direction of the second movable portion 404 and a stretch-out and drawback direction of the stretchable member 402 are perpendicular to each other.

In addition, the first movable portion 403 and the second movable portion 404 are connected through an inclined connection portion 406. In some embodiments, the first connection portion 406 extends in the radial direction of the coil 401, such that the second movable portion 404 can have a large vibration amplitude through a small movement distance of an end, connected to the connection portion 406, of the first movable portion 403.

With reference to FIG. 3 and FIGS. 75-81, a plurality of backlight boards 210 are provided generally, and the backlight boards 210 are small in thickness and easy to deform. In some embodiments, the display apparatus 10 further includes a reinforcement plate 600, and the reinforcement plate 600 may have a thickness of 1 mm-4 mm, for example, 2 mm. The reinforcement plate 600 is mounted on a side, facing away from the display panel 100, of the backlight board body 211. For example, the reinforcement plate 600 is bonded fixedly to the backlight board 210 through an adhesive member such as a double-sided tape. The exciter 400 is connected to the reinforcement plate 600. In this way, the plurality of backlight boards 210 and the reinforcement plate 600 are connected into a whole, and a tight splicing seam is provided between two adjacent backlight boards 210. In addition, the backlight board 210 may also radiate heat through the reinforcement plate 600.

Figure 81:
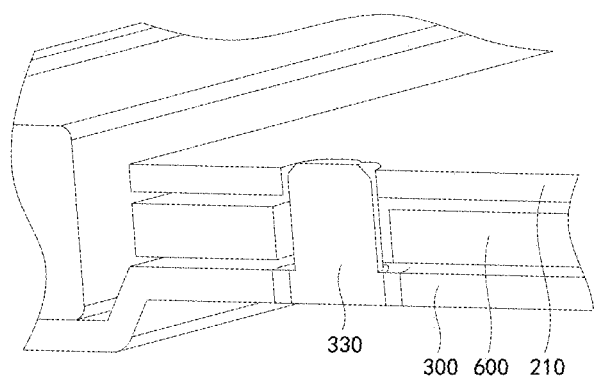
FIG. 81 is another schematic positioned diagram of a backlight board and a reinforcement plate in a display apparatus according to some embodiments of the disclosure.

In some embodiments, the reinforcement plate 600 may be connected to the backplane 300, such that the reinforcement plate 600 and the backlight board 210 can be positioned. The backplane 300 is provided with a protruding positioning column 330 (as shown in FIG. 81), and a lamp panel and the reinforcement plate 600 are respectively provided with positioning holes for the positioning column 330 to pass therethrough.

In some embodiments, the positioning column 330 and the backplane 300 may be integrally. Alternatively, the positioning column 330 is, for example, a positioning rivet connected to the backplane 300.

In some embodiments, the exciter 400 is arranged at a side, facing away from the backlight board body 211, of the reinforcement plate 600. When the exciter 400 is started, vibration force of the exciter 400 is transmitted to the display panel 100 through the reinforcement plate 600, the backlight board body 211 and the gas layer M in sequence, so as to make the display panel 100 vibrate and emit sound.

Illustratively, the reinforcement plate 600 may be a honeycomb plate or a carbon fiber plate. A core material of the reinforcement plate 600 includes, but is not limited to, paper, aramid fiber, metal or other hard foam materials. A skin material of the reinforcement plate 600 includes, but is not limited to, glass fiber, carbon fiber, glass-carbon mixed fiber, plastic or light aluminum. In addition, the reinforcement plate 600 may also be used as a heat conducting and heat radiating plate for the backlight board 210.

When the exciter 400 drives the backlight board 210 to vibrate, sensitivity to a gas pressure change of the gas layer M formed between the backlight board 210 and the display panel 100 is related to the size of the gap of the gas layer M. That is, the larger the gap of the gas layer M is, the lower the sensitivity to the gas pressure change of the gas layer M is. The smaller the gap of the gas layer M is, the higher the sensitivity to the gas pressure change of the gas layer M is. In addition, the larger the gap of the gas layer M is, the lower the vibration transmission efficiency is, and the worse the sound-emitting effect of the display panel 100 is.

In some embodiments, a Mini-LED light source may be used as the light source in the display apparatus with the sound-emitting display panel 100. Due to a small size of the Mini-LED light source, the gap of the gas layer M between the display panel 100 and the backlight board 210 can be effectively reduced, and the vibration force of the exciter for vibrating the backlight board 210 is transmitted, through an equivalent damping spring (that is, the gas layer M), to the display panel 100 for sound emitting.

It should be noted that the light sources in the display apparatus with the sound-emitting display panel 100 include, but are not limited to, the Mini-LED light sources. Other backlight sources may also be used, for example, a direct-lit backlight or an edge-lit backlight is used. However, due to a large number of direct-lit backlights or edge-lit backlights, for example, using about 100 light sources (such as lamp beads), a large optical mixing distance is required. For example, the size of the gap of the gas layer M may be 10 mm. In this way, a large optical mixing distance can be provided for the direct-lit light source or the edge-lit light source, but a large gap of the gas layer M between the backlight board body 211 and the display panel 100 can be caused. Thus, the problems of low sensitivity to the gas pressure change of the gas layer M caused by vibration and deformation of the backlight board body 211, the low sound transmission efficiency and a poor sound-emitting effect of the display panel 100 are caused accordingly.

Figure 24A:
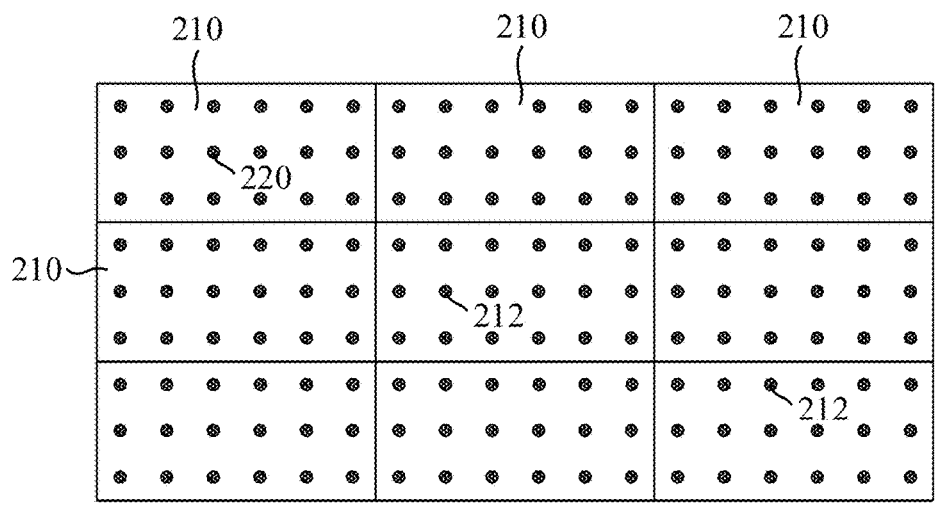
FIG. 24A is a schematic structural diagram of splicing a plurality of backlight boards in a display apparatus according to some embodiments of the disclosure.
Figure 24B:
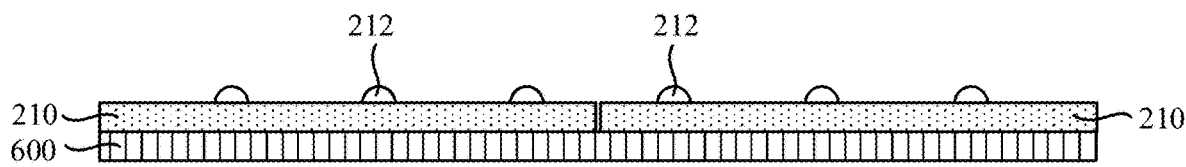
FIG. 24B is a sectional view of the display apparatus shown in FIG. 24A.

In some embodiments, the display apparatus further includes a sound-emitting component, the sound-emitting component includes at least one exciter, and the exciter is arranged at a side, facing away from the display panel, of the backlight board. FIG. 24A is a schematic structural diagram of splicing a plurality of backlight boards in a display apparatus according to some embodiments of the disclosure. FIG. 24B is a sectional view of the display apparatus shown in FIG. 24A. As shown in FIGS. 24A-24B, the backlight boards 210 are spliced with each other and located at a side, facing away from the display panel 100, of the optical film component; and the backlight board 210 is configured to provide a backlight source 212 for the display panel 100. In the disclosure, the Mini-LED backlight board is preferably adopted. With consideration of a size of the display apparatus 10, a manufacturing process of the backlight board 210 body, etc., the size of the display apparatus 10 is usually larger than a size of the backlight board 210. That is, a plurality of the backlight boards 210 are usually arranged, and the plurality of the backlight boards 210 are spliced in an array. That is, the display panel 100 is formed by splicing a plurality of Mini-LED backlight boards 210. A side, facing the display panel 100, of each Mini-LED backlight board 210 is provided with a plurality of light sources 212; and the plurality of light sources 212 are arranged at intervals. The second elastic support members 900 are located in gaps between the plurality of light sources 212. Vibration force of the sound-emitting component is transmitted to the display panel 100 through the second elastic support members 900, thus avoiding influencing light emission of the light sources 212 while implementing synchronization of the sound and image.

In addition, the backlight module 200 may further include a substrate, and the substrate is a honeycomb plate or a carbon fiber plate. When the LCD screen has a size of 65 inches and uses an aluminum honeycomb substrate, a thickness of the honeycomb plate is 1 mm-4 mm. Specifically, the honeycomb core material may be paper, aramid fiber, metal or other hard foam materials. A skin material of the honeycomb plate includes, but is not limited to, glass fiber, carbon fiber, glass-carbon mixed fiber, plastic or light aluminum. In addition, the substrate may also be used as a heat conducting and heat radiating plate for the backlight board 210.

In some embodiments, the substrate is a rectangular flat plate, and the substrate is bonded to the backlight board 210 by the double-sided tape. The substrate connects adjacent backlight boards 210 to each other, such that all backlight boards 210 are connected into a whole board. A tight splicing seam is formed between the backlight boards 210.

A compression change process of the second elastic support member 900 will be described in detail below.

Figure 25:
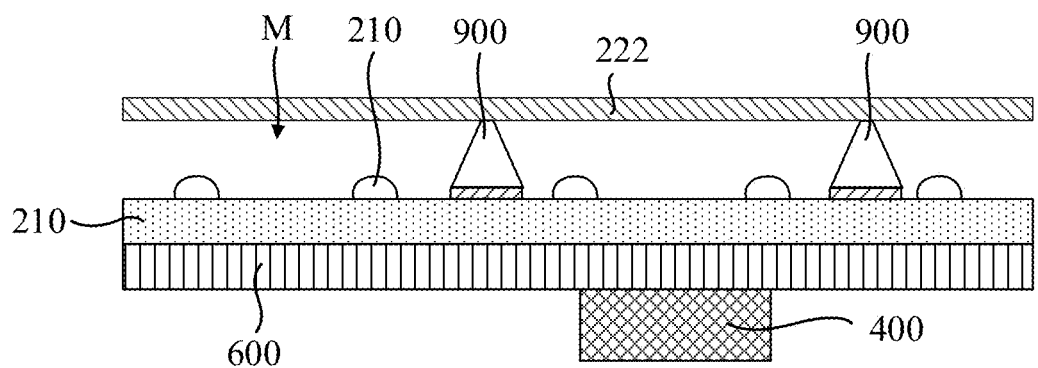
FIG. 25 is a schematic structural diagram of second elastic support members in a static state arranged on a plurality of backlight boards in a display apparatus according to some embodiments of the disclosure.
Figure 26:
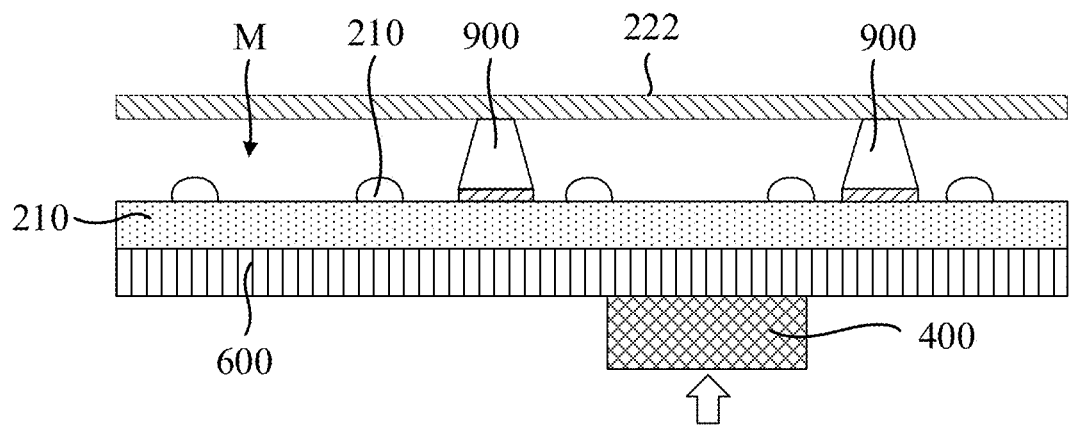
FIG. 26 is a schematic structural diagram of second elastic support members in a compressed state arranged on a plurality of backlight boards in a display apparatus according to some embodiments of the disclosure.
Figure 27:
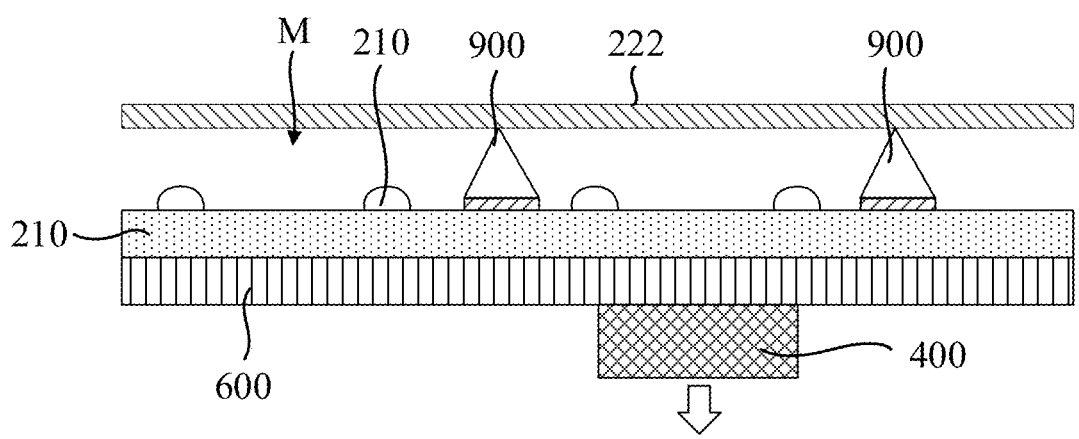
FIG. 27 is a schematic structural diagram of second elastic support members in a free contact state arranged on a plurality of backlight boards in a display apparatus according to some embodiments of the disclosure.

FIG. 25 is a schematic structural diagram of second elastic support members in a static state arranged on a plurality of backlight boards in a display apparatus according to some embodiments of the disclosure. FIG. 26 is a schematic structural diagram of second elastic support members in a compressed state arranged on a plurality of backlight boards in a display apparatus according to some embodiments of the disclosure. FIG. 27 is a schematic structural diagram of second elastic support members in a free contact state arranged on a plurality of backlight boards in a display apparatus according to some embodiments of the disclosure.

One end of the second elastic support member 900 is in contact with the backlight board 210, and the other end of the second elastic support member is in contact with the diffusion film 222. When the second elastic support member is placed in a static state, as shown in FIG. 25, the second elastic support member 900 is in an interference compression state. When the exciter 400 is pushed towards a side close to the display panel 100, as shown in FIG. 26, the second elastic support member 900 is in a further overpressure state. As shown in FIG. 27, when the exciter 400 vibrates towards a side facing away from the backlight board 210, the second elastic support member 900 is in a free contact state.

In some other implementations, as shown in FIG. 23B-23C, at least two exciters 400 may be provided, and the at least two exciters 400 are arranged at an interval in a direction parallel to the display panel 100. The plurality of second elastic support members 900 include at least two vibration transmission member groups, and second elastic support members 900 in each vibration transmission member group are arranged around the outer side of the corresponding exciter 400. In this way, the optical film component 220 at different positions at the periphery of the exciter 400 can be supported, and vibration transmission effects at different positions at the periphery of the exciter 400 are desirable.

It should be noted that different exciters 400 may be arranged in different sound channels, and the exciters 400 of different sound channels may vibrate separately. Reference can be made to the foregoing embodiments for a specific arrangement method of a plurality of vibration members, and it will not be repeated herein.

In an optional implementation, a silica gel member or a rubber member may be selected as the second elastic support member 900, so as to guarantee a certain compression amount.

In some implementations, as shown in FIG. 26 or 24B, the sound-emitting component further includes a reinforcement plate 600; the reinforcement plate 600 is bonded to a side, facing away from the display panel 100, of the backlight board 210; and the exciter 400 is arranged at a side, facing away from the backlight board 210, of the reinforcement plate 600. The sound-emitting component is configured to drive the backlight board 210 to vibrate and emit sound. A specific transmission path for sound emission is as follows: the gas layer is formed between the backlight board 210 and the display panel 100, and the plurality of second elastic support members 900 are arranged in the gas layer, that is, the second elastic support members 900 are arranged between the backlight board 210 and the display panel 100; and when the exciter 400 vibrates, the backlight board 210 is driven to vibrate, the backlight board 210 may transmit vibration to the second elastic support members 900, and then the second elastic support members 900 transmit vibration to the display panel 100. Thus, self-emission of the sound of the display panel 100 is implemented, then synchronization of the sound and image of the display apparatus 10 is implemented, and sensory experience of the user is improved.

It can be understood that the exciter 400 may be directly fixed at the side, facing away from the display panel 100, of the backlight board 210; or the exciter 400 may be indirectly fixed by first arranging the exciter 400 on the reinforcement plate 600 and then bonding fixedly the reinforcement plate 600 to the backlight board 210. Such an arrangement can facilitate fixing of the exciter 400, and avoid damage to the backlight board 210 caused by direct fixing.

It should be noted that if the backlight boards 210 are fixed to the reinforcement plate 600, adjacent backlight boards 210 may be in hard contact when fixed too tightly and generate noise during vibration. Thus, the fixation accuracy of the backlight boards 210 should be limited to some extent. Optically, the second elastic support members 900 may be arranged in a gap between any two adjacent backlight boards 210, so as to form buffer between the two adjacent backlight boards 210.

In some embodiments, when the snapping-in hole 2111 penetrates the backlight board body 211, a part of an adhesive member is exposed at the snapping-in hole 2111, and an end of the second elastic support member 900 may be fixedly connected to the reinforcement plate 600 through the adhesive member.

In some embodiments, the reinforcement plate 600 is a sandwich plate or a carbon fiber plate; and the sandwich plate may be any one of a honeycomb sandwich plate, a foam sandwich plate, a wood sandwich plate and an acrylic plate, which is low in cost and easy to obtain. The honeycomb sandwich plate may include an aluminum honeycomb sandwich plate, an aramid honeycomb sandwich plate, etc. The foam sandwich plate may be a polyvinyl chloride (PVC) foam sandwich plate, a polymethacrylimide (PMI) foam sandwich plate, etc. The wood sandwich plate may be light wood, such as balsa wood.

It is well known to those skilled in the art that the sound quality may be measured from the aspects of a volume, a frequency response range, timbre, etc. The sound emitted by the sandwich plate has a higher volume as well as a wider and less fluctuating audio response than the sound emitted by the aluminum plate. That is, the sound emitted by the display apparatus 10 may have a desirable sound quality by setting the reinforcement plate 600.

Specifically, the sandwich plate includes a core material and skins, and the skins are bonded to opposite sides of the core material. The material of the skin may be glass fiber cloth, carbon fiber cloth, glass-carbon mixed fiber, aluminum paper, plastic, etc. The core material may be paper, aramid fiber, metal or other hard foam materials.

The reinforcement plate 600 has damping greater than damping of the backlight board body 211, and has a density and mass smaller than a density and mass of a backlight board body 211 in the related art.

By arranging the reinforcement plate 600 with large damping, equivalent damping of the backlight board 210 can be improved, an equivalent density of the backlight board 210 can be reduced, a bending modulus of the backlight board 210 can be improved, the number of mode resonance frequencies can be increased, the frequency response transmitted to the display panel 100 can be improved, and the frequency range of the sound emitted by the display panel 100 can be expanded, to avoid causing obvious peaks and valleys and distortion of an audio response of the display panel 100 and further influencing listening sense.

In addition, since the reinforcement plate 600 has a continuous solid structure, reflection of sound waves in the gap between two adjacent backlight boards 210 can be reduced, and the excited sound waves can be prevented from being distorted after repeated reflection in the gap.

It can be understood that the plurality of backlight boards 210 are arranged abreast on the reinforcement plate 600, and the gap between two adjacent backlight boards 210 may be set as smaller as possible for an acoustic effect of the display apparatus 10, to avoid the case that the gap between two adjacent backlight boards 210 causes vibration division and the acoustic effect is affected. However, if the gap between two adjacent backlight boards 210 is too small, two adjacent backlight boards 210 may collide and further generate noise when the exciter 400 drives the backlight boards 210 to vibrate. Thus, it is necessary to strictly control the gap between two adjacent backlight boards 210. The gap between two adjacent backlight boards 210 may be 1 mm-2 mm.

Figure 76:
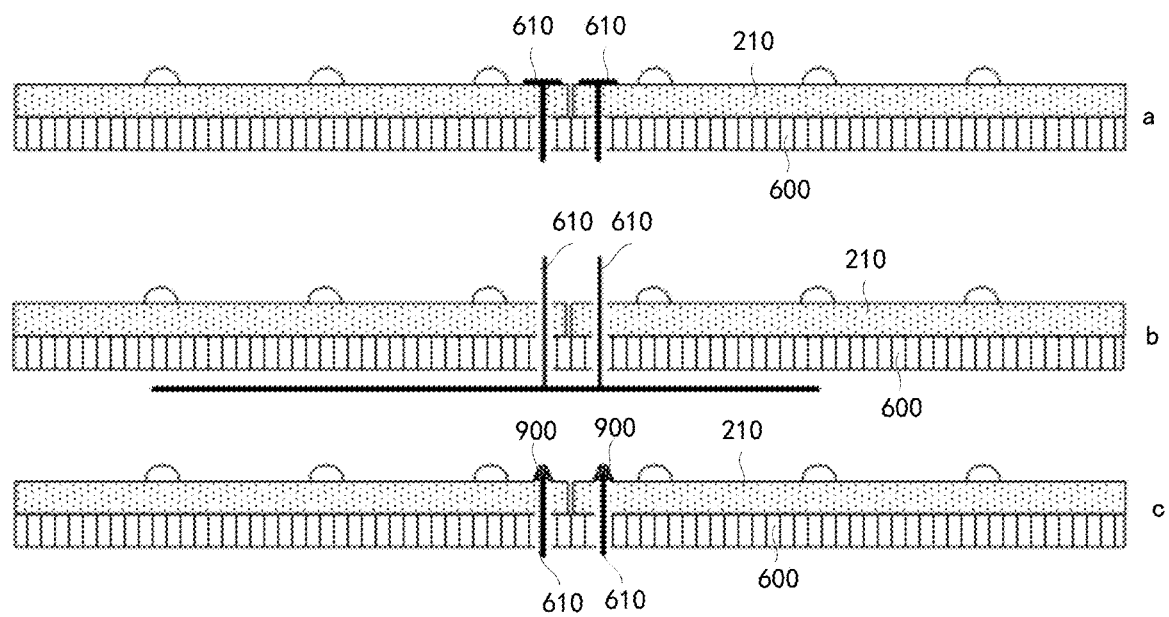
FIG. 76 is a schematic positioned diagram of a backlight board and a reinforcement plate in a display apparatus according to some embodiments of the disclosure.

In some embodiments, in order to control the size of the gap between two adjacent backlight boards 210, the backlight boards 210 and the reinforcement plate 600 may be positioned through a plurality of positioning members 610 during an assembly process of the backlight boards 210 and the reinforcement plate 600 (as shown in figure a to figure c in FIG. 76). Correspondingly, the backlight boards 210 and the reinforcement plate 600 are provided with positioning holes (not shown) for the positioning members 610 to pass therethrough. According to different structures of the positioning members 610, different assembly methods may be adopted.

In some embodiments, when the positioning member 610 is a surface mounted technology (SMT) positioning nail (as shown in figure a in FIG. 76), the positioning member 610 may be assembled by a mounted method, or the positioning member 610 may be fixed through bonding, welding, etc. In the assembly process, the positioning member 610 may firstly penetrate the positioning hole of the backlight board 210, then the positioning member 610 penetrates the positioning hole of the reinforcement plate 600 for pre-positioning, and then the backlight board 210 and the reinforcement plate 600 are bonded. In this way, the positioning accuracy between the backlight board 210 and the reinforcement plate 600 is high. The material of the positioning nail may be metal, plastic, etc.

In some embodiments, the positioning member 610 is a pre-positioning fixture (as shown in figure b in FIG. 76). The pre-positioning fixture sequentially penetrates the positioning holes of the backlight board 210 and the reinforcement plate 600. It can be understood that in this case, after bonding the reinforcement plate 600 to the backlight board 210 is completed, the pre-positioning fixture needs to be removed.

In some embodiments, the positioning member 610 may also be connected to the second elastic support member 900 into a whole (as shown in figure c in FIG. 76). In this way, when the second elastic support member 900 is mounted, the positioning member 610 may penetrate the positioning hole of the backlight board 210, and the assembly difficulty is low. It is unnecessary to remove the positioning member 610 after the reinforcement plate 600 is bonded to the backlight board 210, such that the backlight board 210 and the reinforcement plate 600 are positioned. The material of the positioning member 610 may be metal, plastic, etc.

Figure 77:
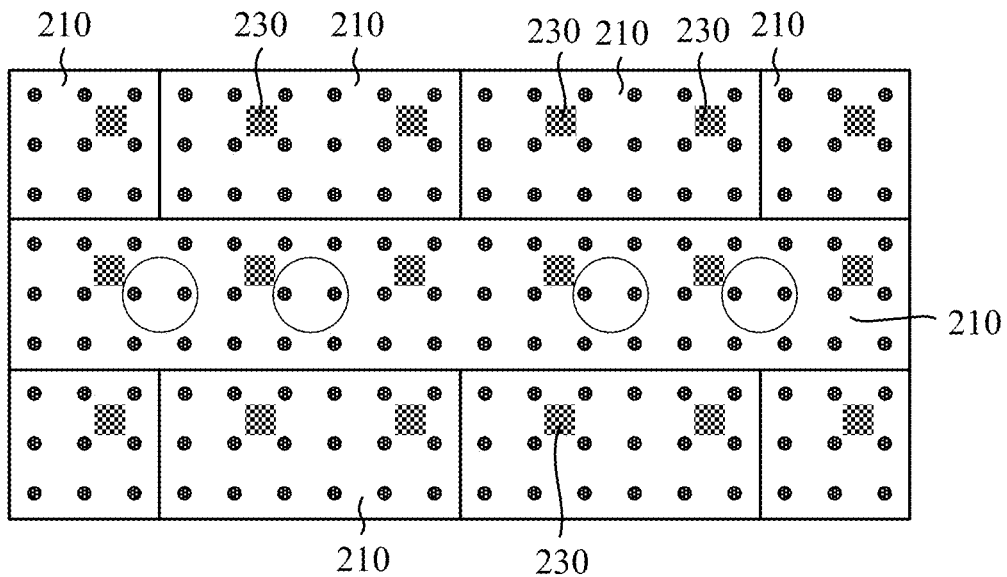
FIG. 77 is a schematic structural diagram of a plurality of backlight boards in a display apparatus according to some embodiments of the disclosure.
Figure 78:
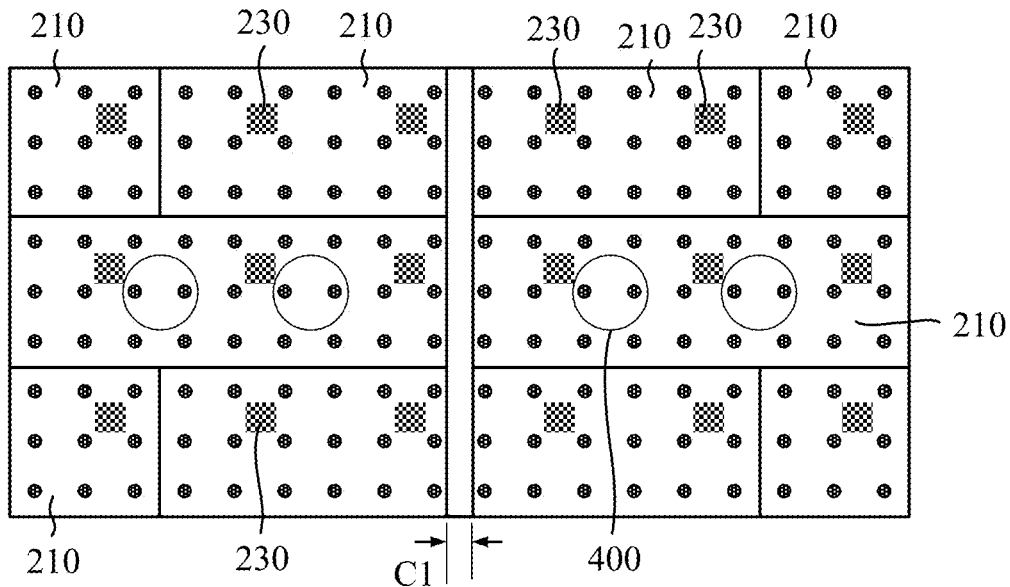
FIG. 78 is another schematic structural diagram of a plurality of backlight boards in a display apparatus according to some embodiments of the disclosure.

In some embodiments, in order to make the exciter 400 excite more abundant vibration modes, the backlight boards 210 may be set in different areas (as shown in FIGS. 77 and 78), for example, areas of the backlight boards 210 are different. In this way, the sound quality of the display apparatus 10 is high.

However, considering that the light sources 212 are usually controlled by the drive chip 230, and each drive chip 230 may control a fixed number (for example, 9) of light sources 212 for reducing an algorithm difficulty of the drive chip 230. The number of light sources 212 on each backlight board 210 may be a multiple of this fixed number (for example, 9, 18, 27 and the like). In this way, the backlight boards 210 can be set in unequal areas, and the algorithm of the drive chip 230 can be simplified.

With FIG. 77 as an example, the display apparatus 10 has four exciters 400, two exciters 400 at a left side are configured to form a left sound channel and two exciters at a right side are configured to form a right sound channel. The lateral length of the backlight board 210 (that is provided with 54 light sources 212) where the four exciters 400 are located may be the same as a length of the reinforcement plate 600. Thus, low-frequency modes are excited conveniently. However, a plurality of backlight boards 210 at an upper side and a lower side of the four exciters 400 are arranged in unequal areas to disperse resonance points, and the backlight boards 210 are symmetrically arranged laterally. The backlight boards 210 arranged in unequal areas are provided with 9 light sources 212 and 18 light sources 212 respectively.

Figure 79:
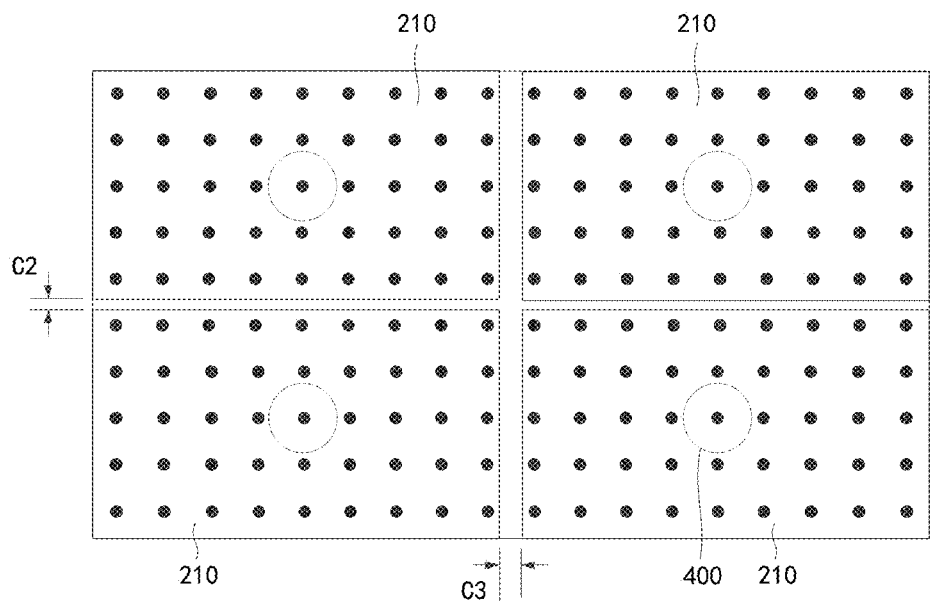
FIG. 79 is yet another schematic structural diagram of a plurality of backlight boards in a display apparatus according to some embodiments of the disclosure.

In some embodiments, the display apparatus 10 may be provided with a plurality of sound channels, such as two sound channels (as shown in FIG. 77) and four sound channels (as shown in FIG. 79). The gap between the backlight boards 210 in adjacent sound channels may be expanded to avoid vibration influence between adjacent sound channels since the gap may consume vibration greatly. That is, the positioning sense between different sound channels may be improved by reducing a low frequency effect of the display apparatus 10.

For example, a first gap C1 is formed between a left sound channel and a right sound channel in FIG. 78, a second gap C2 is formed between an upper sound channel and a lower sound channel in FIG. 79, and a third gap C3 is formed between a left sound channel and a right sound channel in FIG. 79. Sizes of the first gap C1, the second gap C2 and the third gap C3 may be set as required.

Figure 80:
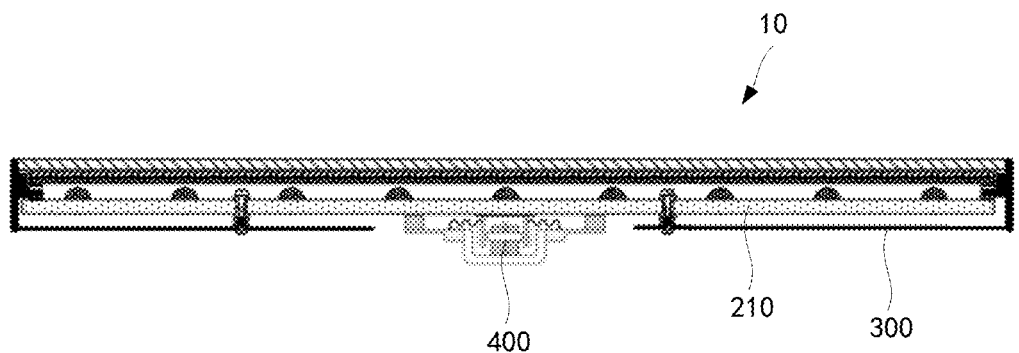
FIG. 80 is a schematic structural diagram of a display apparatus in which no reinforcement plate arranged on a backlight board according to some embodiments of the disclosure.

In some embodiments, when the size of the display apparatus 10 is small, as shown in FIG. 80, the display apparatus 10 may be provided with merely one backlight board 210. The display apparatus 10 may be provided with a reinforcement plate 600 to support the backlight board 210. In this case, in some embodiments, the backlight board 210 may also be fixed to the backplane 300 through a threaded fastener, a rivet, etc. With the threaded fastener as an example, an outer side of the threaded metal member needs to be clad in a second elastic buffer member, to facilitate the vibration of the backlight board 210. A part of the second elastic buffer member is arranged between a head of the threaded fastener and the backlight board 210, and a part of the second elastic buffer member is arranged between the backlight board 210 and the backplane 300.

In some embodiments, an outer side of the periphery of the exciter body 410 may be provided with a plurality of elastic support legs 470, and the material of the elastic support legs 470 may be metal or plastic. As shown in FIGS. 71 and 72, the number of elastic support legs 470 may be 3 to 5, and the exciter body 410 is connected to the backplane 300 or the backlight board 210 through the elastic support legs 470.

When the exciter body 410 is elastically connected to the backplane 300 through elastic material members such as rubber and silica gel (that is, the elastic support legs 470), the exciter body 410 may reciprocate relative to the backplane 300 during vibration of the actuation member 420. In this case, the exciter 400 also drives the backlight board 210 to vibrate in an approximate inertial driving mode, thus preventing the frequency response of the display apparatus 10 from being affected due to relative fixation of the exciter body 410 and the backplane 300. The backplane 300 is a metal member and may provide better support for the exciter body 410.

The plurality of elastic support legs 470 are arranged at intervals at the periphery of the exciter body, such that there are a plurality of connection positions between the exciter body and the display panel 100, and the fixing stability of the exciter 400 is high.

The elastic support legs 470 protrude from the outer wall surface of the exciter body and are connected to the backplane 300 or the backlight board 210. Since the elastic support legs 470 may be elastically deformed, the exciter body and the backlight board 210 may move relatively, that is, during the vibration of the exciter 400, the exciter body may vibrate relative to the backlight board 210. In this way, the exciter 400 can drive, in an inertial driving mode, the display panel 100 to vibrate, and the low-frequency sound with better sound effects can be excited accordingly.

The elastic support leg 470 may extend in a rectilinear direction (not shown), and is easy to mold with a simple structure. In some embodiments, the elastic support leg 470 may also extend in a peripheral direction of the exciter body 410 (as shown in FIG. 71), that is, the elastic support leg 470 is arc-shaped. In this way, the elastic support leg 470 has a large length and a large elastic deformation amount, and a relative displacement amount between the exciter body and the backplane 300 or the backlight board 210 can be large. The exciter 400 can easily drive, in an inertial driving mode, the backlight board 210 to vibrate, and the low-frequency sound with better sound effects can be excited accordingly.

It can be understood that a free end of the elastic support leg 470 may also have a support sub-structure, thus increasing connection positions with the backplane 300 or the backlight board 210 and improving the connection stability. Alternatively, the elastic support leg 470 may be bent in a wavy shape, such that the elastic support leg 470 has a large elastic deformation amount. The shape, the size and the like of the elastic support leg 470 are not limited in the embodiments.

In some embodiments, with reference to FIGS. 4, 5, 34, 36, 40, 41, 43, 56, 58 and 59, the exciter body 410 is connected to the backlight board body 211. With the electromagnetic exciter as an example, the yoke 442 is connected to the backlight board 210 through the elastic support legs 470, and the end of the elastic support leg 470 is provided with a third elastic buffer member. The third elastic buffer member is a damping block 480, such as a double-sided tape and foam. In this way, a large relative movement amplitude can be allowed between the elastic support legs 470 and the backlight board 210, such that the exciter 400 can drive, in an inertial driving mode, the display panel 100 to vibrate.

In this way, when the exciter 400 works, the voice coil can generate high-frequency vibration and drive the backlight board 210 to vibrate. Through reaction force of the voice coil, the exciter body 410 can drive the backlight board 210 to vibrate with low-frequency vibration, that is, the exciter body 410 vibrates as the backlight board 210 vibrates, and the exciter 400 drives, in an inertial driving mode, the backlight board 210 to vibrate.

It can be seen from the formula (1) that: connecting the exciter body 410 to the backlight board body 211 may be understood as addition of a vibration weight onto the backlight board body 211. Thus, for the flat panel structure composed of the display panel 100 and the backlight board 210 equivalently, it is equivalent to increasing the equivalent density of the flat panel structure, the first-order mode frequency f11 is reduced, and the low-frequency sound with better sound effects can be easily excited.

It can be understood that when the backlight board 210 is provided with the reinforcement plate 600, the exciter body 410 is connected to the reinforcement plate 600. It should be noted that the reinforcement plate is not shown in FIGS. 4, 5, 34, 36, 40, 41, 43, 56, 58 and 59 for simplifying the schematic diagram.

In some embodiments, with reference to FIGS. 6, 33, 35, 39, 40, 42 and 57, the exciter body 410 may be further connected to the backplane 300. In some embodiments, the elastic support leg 470 is connected to the backplane 300 through a set pin. The set pin may be perpendicular to the backplane 300. The display apparatus 10 further includes a first elastic support member 460, and the exciter body 410 is connected to the backplane 300 through the first elastic support member 460.

The material of the first elastic support member 460 may be silica gel, rubber, etc. The first elastic support member 460 may sleeve an outer side of the set pin, and an outer wall surface of the first elastic support member 460 is provided with a snapping-in recess in which an extension portion is snapped. In this way, two sides of the extension portion have parts of the first elastic support member 460, that is, a cross section of the first elastic support member 460 may be approximately I-shaped. Thus, interference between the elastic support leg 470 and the set pin or the backplane 300 during the vibration of the exciter 400 is avoided. The structure and the material of the first elastic support member 460 is not limited in the embodiments.

A direction of the elastic force of the first elastic support member 460 is parallel to the thickness direction of the display apparatus 10, such that a variable relative position is formed between the exciter body 410 and the backplane 300. That is, the exciter body 410 may reciprocate relative to the backplane 300 during vibration of the exciter 400. In this case, the exciter 400 also drives the backlight board 210 to vibrate in an approximate inertial driving mode, thus preventing the frequency response of the display apparatus 10 from being affected due to relative fixation of the exciter body 410 and the backplane 300.

It can be understood that a central position of the backlight board 210 is deformed to a greater extent relative to an edge position of the backlight board. When the exciter 400 is fixed to the backplane 300, the voice coil may be pulled or compressed due to the deformation of the backlight board 210, resulting in that the voice coil deviates from a center of the magnetic field. By arranging the first elastic support member 460, the position of the voice coil can be adjusted. That is, the voice coil can be adjusted adaptively through the first elastic support member 460, thus preventing the voice coil from colliding and interfering with the yoke 442 or the washer 443.

In some embodiments, one or a plurality of exciters 400 may be provided, and the plurality of exciters 400 are arranged at intervals. In this way, the plurality of exciters 400 can form a stereo system, that is, different exciters 400 may be arranged in different sound channels. It can be understood that each sound channel may correspond to one or more exciters 400, thus improving the user experience.

Figure 60:
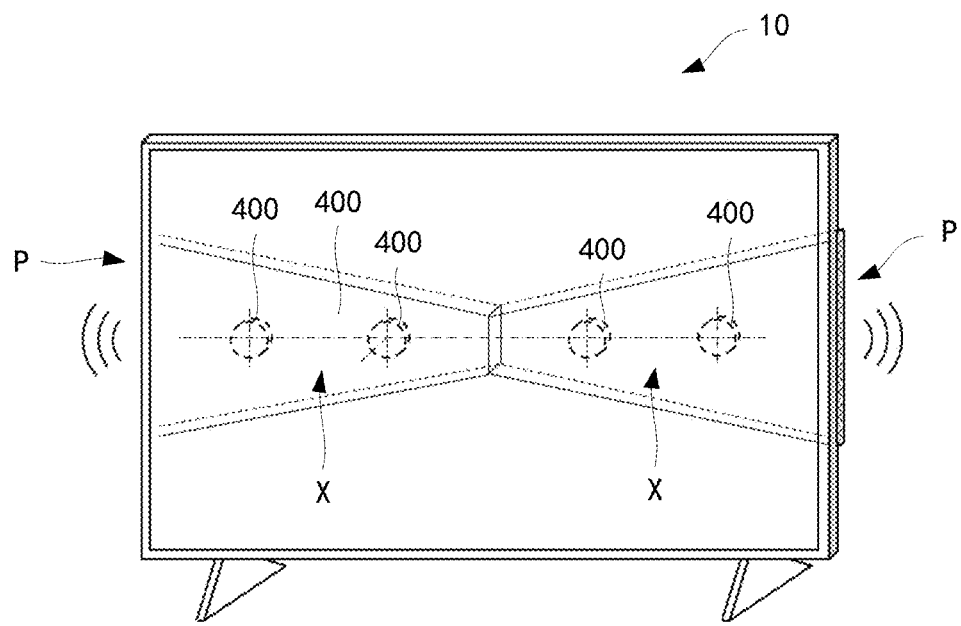
FIG. 60 is another schematic structural diagram of a display apparatus according to some embodiments of the disclosure.
Figure 61:
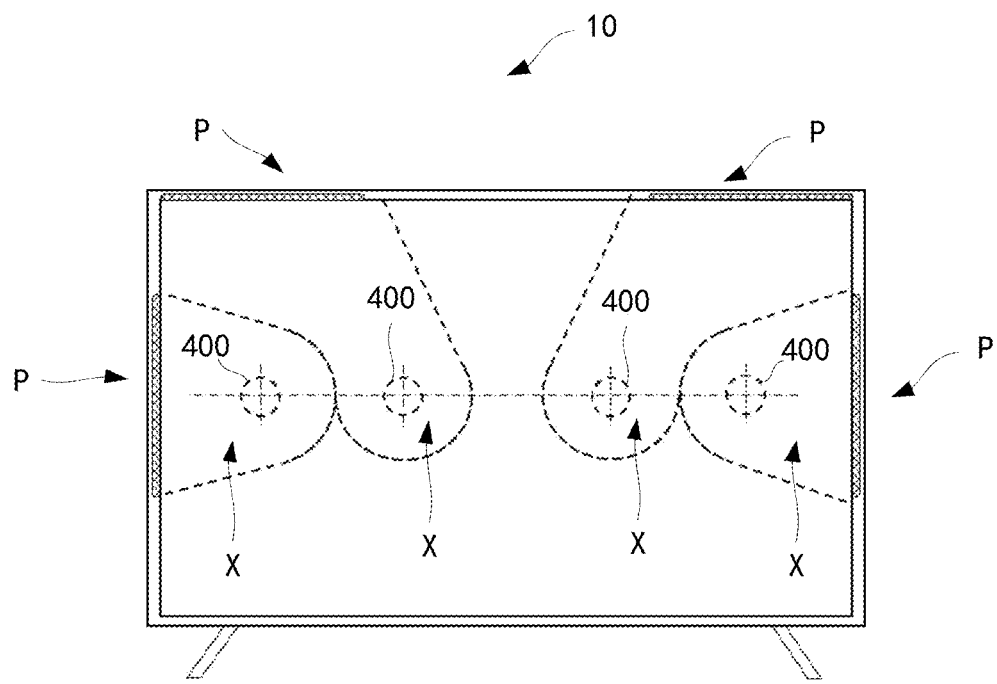
FIG. 61 is yet another schematic structural diagram of a display apparatus according to some embodiments of the disclosure.
Figure 62:
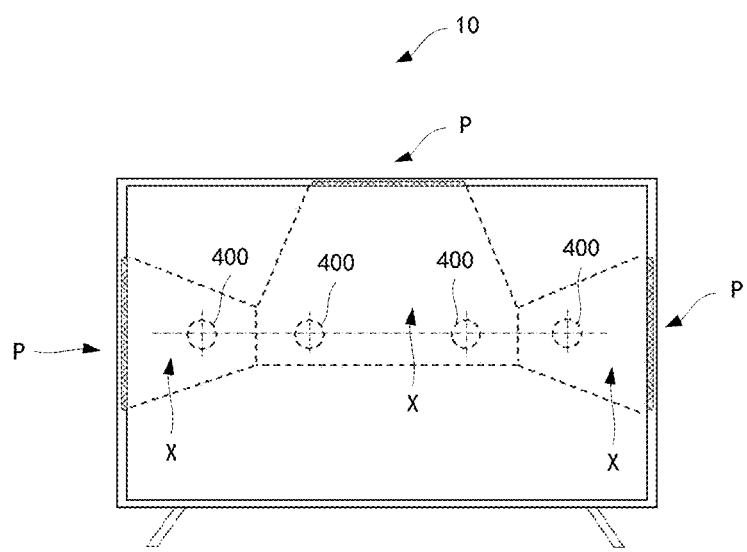
FIG. 62 is still another schematic structural diagram of a display apparatus according to some embodiments of the disclosure.

With reference to FIGS. 60-62, in order to improve the high-frequency effect of the display apparatus 10, this embodiment may adopt a superposition mode of multimode high-frequency vibration flexural waves. In some embodiments, the display apparatus 10 further includes a separation member 700, and two ends of the separation member 700 are connected to the backplane 300 and the rear shell 500 respectively, so as to divide the sound output cavity Q into a plurality of resonance cavities X. In this way, sound waves emitted by the vibrating reed 430 in each resonance cavity X can resonate in a corresponding resonance cavity X.

Resonance frequencies of the resonance cavities X may be different, such that the resonance cavities X can emit sound waves with different frequencies. A high-frequency resonance frequency range of the display apparatus 10 is wide, and a high sound pressure level can be obtained in a wide frequency range.

In order to avoid mutual influence between two adjacent resonance cavities X, the separation member 700 may include a sound insulation material. In some embodiments, one end of the separation member 700 is fixedly connected to one of the backplane 300 and the rear shell 500, and the other end of the separation member is separated from the other one of the backplane 300 and the rear shell 500. For example, a first end of the separation member 700 is integrally formed with the rear shell 500, and soundproof sponge 710 is filled between a second end of the separation member 700 and the backplane 300.

At least one exciter 400 is arranged in each resonance cavity X, that is, at least one vibrating reed 430 is correspondingly arranged in each resonance cavity X. Each resonance cavity X is correspondingly provided with a sound output opening P, and the sound output opening P is configured to guide out sound waves emitted by vibration of the vibrating reed 430, so as to compensate for the high frequency.

A shape and a size of the resonance cavity X and an arrangement location of the exciter 400 in the resonance cavity X may be determined through mode analysis, and are not limited in the embodiments.

With FIG. 60 as an example, a plurality of exciters 400 are arranged at intervals in a horizontal direction, and the separation member 700 separates the sound output cavity Q into two resonance cavities X. Each resonance cavity X extends in the horizontal direction. The sound output openings P of the two resonance cavities X are located at the left side and the right side of the display apparatus 10 respectively. A length of a sound output path of the resonance cavity X is denoted by L, and the length L of the sound output path is an integer multiple of half a wavelength of sound waves, for example, a multiple of one, two or more. The exciter 400 may be arranged at a position of any antinode of half the wavelength of sound waves.

In some embodiments, the sound output opening P may be located at any side position of the display apparatus 10, such as the left side, the right side or the upper side. The sound output opening P may propagate high-frequency sound waves towards the front side or a lateral-frontal side of the display apparatus 10.

Figure 49:
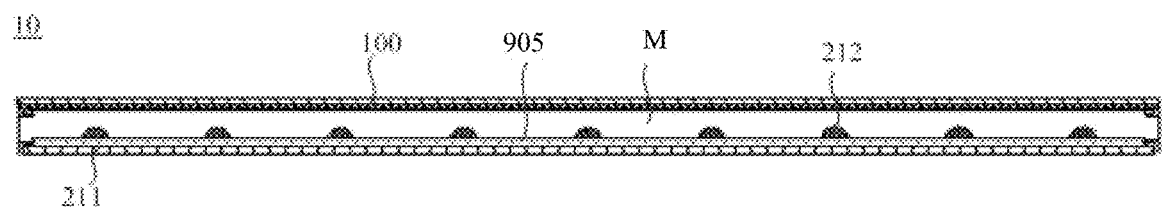
FIG. 49 is a first schematic diagram of a sectional view of an internal structure of a display apparatus according to some embodiments of the disclosure.

In some other embodiments, with reference to FIG. 49, the display apparatus 10 further includes a filling layer 905. By setting the filling layer 905 in the gas layer M formed between the backlight board body 211 and the display panel 100, the gap of the gas layer M between the backlight board body 211 and the display panel 100 is reduced, the sensitivity to the gas pressure change of the gas layer M caused by the vibration and deformation of the backlight board body 211 is improved, and then the sound-emitting effect of the display panel 100 is improved.

In some embodiments, the filling layer 905 is laid on a side, facing the display panel 100, of the backlight board body 211 and connected to the backlight board body 211.

The filling layer 905 may be bonded to the side, facing the display panel 100, of the backlight board body 211 by a foam double-sided tape, a UV glue, etc. Thus, the gap of the gas layer M between the backlight board body 211 and the display panel 100 is reduced through the filling layer 905.

It is clear that the filling layer 905 may also be connected to the backlight board body 211 through snapping-in, screwing, etc., as long as the filling layer 905 can be connected to the backlight board body 211.

In some embodiments, as shown in FIG. 49, a height of the filling layer 905 is smaller than the gap of the gas layer M between the backlight board body 211 and the display panel 100. Thus, the gap of the gas layer M between the backlight board body 211 and the display panel 100 keeps stable, so that while the exciter 400 drives the backlight board body 211 to vibrate, and drives the display panel 100 to vibrate and emit sound through the gas layer M, high sensitivity to the gas pressure change of the gas layer M caused by the vibration and deformation of the backlight board body 211 is guaranteed, and then the sound-emitting effect of the display panel 100 is improved.

It should be noted that the height of the filling layer 905 refers to a size of the filling layer 905 extending from the side, facing the display panel 100, of the backlight board body 211 to a side of the display panel 100.

In some embodiments, the height of the filling layer 905 is lower than a height of the light source 212, such that the filling layer 905 can avoid a direct illumination range of the light source 212, to avoid the case that the filling layer 905 interferes with a direct illumination path of the light source 212 and the display effect of the display panel 100 is affected.

In some embodiments, a projection of the filling layer 905 on the backlight board body 211 covers the backlight board body 211. For example, an area of the filling layer 905 is equivalent to an area of the backlight board body 211, such that the projection of the filling layer 905 on the backlight board body 211 coincides with the backlight board body 211.

In the solution described above, the filling layer 905 is arranged at the side, facing the display panel 100, of the backlight board body 211; and the projection of the filling layer 905 on the backlight board 210 covers the backlight board body 211. In this way, the filling layer 905 can have an integrated structure, such that a manufacturing process and a mounting process of the filling layer 905 can be reduced, and manufacturing and mounting costs can be further reduced.

In some embodiments, the filling layer 905 may be provided with a via hole for the light source 212 to be mounted. For example, when the light source 212 is a lamp bead, the filling layer 905 may be provided with via holes provided at intervals through integral forming, such that the lamp bead may be placed in the via hole and connected to the backlight board body 211. Alternatively, the light source 212 is a light bar structure arranged laterally or longitudinally, and a via hole that matches the shape of the light bar and places the light bar may be provided in the filling layer 905 through an integral forming process, such that the light bar may be placed in the via hole and connected to the backlight board body 211.

It should be noted that after the lamp bead or light bar is mounted in the via hole in the filling layer 905, the lamp bead or the light bar protrudes from the filling layer 905, as long as the lamp bead or light bar can emit light normally, and the filling layer 905 does not interfere with a direct illumination range of the lamp bead or light bar.

In some embodiments, the filling layer 905 or the filling protrusion 901 is merely arranged in the gas layer M, and the gap of the gas layer M is reduced by the filling layer 905 or the filling protrusion 901.

Figure 50:
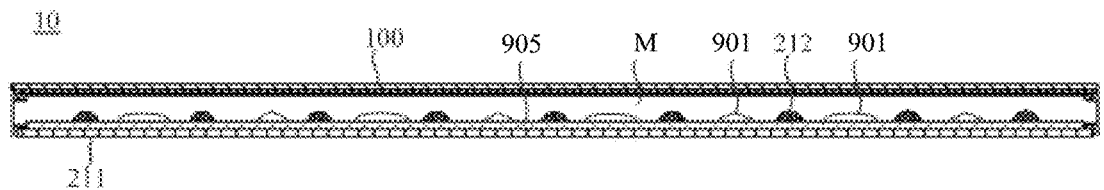
FIG. 50 is a second schematic diagram of a sectional view of an internal structure of a display apparatus according to some embodiments of the disclosure.

In some embodiments, with reference to FIG. 50, the display apparatus 10 further includes a plurality of filling protrusions 901 and a filling layer 905, and the plurality of filling protrusions 901 are arranged at intervals on the filling layer 905. In this way, the filling layer 905 and the plurality of filling protrusions 901 arranged on the filling layer 905 are used to reduce the gas layer M formed between the backlight board body 211 and the display panel 100 jointly, the sensitivity to the gas pressure change of the gas layer M caused by the vibration and deformation of the backlight board body 211 is improved, and then the sound-emitting effect of the display panel 100 is improved.

In some embodiments, the filling layer 905 is laid on a surface of a side, facing the display panel 100, of the backlight board body 211; and the plurality of filling protrusions 901 are arranged between the filling layer 905 and the display panel 100. The filling protrusions 901 and the light sources 212 protrude from the surface, facing the display panel 100, of the filling layer 905. In addition, the filling protrusion 901 is arranged between any adjacent light sources 212, such that the filling protrusion 901 can avoid the direct illumination range of the light sources 212, and the display effect of the display panel 100 is improved.

It can be understood that by arranging the filling protrusions 901 on the filling layer 905, the gap of the gas layer M between the backlight board body 211 and the display panel 100 can be further reduced.

In some embodiments, the filling protrusions 901 may be connected to the filling layer 905, to form an integral structure. Thus, mounting is facilitated, mounting difficulty is reduced, and a mounting cost is reduced.

Illustratively, the filling protrusions 901 and the filling layer 905 may be formed into an integral member through an integral forming process such as injection molding. In this way, the manufacturing process can be simplified, the mounting difficulty can be reduced, and the processing cost can be reduced.

It should be noted that in the extension direction from the backlight board body to the display panel 100, a size of a section of the filling protrusion 901 arranged on the filling layer 905 is gradually reduced, and a pyramidal structure, such as a rectangular pyramid, is formed accordingly, to avoid the case that the filling protrusion 901 interferes with the direct illumination range of the light source 212 and the display effect of the display panel 100 is affected.

In some embodiments, the filling protrusions 901 arranged on the filling layer 905 are arranged at intervals between any adjacent light sources 212, for example, the filling protrusions 901 are arranged between any four adjacent light sources 212. Thus, the filling protrusions 901 are arranged outside a direct illumination region of the light sources 212, and the filling protrusions 901 can be prevented from blocking illumination paths of the light sources 212, to avoid the problem of forming dark spots on the display panel 100, and further improve the display effect of the display panel 100.

In addition, a height of the filling protrusion 901 protruding from the filling layer 905 may be less than or equal to a height of the light source 212 protruding from the filling layer 905, such that the filling protrusion 901 is arranged outside the direct illumination region of the light source 212.

In order to reduce a weight of the display apparatus 10, in the embodiments of the disclosure, the filling protrusions 901 and the filling layer 905 may be made from light and high-density materials, for example, light and high-density foam materials such as melamine materials may be used.

Figure 51:
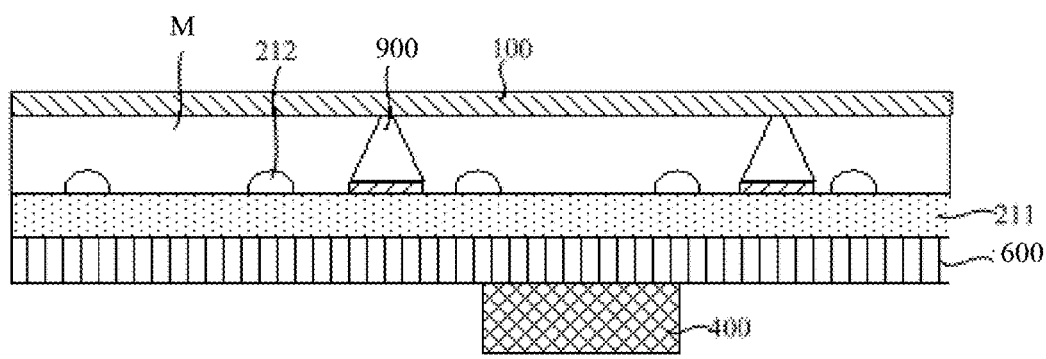
FIG. 51 is a third schematic diagram of a sectional view of an internal structure of a display apparatus according to some embodiments of the disclosure.

In some other embodiments, with reference to FIG. 51, the display apparatus may further include second elastic support members 900. The material of the second elastic support member 900 may be silica gel or rubber. A plurality of second elastic support members 900 are provided, and the plurality of second elastic support members 900 are arranged at intervals.

One end of the second elastic support member 900 is connected to the backlight board body 211, and the other end abuts against the display panel 100. Thus, the second elastic support member 900 is supported between the backlight board body 211 and the display panel 100, the gap of the gas layer M keeps stable, collision and noise generation between the light sources 212 and the display panel 100 caused by vibration and deformation of the gas layer M between the light sources 212 and the display panel 100 is avoided, and the sound-emitting effect of the display panel 100 can be further improved.

In some embodiments, the second elastic support member 900 is fixedly connected to the backlight board body 211. For example, the second elastic support member 900 may be bonded fixedly to the backlight board body 211 through a third adhesive member. The third adhesive member may be the UV glue, the foam double-sided tape, etc. Thus, the second elastic support member 900 is prevented from moving relative to the backlight board body 211, and support reliability of the second elastic support member 900 is improved.

In some embodiments, a shape of a section (this section is perpendicular to the display apparatus) of the second elastic support member 900 may be a rectangle, a cone, a trapezoid, a dumbbell shape or other shapes.

Illustratively, the second elastic support member 900 may have a conical structure or a quadrangular pyramid-shaped structure. A size of a cross section of the second elastic support member 900 may be gradually decreased from an end of the backlight board body 211 to an end of the display panel 100. A light beam emitted by the light source 212 is adjacent to an outer wall surface of the second elastic support member 900. That is, the second elastic support member 900 is not arranged in a path of the light emitted by the light source 212. In this way, brightness distribution of the display screen can be even.

In some embodiments, with consideration of a large size of the display apparatus, the backlight board body 211 or the display panel 100 may be deformed during an assembly process of the display apparatus. That is, the gap between the backlight board body 211 and the display panel 100 is different in size at different positions of the display apparatus. By arranging the plurality of second elastic support members 900 between the backlight board body 211 and the display panel 100, the gap between the backlight board body 211 and the display panel 100 can be maintained within a preset range, and the case that the light source 212 is in contact with the display panel 100 at some position is avoided.

In some embodiments, the display panel 100 and the light source 212 may abut against each other in the thickness direction of the display apparatus 10. In this way, the gap of the gas layer M is small and a thickness of the display apparatus is small. In this case, the material of the light source 212 may be a flexible encapsulation material, to avoid noise generation by rigid collision between the display panel 100 and the light source 212.

In some embodiments, the display panel 100 may be separated from the light source 212, to avoid noise generation by rigid collision between the display panel 100 and the light source 212.

Figure 52:
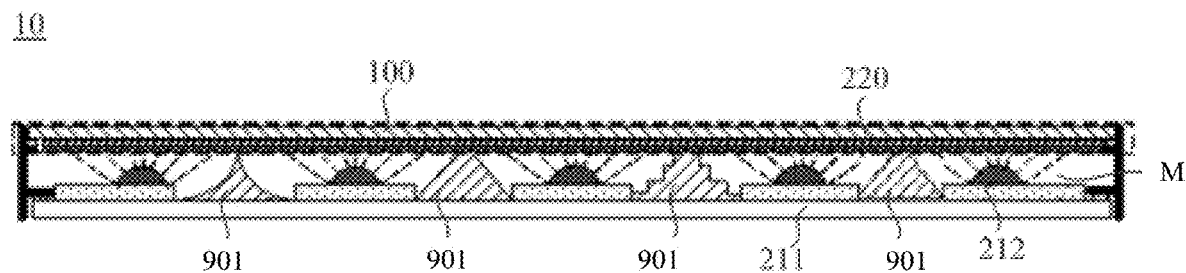
FIG. 52 is a fourth schematic diagram of a sectional view of an internal structure of a display apparatus according to some embodiments of the disclosure.

In some embodiments, the filling protrusion 901 protrudes from the backlight board body 211 and extends towards the side of the display panel 100, and the height of the filling protrusion 901 is the same as the gap of the gas layer M, that is, one end of the filling protrusion 901 is connected to the backlight board body 211, and the other end of the filling protrusion 901 abuts against the display panel 100, as shown in FIG. 52. In this way, the filling protrusion 901 can be used as the second elastic support member 900, so as to support the backlight board body 211 and the display panel 100, so that the gap of the gas layer M formed between the backlight board body 211 and the display panel 100 can keep stable.

It can be understood that one end of the filling protrusion 901 is fixedly connected to the backlight board body 211, and the other end of the filling protrusion 901 abuts against the display panel 100. Thus, the filling protrusion 901 is supported between the backlight board body 211 and the display panel 100. In addition to reducing the gap of the gas layer M and supporting the display panel 100, the filling protrusion 901 can also be used as the second elastic support member for transmitting vibration, such that vibration of the backlight board body 211 is transmitted to the display panel 100 through the filling protrusion 901. In this way, the vibration transmission efficiency can be improved.

The filling protrusion 901 may also be fixed to the backlight board body 211 through bonding, screwing, or snapping-in, etc.

In addition, by using the filling protrusion 901 as a pop-up support member, parts in the display apparatus 10 can be reduced, thus reducing mounting process steps and the process cost.

Figure 53:
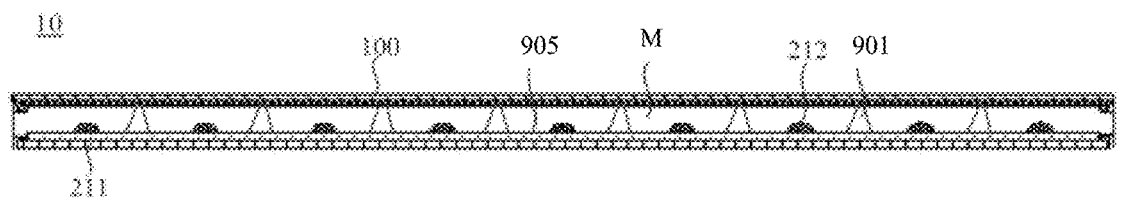
FIG. 53 is a fifth schematic diagram of a sectional view of an internal structure of a display apparatus according to some embodiments of the disclosure.

In some other embodiments, as shown in FIG. 53, the filling layer 905 and the plurality of filling protrusions 901 arranged on the filling layer 905 are arranged in the gas layer M, the filling protrusion 901 protrudes from the filling layer 905 and extends towards the side of the display panel 100, and the height of the filling layer 905 and the filling protrusion 901 is the same as the gap of the gas layer M. That is, the filling layer 905 is laid on the side, facing the display panel 100, of the backlight board body 211 and is connected to the backlight board body 211; and one end of the filling protrusion 901 is fixedly connected to the filling layer 905, and the other end of the filling protrusion 901 abuts against the display panel 100. In this way, the filling layer 905 and the filling protrusion 901 are used as the second elastic support member 900 jointly, so as to support the backlight board body 211 and the display panel 100, so that the gap of the gas layer M formed between the backlight board body 211 and the display panel 100 can keep stable. In addition, the filling layer 905 and the filling protrusion 901 arranged on the filling layer 905 may also be used as the second elastic support member for transmitting vibration, so as to transmit vibration of the backlight board body 211 to the display panel 100 through the filling protrusion 901. In this way, the vibration transmission efficiency can be improved.

Figure 54:
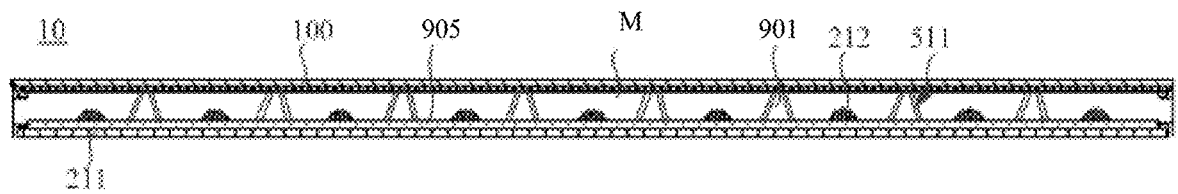
FIG. 54 is a sixth schematic diagram of a sectional view of an internal structure of a display apparatus according to some embodiments of the disclosure.

In addition, in order to reduce influence of the filling protrusion 901 on direct illumination of the light source 212, the surface of the filling protrusion 901 may be provided with a reflective layer 511. Illustratively, as shown in FIG. 54, the reflective layer 511 covers the surface of the filling protrusion 901.

It can be understood that the reflective layer 511 covering the surface of the filling protrusion 901 is arranged on the surface of the filling protrusion 901, so as to reduce absorption of the light emitted by the light source 212 by the filling protrusion 901. Thus, the display effect of the display panel 100 can be improved.

Illustratively, the reflective layer 511 may be a diffuse reflection film layer. For example, the reflective layer 511 made from a diffuse reflecting material may be attached to the surface of the filling protrusion 901 through processes such as spraying and pasting. Thus, light absorption of the filling protrusion 901 is reduced.

It should be noted that in order to reduce the influence of the filling protrusion 901 on absorption of the light emitted by the light source 212, in the embodiments of the disclosure, no matter whether the filling protrusion 901 is merely arranged in the gas layer M or the filling layer 905 and the filling protrusion 901 are arranged in the gas layer M, the reflective layer 511 is arranged on the surface of the filling protrusion 901, so as to reduce the absorption, by the filling protrusion 901, of the light emitted by the light source 212. Thus, the display effect of the display panel 100 can be improved.

Figure 55:
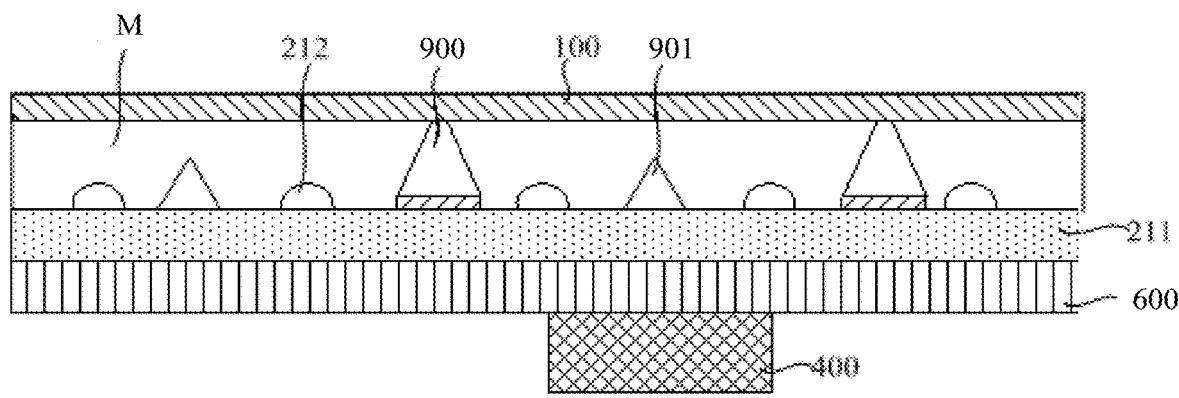
FIG. 55 is a seventh schematic diagram of a sectional view of an internal structure of a display apparatus according to some embodiments of the disclosure.

In some embodiments, as shown in FIG. 55, the display apparatus may be provided with the second elastic support member 900, the filling protrusion 901 and/or the filling layer 905 at the same time. For example, when a plurality of filling bodies are provided in the gas layer M, or the filling layer 905 and the filling protrusion 901 arranged on the filling layer 905 are arranged in the gas layer M, one end of the second elastic support member is connected to the backlight board body 211, and the other end of the second elastic support member 900 abuts against the display panel. The end, facing the display panel, of the filling protrusion 901 may abut against the display panel or have a gap with the display panel, that is, the height of the filling protrusion 901 is lower than the height of the second elastic support member 900.

When the height of the filling protrusion 901 is smaller than the height of the second elastic support member 900, the filling protrusion 901 is merely configured to reduce the gap of the gas layer M, and the second elastic support member 900 is mainly configured to support the backlight board body 211 and the display panel while reducing the gap of the gas layer M. However, when the height of the filling protrusion 901 is equal to the height of the second elastic support member 900, that is, both the filling protrusion 901 and the second elastic support member 900 abut against the display panel, the filling protrusion 901 and the second elastic support member 900 can jointly reduce the gap of the gas layer M, and can also jointly support the backlight board body 211 and the display panel, such that the support reliability of the display panel can be improved.

Alternatively, the gas layer M is merely provided with the filling layer 905, and the second elastic support member 900 protrudes from the surface of the filling layer 905 and abuts against the display panel. In this way, the filling layer 905 is configured to reduce the gap of the gas layer M, and the second elastic support member 900 is configured to support the display panel, to avoid deformation of the display panel, which may cause contact between the light source 212 and the display panel.

Figure 82:
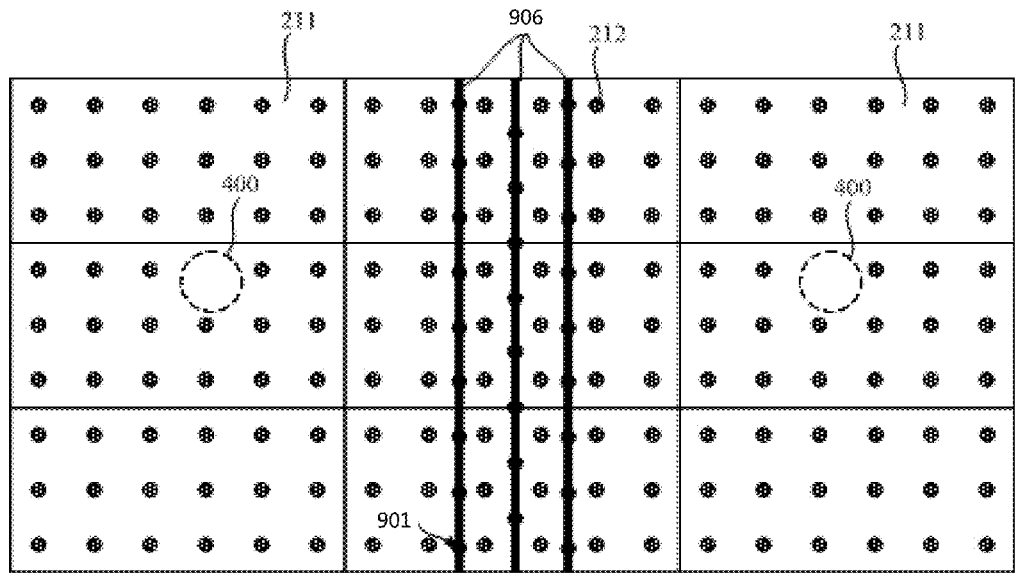
FIG. 82 is an eighth schematic diagram of a sectional view of an internal structure of a display apparatus according to some embodiments of the disclosure.
Figure 83:
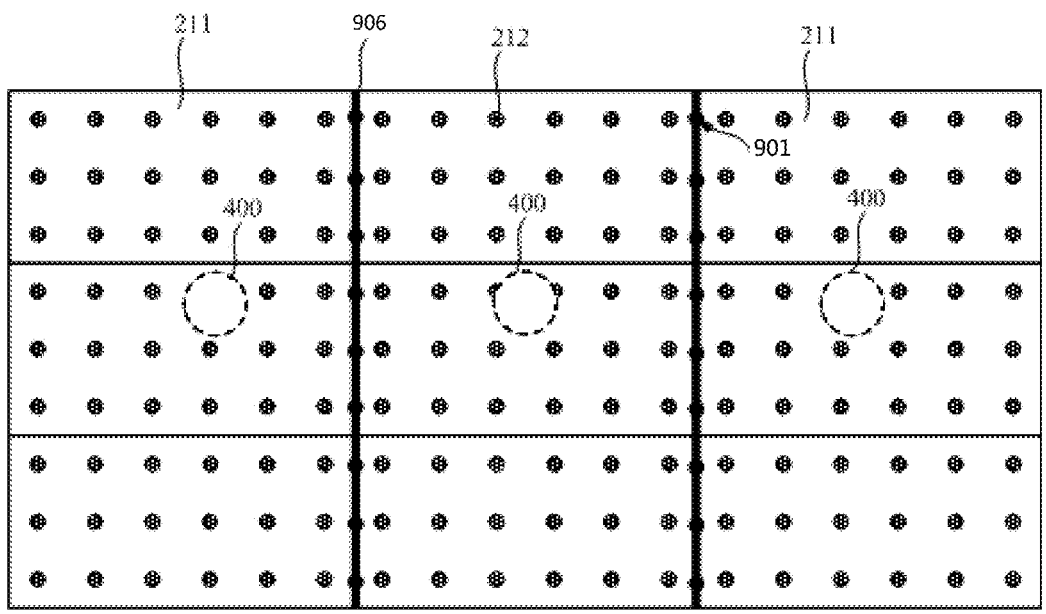
FIG. 83 is a ninth schematic diagram of a sectional view of an internal structure of a display apparatus according to some embodiments of the disclosure.

FIG. 82 is an eighth schematic diagram of a sectional view of an internal structure of a display apparatus according to some embodiments of the disclosure. FIG. 83 is a ninth schematic diagram of a sectional view of an internal structure of a display apparatus according to some embodiments of the disclosure. With reference to FIGS. 82 and 83, in some embodiments, a plurality of exciters 400 may be provided. The plurality of exciters 400 may be uniformly arranged at the side, facing away from the display panel, of the backlight board, or may be arranged non-uniformly according to demand. Different exciters 400 may be arranged in different sound channels, and the exciters 400 of different sound channels may vibrate separately. In order to reduce vibration influence between different exciters 400, two adjacent exciters 400 may be isolated through a sound channel isolation structure 906, that is, the sound channel isolation structure 906 is arranged between regions where different exciters 400 are located. Thus, voice isolation between sound channels is improved, vibration influence among the sound channel vibration regions is reduced, and the sound-emitting effect of the display apparatus is improved.

As shown in FIG. 82, the sound channel isolation structure 906 is configured to isolate a left exciter and a right exciter 400. In FIG. 83, two sound channel isolation structures 906 are arranged to isolate regions where the three exciters 400 are located. It can be understood that in the embodiments of the disclosure, isolation of more sound channel vibration regions can be improved.

In some embodiments, the sound channel isolation structure 906 may be made from an elastic buffering material. For example, the sound channel isolation structure 906 may be an isolation bar made from the elastic buffering material, and the isolation bar is arranged between two adjacent exciters 400. One or more isolation bars are provided between two adjacent exciters 400. For example, in FIG. 82, the number of isolation bars between two adjacent exciters 400 is three.

In some embodiments, in order to solve a problem of a complicated mounting process due to the plurality of filling protrusions 901, the plurality of the filling protrusions 901 may be connected into a whole through the sound channel isolation structure 906, for example, the sound channel isolation structure 906 may be integrally formed with the corresponding filling protrusions 901. In this way, the mounting difficulty of the filling protrusions 901 can be effectively reduced.

In some embodiments, the filling protrusions 901 on adjacent sound channel isolation structures 906 may be staggered (as shown in FIG. 82). Thus, the vibration can be effectively attenuated through the sound channel isolation structures 906, the sound isolation between sound channels is further optimized, vibration influence among the sound channel vibration regions is reduced, and the sound-emitting effect of the display apparatus is improved.

It can be understood that the embodiment of the disclosure can be expanded to include a case that the sound channel isolation structure 906 and the plurality of second elastic support members 900 are integrally formed. In this way, the difficulty of the mounting process of the plurality of second elastic support members 900 can be reduced.

With reference to FIGS. 56-59, the backplane 300 includes a backplane body 310, and the backplane body 310 is configured to support the backlight board 210 and the display panel 100. The backplane 300 further includes a first lateral plate 320, and the first lateral plate 320 extends along an edge of the backplane body 310 and protrudes from the backplane body 310 towards a side of the display panel 100, that is, the first lateral plate 320 protrudes from a front side of the backplane body 310. In this way, the first lateral plate 320 is arranged around outer sides of the peripheries of the backlight board 210 and the display panel 100.

The rear shell 500 includes a rear shell body 510 and a second lateral plate 520. The second lateral plate 520 extends along an edge of the rear shell body 510 and protrudes from the rear shell body 510 towards a side of the display panel 100. That is, the rear shell body 510 is located at a rear side of the backplane body 310, the second lateral plate 520 protrudes from the front side of the rear shell body 510, and the second lateral plate 520 is arranged around an outer side of the first lateral plate 320.

In this way, the backplane body 310 and the rear shell body 510 define a sound output cavity Q, and a part of the exciter body 410 extends into the sound output cavity Q. That is, the vibrating reed 430 is located between the backplane body 310 and the rear shell body 510.

The sound output opening P may be formed in the rear shell body 510 or the second lateral plate 520. In some embodiments, the sound output opening P is located between the first lateral plate 320 and the second lateral plate 520.

The sound output opening P may extend along the periphery of the display apparatus 10, that is, four sides of the display apparatus 10 form the sound output openings P.

Alternatively, the sound output opening P may be provided at some positions of a side. For example, when an opening of the resonance cavity X is located at the left side, an extension length of the opening of the resonance cavity X is smaller than a length of the left side of the display apparatus 10. That is, when a closed structure is not arranged at some positions of the first lateral plate 320 and the second lateral plate 520, a gap is formed between the first lateral plate 320 and the second lateral plate 520 at this position, and the gap forms the sound output opening P. A set position and an extension length of the sound output opening P may be set according to demand. For example, one sound output opening P is provided at each of the height side, the bottom side, the left side and the right side of the display apparatus 10.

It can be understood that when the sound output openings P are not provided at some positions of the first lateral plate 320 and the second lateral plate 520, the gap between the first lateral plate 320 and the second lateral plate 520 at the positions still needs to be closed with, for example, a rubber plug, or a protruding bent portion is arranged at the first lateral plate 320 or the second lateral plate 520. Thus, foreign matters such as dust are prevented from entering the gap between the backplane 300 and the rear shell 500.

Figure 56:
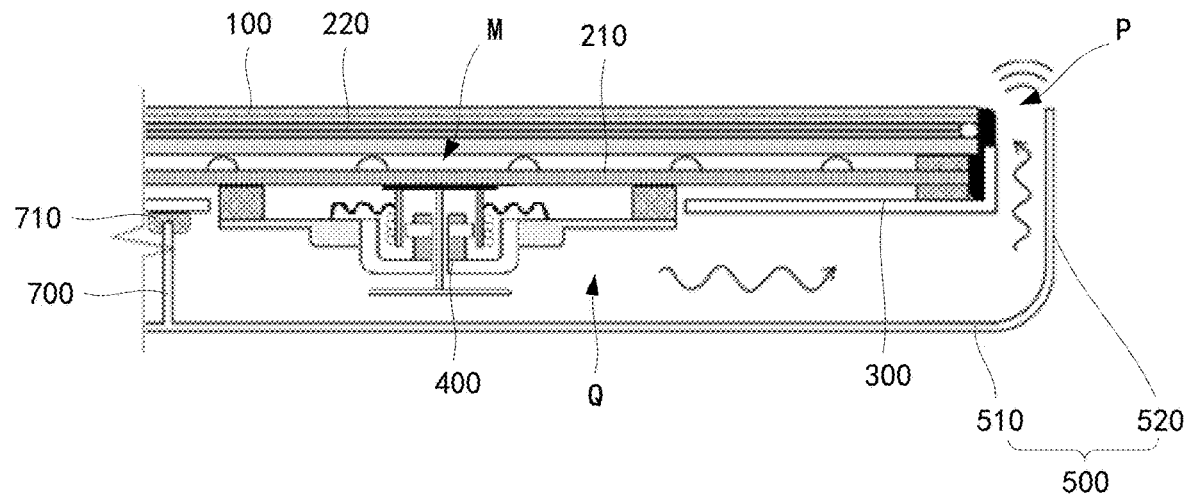
FIG. 56 is yet another sectional view of a display apparatus at a position of an exciter according to some embodiments of the disclosure.
Figure 57:
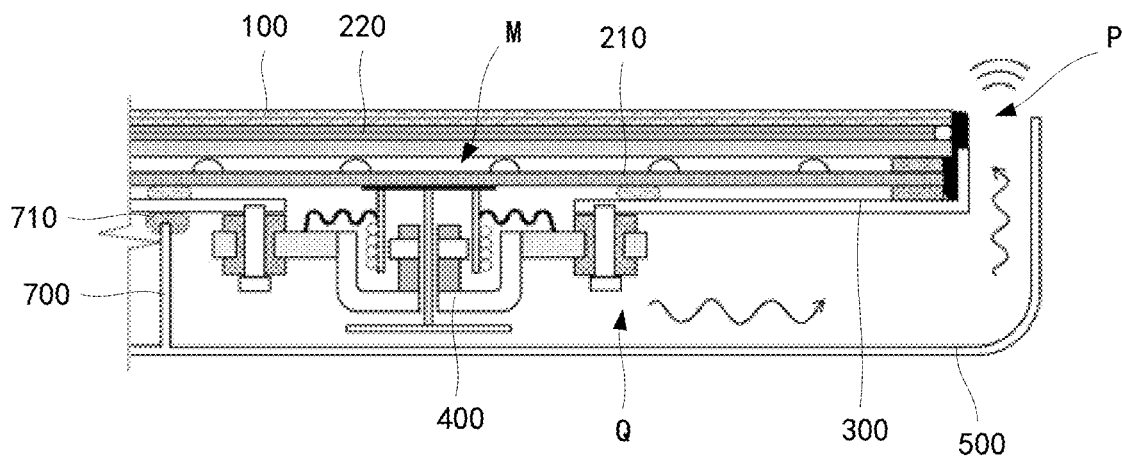
FIG. 57 is yet another sectional view of a display apparatus at a position of an exciter according to some embodiments of the disclosure.
Figure 58:
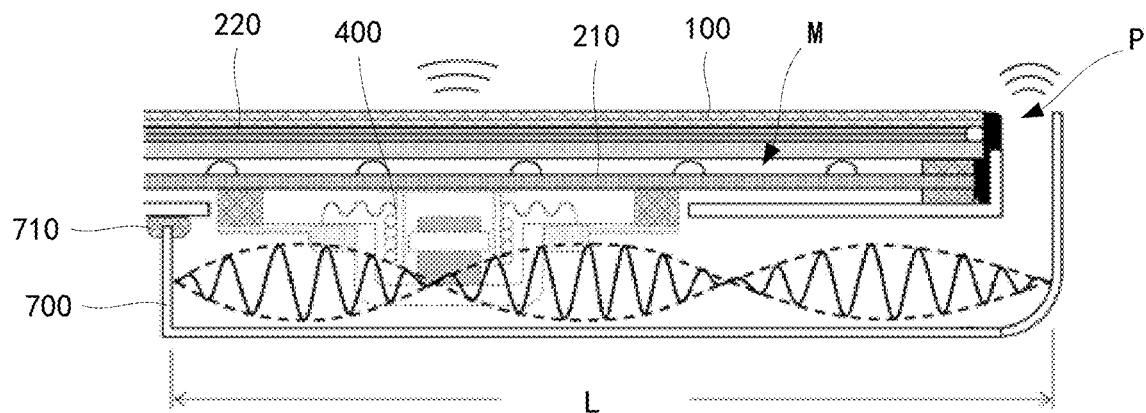
FIG. 58 is yet another sectional view of a display apparatus at a position of an exciter according to some embodiments of the disclosure.
Figure 59:
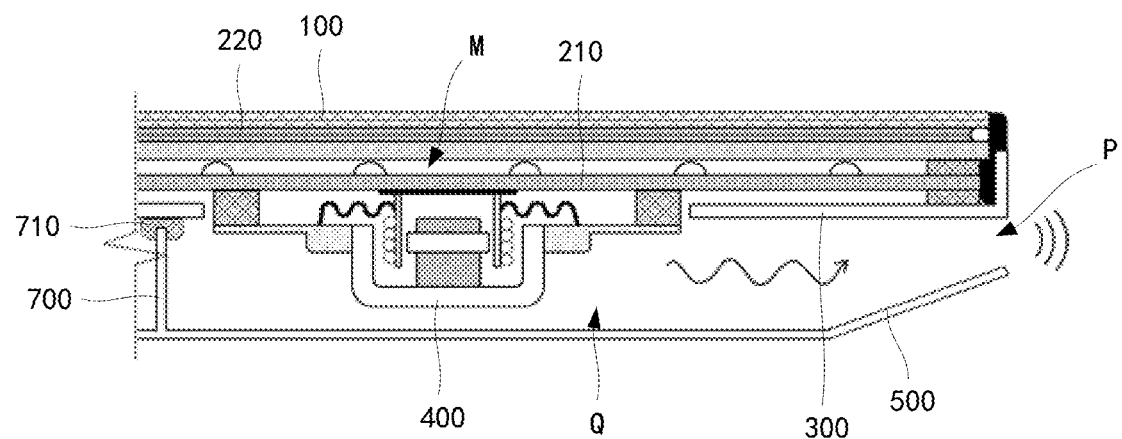
FIG. 59 is still another sectional view of a display apparatus at a position of an exciter according to some embodiments of the disclosure.

According to different protrusion directions of the first lateral plate 320 and the second lateral plate 520, the sound output opening P may face different directions. For example, when both the first lateral plate 320 and the second lateral plate 520 protrude in the thickness direction of the display apparatus 10, the sound output opening P faces a front of the display apparatus 10 (as shown in FIGS. 56-58). When the second lateral plate 520 protrudes along the side of the display apparatus 10, the sound output opening P may face the lateral-frontal side (as shown in FIG. 59).

Figure 2:
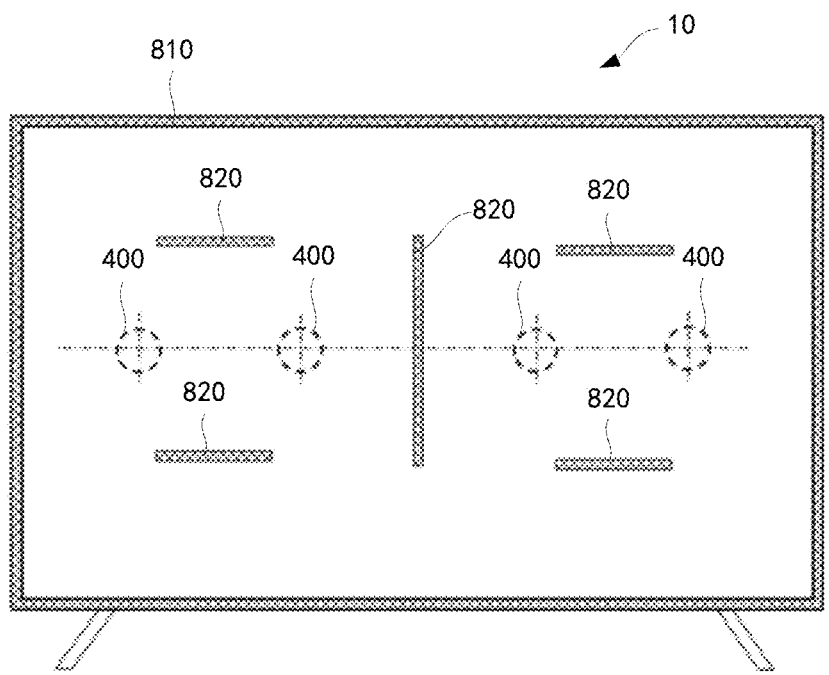
FIG. 2 is a second schematic structural diagram of a display apparatus according to some embodiments of the disclosure.
Figure 4:
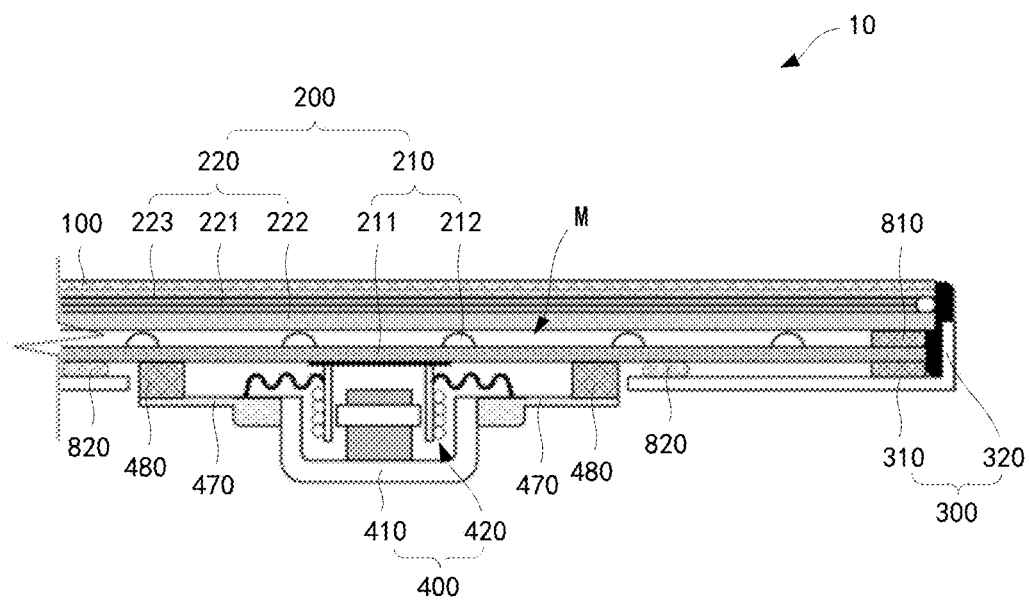
FIG. 4 is a sectional view of a display apparatus at a position of an exciter according to some embodiments of the disclosure.

With consideration of a large size of the display apparatus 10, in some embodiments, with reference to FIGS. 2-4, the display apparatus 10 further includes a plurality of second adhesive members 820, and the second adhesive member 820 may be the double-sided tape, foam, etc. The plurality of second adhesive members 820 are arranged at intervals to connect the backlight board body 211 to the back board 300, such that intervals between the backlight board body 211 and the backplane 300 at different positions fall within a preset range. That is, different positions of the backlight board body 211 have uniform vibration amplitudes, and noise generation during the vibration of the backlight board 210 is avoided.

In addition, by arranging the second adhesive member 820, the backlight board 210 may be limited, to avoid the case that after the display apparatus 10 is assembled, the backlight board 210 is deformed and affects vibration and sound emission of the backlight board 210.

With consideration of a great hardness of the backplane 300, in some embodiments, a hardness of the second adhesive member 820 is less than a hardness of the first adhesive member 810, that is, the hardness of the second adhesive member 820 is small. Thus, the backlight board 210 can be limited, space for vibration fluctuation of the backlight board 210 is further reserved, and influence on the low-frequency response of the backlight board 210 is avoided.

The second adhesive members 820 may be distributed at intervals (not shown) in a spotted manner. In some embodiments, with reference to FIG. 2, a plurality of exciters 400 are arranged at intervals in the horizontal direction, and the second adhesive member 820 may be strip-shaped and extend in the vertical direction. In this case, the exciters 400 at two sides of the second adhesive member 820 have little influence on each other. That is, when the exciter 400 at a left side of the second adhesive member 820 vibrates, the backlight board 210 at a right side of the second adhesive member 820 may not be driven to vibrate by the exciter 400 at the left side.

It can be understood that an extension dimension of the second adhesive member 820 may be the same as the height of the display apparatus 10.

In some embodiments, according to the size of the display apparatus 10, for example, a large size of the display apparatus 10, a plurality of second adhesive members 820 extending in the horizontal direction may be arranged. The extension length and an extension direction of the second adhesive member 820 are not set in the embodiments.

Finally, it should be noted that the embodiments described above are merely used for describing the technical solution of the disclosure, rather than limiting the same. Although the disclosure has been described in detail with reference to the foregoing embodiments, those skilled in the art should understand that the technical solution described in the foregoing embodiments can still be modified, or some or all technical features in the technical solution can be equivalently replaced. However, these modifications or replacements do not make the essence of a corresponding technical solution depart from the scope of the technical solution of the embodiments of the disclosure.

What is claimed is:
1. A display apparatus, comprising:
a display panel configured to display image information;
a backlight module, wherein the backlight module comprises a backlight board and an optical film component, and the backlight board comprises a backlight board body and a light source; the display panel is located at a light-emitting side of the optical film component, and the backlight board is located at a light incident side of the optical film component; an edge of the display panel is connected to an edge of the backlight board body, to form a gas layer between the display panel and the backlight board body; and the light source is located in the gas layer;

a backplane, wherein the backplane is arranged at a side, facing away from the display panel, of the backlight module; and the backplane is configured to support the backlight module and the display panel; and an exciter, wherein the exciter comprises an exciter body and an actuation member, the actuation member is connected to the backlight board body, and the actuation member is configured to drive the backlight board body to vibrate and transmit vibration of the backlight board body to the display panel through the gas layer, to drive the display panel to vibrate and emit sound;

wherein the display apparatus comprises a plurality of second elastic support members arranged at intervals;

wherein the second elastic support member is elastically pressed between the backlight board and the optical film component, to transmit vibration of the backlight board to the display panel;

wherein the plurality of the second elastic support members are arranged around an outer side of the exciter body; and the plurality of second elastic support members are annularly or radially arranged at the outer side of the exciter body.

2. The display apparatus according to claim 1, wherein the edge of the display panel is hermetically connected to the edge of the backlight board body, to seal the gas layer; and/or, wherein a gas guide channel is provided at a connection position between the edge of the display panel and the edge of the backlight board body, and the gas guide channel is configured for communication of an inner side and an outer side of the gas layer; and the gas guide channel has an equivalent length and an equivalent inner diameter, and the equivalent length is greater than or equal to 3 times the equivalent inner diameter.

3. The display apparatus according to claim 1, further comprising a rear shell, wherein the rear shell is located at a side, facing away from the display panel, of the backplane; and the actuation member is connected to the rear shell, to drive the rear shell to vibrate and emit sound;

wherein the rear shell is provided with a second reinforcement rib that has an irregular geometric shape; and/or, wherein the rear shell comprises a plurality of rear sub-shells connected to one another, and the plurality of rear sub-shells are arranged abreast.

4. The display apparatus according to claim 1, wherein the exciter further comprises a vibrating reed, the vibrating reed is connected to the actuation member, and the vibrating reed is configured to vibrate and emit sound under action of drive of the actuation member;

wherein the display apparatus is further provided with a high-frequency speaker, and the high-frequency speaker is configured to emit a high-frequency sound wave.

5. The display apparatus according to claim 1, further comprising a reinforcement plate, wherein the reinforcement plate is mounted at a side, facing away from the display panel, of the backlight board body;

the exciter is connected to the reinforcement plate; and a damping of the reinforcement plate is greater than a damping of the backlight board body.

6. The display apparatus according to claim 1, wherein heights, in a perpendicular direction of the display panel, of the second elastic support members in a natural state gradually decrease from a side close to the exciter body to a side far away from the exciter body; and the height, in the perpendicular direction of the display panel, of the second elastic support member in the natural state is greater than a maximum interval of the gas layer at a corresponding position of the second elastic support member; and/or a distribution density of the second elastic support members and/or a support rigidity of a single second elastic support member gradually decreases from a side close to the exciter body to a side far away from the exciter body; and/or a hardness of a single second elastic support member and/or a cross-sectional area of the single second elastic support member gradually decreases from a side close to the exciter body to a side far away from the exciter body.

7. The display apparatus according to claim 1, wherein a plurality of light sources are arranged on the backlight board; and at least a part of a structure of the second elastic support member is a transparent light guide portion, and the light guide portion is configured to conduct light that is emitted by the light source towards the display panel;

wherein the second elastic support member is wrapped around an outer side of the light source, and the light guide portion is located between the light source and the display panel.

8. The display apparatus according to claim 1, wherein the optical film component comprises a diffusion film, a fluorescent film and a brightening film that are sequentially stacked, and the diffusion film is arranged at a side facing the backlight board; and the display apparatus further comprises an anti-wear member, and the anti-wear member is arranged between the diffusion film and the fluorescent film, to separate the diffusion film from the fluorescent film.

9. The display apparatus according to claim 8, wherein a contact surface between the anti-wear member and the fluorescent film is a cambered surface; and the cambered surface protrudes towards a side of the fluorescent film;

wherein the anti-wear member comprises a plurality of first light processing layers stacked in sequence, and refractive indexes of the plurality of first light processing layers are set unequally; and/or, wherein the anti-wear member comprises two second light processing layers and an optical member;

the two second light processing layers are arranged at an interval and mounted on the diffusion film and the fluorescent film respectively; and edges of the two second light processing layers are connected through the optical member, to reflect light towards a side of the fluorescent film;

wherein a filter is further arranged between the two second light processing layers, and the filter is separated from the second light processing layers and configured to reflect light towards a side of the diffusion film.

10. The display apparatus according to claim 1, wherein at least two backlight boards are provided, the at least two backlight boards are spliced with each other, and the backlight board is configured to provide a backlight source for the display panel;

the display apparatus further comprises a sound-emitting component, the sound-emitting component comprises at least one exciter, and the at least one exciter is arranged at a side, facing away from the display panel, of the backlight board;

the plurality of second elastic support members are arranged in the gas layer, and the plurality of second elastic support members are connected between the backlight board and the display panel, to transmit vibration of the backlight board to the display panel; and a support intensity of the second elastic support member on the display panel decreases as a distance between the second elastic support member and the exciter increases.

11. The display apparatus according to claim 10, wherein an arrangement interval between the plurality of the second elastic support members increases as the distance between the second elastic support member and the exciter increases; and/or, the support intensity of each of the plurality of second elastic support members on the display panel decreases as the distance between the second elastic support member and the exciter increases;

wherein the plurality of second elastic support members satisfy at least one of following conditions:

a cross-sectional area, in a direction parallel to the display panel, of the second elastic support member decreases as the distance between the second elastic support member and the exciter increases;

a rigidity of the second elastic support member decreases as the distance between the second elastic support member and the exciter increases; and the second elastic support member is connected between the backlight board and the display panel in an interference manner, and a magnitude of interference between the second elastic support member and the backlight board in a direction perpendicular to the backlight board decreases as the distance between the second elastic support member and the exciter increases;

wherein a height, in the direction perpendicular to the backlight board, of the second elastic support member in a natural state gradually decreases from a side close to the exciter to a side far away from the exciter.

12. The display apparatus according to claim 10, wherein the plurality of the second elastic support members are radially arranged at an outer side of a periphery of the exciter; and/or, wherein at least two exciters are provided, the at least two exciters are arranged at an interval in a direction parallel to the display panel, the plurality of second elastic support members comprise at least two vibration transmission member groups, and second elastic support members in each of the at least two vibration transmission member groups are arranged around an outer side of a corresponding exciter; and/or, wherein a plurality of light sources are provided at a side, facing the display panel, of the backlight board;

the plurality of light sources are arranged at intervals; and the second elastic support members are located in gaps between the plurality of light sources.

13. The display apparatus according to claim 10, wherein the second elastic support member is a silica gel member or a rubber member.

14. The display apparatus according to claim 10, wherein the sound-emitting component further comprises a reinforcement plate;

the reinforcement plate is bonded to a side, facing away from the display panel, of the backlight board; and the exciter is arranged at a side, facing away from the backlight board, of the reinforcement plate.

15. The display apparatus according to claim 1, further comprising a filling protrusion arranged in the gas layer, wherein the filling protrusion is located outside a direct illumination region of the light source;

wherein a plurality of light sources are provided;

the plurality of light sources are arranged at intervals at a side, facing the display panel, of the backlight board body; and the filling protrusion is connected to the backlight board body.

16. The display apparatus according to claim 15, wherein the filling protrusion is a protrusion protruding from a surface of the backlight board body; and a protrusion height of the protrusion is less than a thickness of the gas layer and less than a height of the light source protruding from the surface of the backlight board body.

17. The display apparatus according to claim 15, wherein a plurality of filling protrusions are provided, and the plurality of filling protrusions are arranged in an array on the backlight board and separated from the light source;

wherein a height of the filling protrusion gradually decreases from a position close to the exciter to a position far away from the exciter by taking the exciter a center.

18. The display apparatus according to claim 15, wherein a size of a section of the filling protrusion gradually decreases in an extension direction of the backlight board body towards the display panel; and/or, wherein a surface of the filling protrusion is provided with a reflective layer, and the reflective layer covers the surface of the filling protrusion.

19. The display apparatus according to claim 15, further comprising a filling layer, wherein the filling layer is arranged at the side, facing the display panel, of the backlight board body, and connected to the backlight board body;

filling protrusions are arranged at intervals on the filling layer; and both the filling protrusion and the light source protrude from a surface, facing the display panel, of the filling layer;

wherein a projection of the filling layer on the backlight board body covers the backlight board body.

20. The display apparatus according to claim 15, wherein a first end of the filling protrusion is fixedly connected to the backlight board body, a second end of the filling protrusion abuts against the display panel, and the filling protrusion is configured to support the display panel.

* * * * *